United States Patent
Kishigami et al.

(10) Patent No.: US 12,140,667 B2
(45) Date of Patent: *Nov. 12, 2024

(54) RADAR APPARATUS

(71) Applicant: PANASONIC INTELLECTUAL PROPERTY MANAGEMENT CO., LTD., Osaka (JP)

(72) Inventors: Takaaki Kishigami, Tokyo (JP); Kenta Iwasa, Tokyo (JP); Hidekuni Yomo, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/230,885

(22) Filed: Aug. 7, 2023

(65) Prior Publication Data

US 2023/0393268 A1 Dec. 7, 2023

Related U.S. Application Data

(63) Continuation of application No. 17/870,383, filed on Jul. 21, 2022, now Pat. No. 11,762,088, which is a (Continued)

(30) Foreign Application Priority Data

Jun. 13, 2019 (JP) .................................. 2019-110522
Dec. 6, 2019 (JP) .................................. 2019-221249

(51) Int. Cl.
*G01S 13/93* (2020.01)
*G01S 7/02* (2006.01)
(Continued)

(52) U.S. Cl.
CPC ............ *G01S 13/931* (2013.01); *G01S 7/036* (2013.01); *G01S 13/534* (2013.01); *G01S 7/023* (2013.01)

(58) Field of Classification Search
CPC .... G01S 13/325; G01S 13/288; G01S 13/284; G01S 7/282; G01S 13/582; G01S 7/0234; G01S 7/023; G01S 7/036; G01S 13/534
See application file for complete search history.

(56) References Cited

U.S. PATENT DOCUMENTS

2008/0303711 A1 12/2008 Matsuoka
2011/0074620 A1 3/2011 Wintermantel
(Continued)

FOREIGN PATENT DOCUMENTS

CA 2828186 8/2012
JP 2008-304417 12/2008
(Continued)

OTHER PUBLICATIONS

Cadzow, "Direction-of-Arrival Estimation Using Signal Subspace Modeling", IEEE Transactions on Aerospace and Electronic Systems, vol. 28, No. 1, Jan. 1992, pp. 64-79.
(Continued)

*Primary Examiner* — Bernarr E Gregory
*Assistant Examiner* — Juliana Cross
(74) *Attorney, Agent, or Firm* — Greenblum & Bernstein, P.L.C.

(57) ABSTRACT

A radar apparatus includes a plurality of transmit antennas that transmits a plurality of transmission signals using a multiplexing transmission, and a transmission circuit that applies phase rotation amounts corresponding to combinations of Doppler shift amounts and code sequences to the plurality of transmission signals. Each of the plurality of transmission signals is assigned a different combination among the combinations. The combinations include at least two combinations of a same number of multiplexing by the code sequences.

13 Claims, 24 Drawing Sheets

Related U.S. Application Data continuation of application No. 16/898,856, filed on Jun. 11, 2020, now Pat. No. 11,428,805.

(51) Int. Cl.
| | |
|---|---|
| *G01S 7/03* | (2006.01) |
| *G01S 13/53* | (2006.01) |
| *G01S 13/534* | (2006.01) |
| *G01S 13/931* | (2020.01) |

(56) References Cited

U.S. PATENT DOCUMENTS

| | | | |
|---|---|---|---|
| 2013/0135140 | A1 | 5/2013 | Kishigami et al. |
| 2017/0254879 | A1 | 9/2017 | Tokieda, I et al. |
| 2017/0299711 | A1 | 10/2017 | Kishigami |
| 2019/0170873 | A1 | 6/2019 | Reid |
| 2019/0357204 | A1* | 11/2019 | Matsumura ......... H04L 27/2613 |
| 2020/0209380 | A1* | 7/2020 | Takayama ............... G01S 7/352 |
| 2020/0292663 | A1 | 9/2020 | Bai et al. |
| 2021/0377095 | A1 | 12/2021 | Nayebi et al. |
| 2022/0052715 | A1 | 2/2022 | Ma et al. |
| 2022/0107402 | A1 | 4/2022 | Kishigami |

FOREIGN PATENT DOCUMENTS

| | | |
|---|---|---|
| JP | 2011-526371 | 10/2011 |
| JP | 2014-119344 | 6/2014 |
| JP | 2017-167117 | 9/2017 |
| JP | 2017-177539 | 10/2017 |
| WO | 2016/031882 | 3/2016 |

OTHER PUBLICATIONS

Kronauge et al., "Fast Two-Dimensional CFAR Procedure", IEEE Transactions on Aerospace and Electronic Systems, vol. 49, No. 3, Jul. 2013, pp. 1817-1823.

Li et al., "MIMO Radar with Colocated Antennas", IEEE Signal Processing Magazine, vol. 24, Issue: 5, Sep. 2007, pp. 106-114.

Winkler, "Novel Waveform Generation Principle for short-range FMCW-Radars", In Proc. German Microw. Conf., 2009, pp. 1-4.

English language translation of Office Action from Japan Patent Office (JPO) in Japanese Patent Appl. No. 2019-221249, dated Mar. 7, 2023.

English language translation of Office Action from Japan Patent Office (JPO) in Japanese Patent Appl. No. 2023-116708, dated Feb. 20, 2024.

\* cited by examiner

CASE WHERE $N_{DOP\_CODE}(1) = 2$ AND $N_{DOP\_CODE}(2) = 1$

CASE WHERE $N_{DOP\_CODE}(1) = 1$ AND $N_{DOP\_CODE}(2) = 2$

CASE WHERE $N_{DOP\_CODE}(1) = 2$ AND $N_{DOP\_CODE}(2) = 1$

CASE WHERE $N_{DOP\_CODE}(1) = 1$ AND $N_{DOP\_CODE}(2) = 2$

CASE WHERE $N_{DOP\_CODE}(1)=2$, $N_{DOP\_CODE}(2)=1$, AND $N_{DOP\_CODE}(3)=1$

CASE WHERE $N_{DOP\_CODE}(1)=1$, $N_{DOP\_CODE}(2)=2$, AND $N_{DOP\_CODE}(3)=1$

CASE WHERE $N_{DOP\_CODE}(1)=1$, $N_{DOP\_CODE}(2)=1$, AND $N_{DOP\_CODE}(3)=2$

CASE WHERE $N_{DOP\_CODE}(1)=2$, $N_{DOP\_CODE}(2)=1$, AND $N_{DOP\_CODE}(3)=1$

CASE WHERE $N_{DOP\_CODE}(1)=2$, $N_{DOP\_CODE}(2)=1$, AND $N_{DOP\_CODE}(3)=1$

CASE WHERE $N_{DOP\_CODE}(1)=2$, $N_{DOP\_CODE}(2)=1$, AND $N_{DOP\_CODE}(3)=1$

CASE WHERE $N_{DOP\_CODE}(1) = 3$ AND $N_{DOP\_CODE}(2) = 1$

CASE WHERE $N_{DOP\_CODE}(1) = 1$ AND $N_{DOP\_CODE}(2) = 3$

USE OF $Code_2$ WHEN $N_{DOP\_CODE}(2) = 1$

USE OF $Code_3$ WHEN $N_{DOP\_CODE}(2) = 1$

CASE WHERE SAME SET OF CODES IS USED

CASE WHERE DIFFERENT SETS OF CODES ARE USED

CASE WHERE SAME CODE IS USED

CASE WHERE DIFFERENT CODES ARE USED

OUTPUTS OF DOPPLER ANALYZERS 210

OUTPUTS OF DOPPLER ANALYZERS 210
WITH APPLICATION OF DOPPLER DOMAIN COMPRESSION PROCESS

CASE WHERE $Nt=3$, $N_{DM}=3$, $N_{CM}=2$,
$N_{DOP\_CODE}(1)=0$, $N_{DOP\_CODE}(2)=1$, AND $N_{DOP\_CODE}(3)=2$

CASE WHERE $Nt=5$, $N_{DM}=4$, $N_{CM}=2$,
$N_{DOP\_CODE}(1)=2$, $N_{DOP\_CODE}(2)=0$, $N_{DOP\_CODE}(3)=2$, AND $N_{DOP\_CODE}(4)=1$

CASE WHERE $N_{DOP\_CODE}(1) = 2$ AND $N_{DOP\_CODE}(2) = 1$

CASE WHERE $N_{DOP\_CODE}(1) = 1$ AND $N_{DOP\_CODE}(2) = 2$

CASE WHERE $N_{DOP\_CODE}(1) = N_{DOP\_CODE}(2) = 2$
AND $N_{DOP\_CODE}(3) = N_{DOP\_CODE}(4) = 1$

CASE WHERE $N_{DOP\_CODE}(1) = N_{DOP\_CODE}(3) = 2$
AND $N_{DOP\_CODE}(2) = N_{DOP\_CODE}(4) = 1$

RADAR APPARATUS

CROSS-REFERENCE TO RELATED APPLICATIONS

This is a continuation of U.S. patent application Ser. No. 17/870,383, filed Jul. 21, 2022, which is a continuation of U.S. patent application Ser. No. 16/898,856, filed Jun. 11, 2020 and now U.S. Pat. No. 11,428,805 issued Aug. 30, 2022, which claims the benefit of priority of Japanese Pat. Appl. No. 2019-110522, filed Jun. 13, 2019, and of Japanese Pat. Appl. No. 2019-221249, filed Dec. 6, 2019. The entire disclosure of each of the above-identified documents is incorporated herein by reference in its entirety.

TECHNICAL FIELD

The present disclosure relates to a radar apparatus.

BACKGROUND ART

Radar apparatuses that use radar transmission signals with short wavelengths, including microwaves or millimeter-waves that realize high resolution, have been under study in recent years. To improve safety in outdoor spaces, a demand has arisen for the development of radar apparatuses (referred to as, for example, wide-angle radar apparatuses) for sensing vehicles, as well as small objects such as pedestrians, within wide-angle ranges.

Examples of the configuration of a radar apparatus having a wide-angle sensing range include a configuration that uses a method called direction of arrival (DOA) estimation. In DOA estimation, reflected waves from a target are received by an array antenna constituted by a plurality of antennas (or also referred to as antenna elements), and the direction of arrival (or referred to as the angle of arrival) of the reflected waves is estimated using a signal processing algorithm based on reception phase difference as to element spacing (antenna spacing). Techniques for DOA estimation include, for example, the Fourier method, or examples of the technique for realizing high resolution include the Capon method, multiple signal classification (MUSIC), and estimation of signal parameters via rotational invariance techniques (ESPRIT).

Further, for example, a configuration of a radar apparatus (also referred to sometimes as a multiple input multiple output (MIMO) radar) has been proposed that includes a plurality of antennas (array antenna) on the transmitting side in addition to the receiving side such that the transmit and receive array antennas are used to perform signal processing to perform beam scanning (see, for example, NPL 1).

CITATION LIST

Patent Literature

PTL 1
Japanese Patent Application Laid-Open No. 2008-304417
PTL 2
Japanese Unexamined Patent Application Publication (Translation of PCT Application) No. 2011-526371
PTL 3
Japanese Patent Application Laid-Open No. 2014-119344

Non Patent Literature

NPL 1
J. Li, and P. Stoica, "MIMO Radar with Colocated Antennas", Signal Processing Magazine, IEEE Vol. 24, Issue: 5, pp. 106-114, 2007
NPL 2
M. Kronauge, H. Rohling, "Fast two-dimensional CFAR procedure", IEEE Trans. Aerosp. Electron. Syst., 2013, 49, (3), pp. 1817-1823
NPL 3
Direction-of-arrival estimation using signal subspace modeling Cadzow, J. A.; Aerospace and Electronic Systems, IEEE Transactions on Volume: 28, Issue: 1 Publication Year: 1992, Page(s): 64-79
NPL 4
V. Winkler, "Novel Waveform Generation Principle for Short-Range FMCW-Radars," in Proc. German Microw. Conf., 2009, pp. 1-4.

SUMMARY

However, methods for sensing a target object (or target) using a radar apparatus (for example, a MIMO radar) have not been fully studied.

A non-limiting exemplary embodiment of the present disclosure provides a radar apparatus with improved target-object sensing accuracy.

A radar apparatus according to one example of the present disclosure includes: a plurality of transmit antennas that transmit a plurality of transmission signals using a multiplexing transmission; and a transmission circuit that applies phase rotation amounts corresponding to combinations of Doppler shift amounts and code sequences to the plurality of transmission signals, wherein each of the combinations of the Doppler shift amounts and the code sequences has at least one different from other combination, and wherein the number of multiplexes of the code sequence corresponding to at least one of the Doppler shift amounts in the combinations is different from the number of multiplexing of code sequences corresponding to the remaining Doppler shift amount.

It should be noted that general or specific embodiments may be implemented as a system, an apparatus, a method, an integrated circuit, a computer program or a storage medium, or any selective combination of the system, the apparatus, the method, the integrated circuit, the computer program, and the storage medium.

According to an exemplary embodiment of the present disclosure, the target-object sensing accuracy of a radar apparatus can be improved.

Additional benefits and advantages of the disclosed exemplary embodiments will become apparent from the specification and drawings. The benefits and/or advantages may be individually obtained by the various embodiments and features of the specification and drawings, which need not all be provided in order to obtain one or more of such benefits and/or advantages.

DESCRIPTION OF EMBODIMENTS

Figure 1:
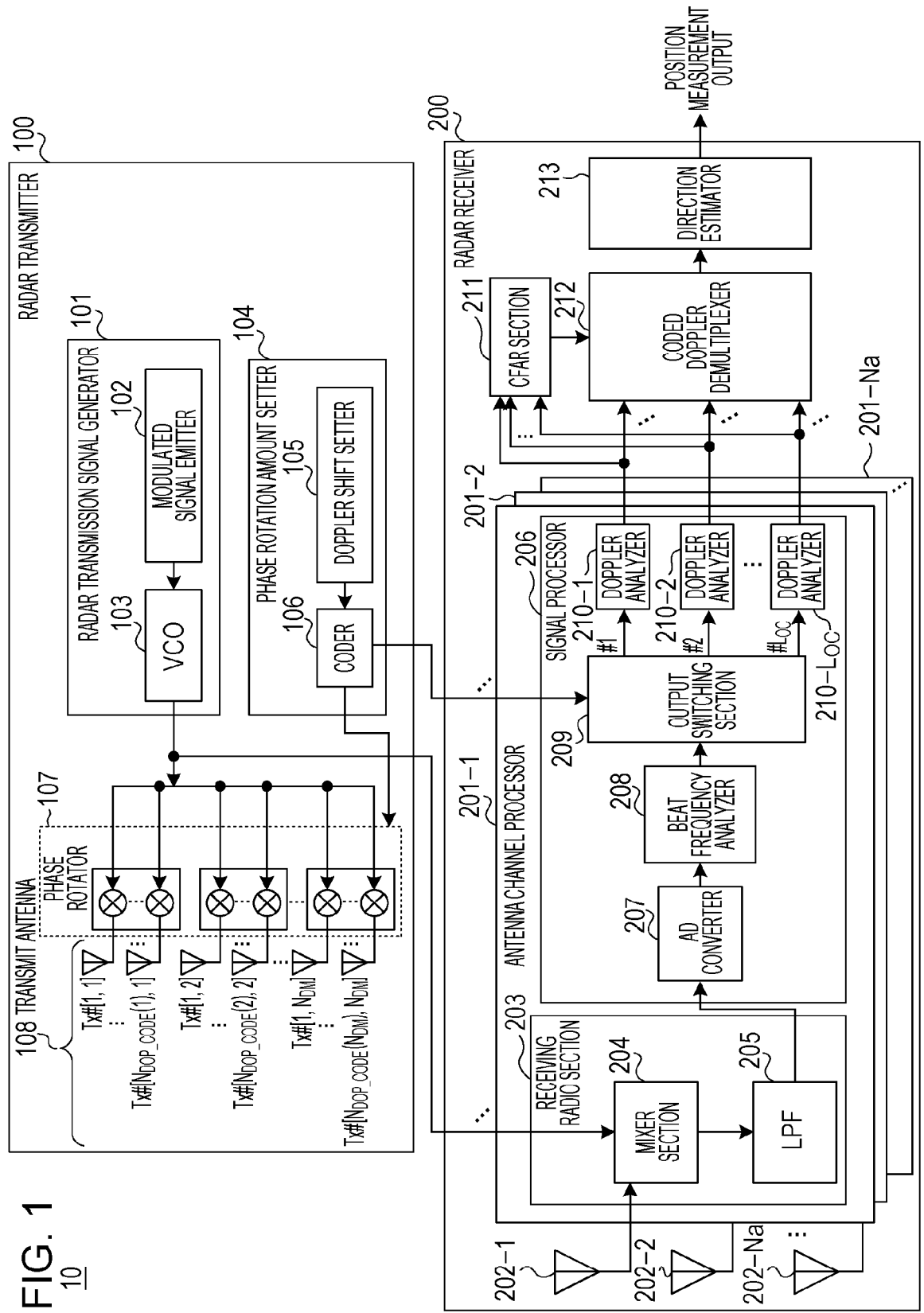
FIG. 1 is a block diagram illustrating an example configuration of a radar apparatus according to Embodiment 1.

A MIMO radar transmits signals (radar transmission waves) multiplexed by, for example, time division, frequency division, or code division from a plurality of transmit antennas (or referred to as a transmit array antenna), receives signals (radar reflected waves) reflected from a nearby object using a plurality of receive antennas (or referred to as a receive array antenna), and separates and receives the multiplexed transmission signals from the respective reception signals. Through the process described above, the MIMO radar can acquire the propagation channel response, which is given by the product of the number of transmit antennas and the number of receive antennas, and the reception signals are used as a virtual receive array to perform array signal processing.

In the MIMO radar, furthermore, an arrangement with appropriate element spacing in the transmit and receive array antennas can extend the antenna aperture in a virtual fashion and improve the angular resolution.

For example, PTL 1 discloses a MIMO radar (hereinafter referred to as a "time-division multiplexing MIMO radar") that uses, as a multiplexing transmission method for the MIMO radar, time-division multiplexing transmission to transmit a signal from each transmit antenna at a shifted transmission time. Time-division multiplexing transmission can be implemented with a simpler configuration than frequency multiplexing transmission or code multiplexing transmission. In time-division multiplexing transmission, furthermore, a sufficient width of the intervals between transmission times can maintain proper orthogonality between transmission signals. The time-division multiplexing MIMO radar outputs transmission pulses, which are an example of transmission signals, while sequentially switching the transmit antennas in a defined period. The time-division multiplexing MIMO radar receives, at a plurality of receive antennas, signals that are the transmission pulses reflected by an object, performs a correlation process between the reception signals and the transmission pulses, and then performs, for example, spatial fast Fourier transform (FFT) processing (processing for direction of arrival estimation of the reflected waves).

The time-division multiplexing MIMO radar sequentially switches the transmit antennas, from which transmission signals (for example, transmission pulses or radar transmission waves) are to be transmitted, in a defined period. In time-division multiplexing transmission, therefore, it may take a longer time to complete transmission of transmission signals from all the transmit antennas than in frequency division transmission or code division transmission. Accordingly, for example, as in PTL 2, when transmission signals are transmitted from the respective transmit antennas and the Doppler frequency (i.e., the relative velocity of the target) is detected from their reception phase changes, the time interval for observing the reception phase changes (for example, sampling interval) is increased to apply Fourier frequency analysis to detect the Doppler frequency. This reduces the Doppler frequency range over which the Doppler frequency can be detected without causing aliasing (folding) (i.e., the range of detectable relative velocities of the target).

If a reflected wave signal outside the Doppler frequency range over which the Doppler frequency can be detected without causing aliasing (in other words, the range of relative velocities) is assumed to come from the target, the radar apparatus is unable to identify whether the reflected wave signal is the aliasing component, causing the ambiguity (uncertainty) of the Doppler frequency (in other words, the relative velocity of the target).

For example, when the radar apparatus transmits transmission signals (transmission pulses) while sequentially switching Nt transmit antennas in period Tr, it takes a transmission time given by Tr×Nt to complete transmission of the transmission signals from all the transmit antennas. As a result of repeating this time-division multiplexing transmission operation $N_c$ times and applying Fourier frequency analysis to detect the Doppler frequency, the Doppler frequency range over which the Doppler frequency can be detected without causing aliasing is given by $\pm 1/(2Tr \times Nt)$ from the sampling theorem. Accordingly, the Doppler frequency range over which the Doppler frequency can be detected without causing aliasing decreases as the number Nt of transmit antennas increases, and the ambiguity of the Doppler frequency is likely to occur even for lower relative velocities.

In the time-division multiplexing MIMO radar, the ambiguity of the Doppler frequency, described above, is likely to occur for lower relative velocities. In the following, focus is on a method for simultaneously transmitting transmission signals from a plurality of transmit antennas in a multiplexed manner, as an example.

Examples of the method for simultaneously transmitting transmission signals from a plurality of transmit antennas in a multiplexed manner include a method (hereinafter referred to as Doppler multiplexing transmission) for transmitting signals so that a plurality of transmission signals can be separated in the Doppler frequency domain on the receiving side (see, for example, NPL 3).

In Doppler multiplexing transmission, on the transmitting side, transmission signals are simultaneously transmitted from a plurality of transmit antennas in such a manner that, for example, with respect to a transmission signal to be transmitted from a reference transmit antenna, transmission signals to be transmitted from transmit antennas different from the reference transmit antenna are given Doppler shift amounts greater than the Doppler frequency bandwidth of reception signals. In Doppler multiplexing transmission, on the receiving side, filtering is performed in the Doppler frequency domain to separate and receive the transmission signals transmitted from the respective transmit antennas.

In Doppler multiplexing transmission, simultaneous transmission of transmission signals from a plurality of transmit antennas can reduce the time interval for observing reception phase changes to apply Fourier frequency analysis to detect the Doppler frequency (or relative velocity), compared with time-division multiplexing transmission. In Doppler multiplexing transmission, however, since filtering is performed in the Doppler frequency domain to separate the transmission signals of the respective transmit antennas, the effective Doppler frequency bandwidth per transmission signal is restricted.

For example, Doppler multiplexing transmission in which a radar apparatus transmits transmission signals from Nt transmit antennas in period Tr will be described. As a result of repeating this Doppler multiplexing transmission operation $N_c$ times and applying Fourier frequency analysis to detect the Doppler frequency (or relative velocity), the Doppler frequency range over which the Doppler frequency can be detected without causing aliasing is given by $\pm 1/(2 \times Tr)$ from the sampling theorem. That is, in Doppler multiplexing transmission, the Doppler frequency range over which the Doppler frequency can be detected without causing aliasing is increased by Nt times compared with time-division multiplexing transmission (for example, $\pm 1/(2Tr \times Nt)$).

In Doppler multiplexing transmission, as described above, filtering is performed in the Doppler frequency domain to separate transmission signals. Accordingly, the effective Doppler frequency bandwidth per transmission signal is restricted to $1/(Tr \times Nt)$, and thus a Doppler frequency range similar to that in time-division multiplexing transmission is obtained. In Doppler multiplexing transmission, furthermore, in a Doppler frequency band exceeding the effective Doppler frequency range per transmission signal, interference with signals in the Doppler frequency band of any other transmission signal different from the transmission signal may lead to failure to correctly separate the transmission signals.

Accordingly, an exemplary embodiment of the present disclosure describes a method for extending the range of Doppler frequencies at which ambiguity does not occur in Doppler multiplexing transmission. With this method, a radar apparatus according to an exemplary embodiment of the present disclosure can improve target-object sensing accuracy over a wider Doppler frequency range.

Embodiments of the present disclosure will be described in detail with reference to the drawings. In the embodiments, the same constituent elements are identified with the same numerals, and a description thereof is omitted because of redundancy.

The following describes a configuration of a radar apparatus (in other words, MIMO radar configuration) having a transmitting branch in which multiplexed different transmission signals are simultaneously sent from a plurality of transmit antennas, and a receiving branch in which the transmission signals are separated and subjected to reception processing.

The following also describes, as an example, a configuration of a radar scheme (also referred to as, for example, chirp pulse transmission (fast chirp modulation)) that uses frequency-modulated pulse waves such as chirp pulses. Note that the modulation scheme is not limited to that for frequency modulation. For example, an exemplary embodiment of the present disclosure is also applicable to a radar scheme that uses a pulse compression radar configured to transmit a pulse train after performing phase modulation or amplitude modulation.

Further, the radar apparatus performs Doppler multiplexing transmission. In addition, in Doppler multiplexing transmission, the radar apparatus performs coding (for example, code division multiplexing (CDM)) on signals (hereinafter referred to as "Doppler-multiplexed transmission signals") with different phase rotations (in other words, phase shifts) applied, the number of which corresponds to the number of Doppler multiplexes, and transmits the coded signals in a multiplexed manner (hereinafter referred to as "coded Doppler multiplexing").

[Configuration of Radar Apparatus]

FIG. 1 is a block diagram illustrating an example configuration of radar apparatus 10 according to this embodiment.

Radar apparatus 10 includes radar transmitter (transmitting branch) 100 and radar receiver (receiving branch) 200.

Radar transmitter 100 generates radar signals (radar transmission signals) and transmits the radar transmission signals in a defined transmission period using a transmit array antenna made up of plural (for example, Nt) transmit antennas 108.

Radar receiver 200 receives reflected wave signals, which are radar transmission signals reflected by a target object (target) (not illustrated), using a receive array antenna made up of plural receive antennas 202-1 to 202-Na. Radar receiver 200 performs signal processing on the reflected wave signals received by respective receive antennas 202 to, for example, detect the presence or absence of the target objector estimate the distance of arrival, the Doppler frequency (in other words, relative velocity), and the direction of arrival of the reflected wave signals, and outputs information about the estimation results (in other words, position measurement information).

The target object is an object to be detected by radar apparatus 10. Examples of the target object include vehicles (including four-wheel and two-wheel vehicles), a person, and a block or a curb.

[Configuration of Radar Transmitter 100]

Radar transmitter 100 includes radar transmission signal generator 101, phase rotation amount setter 104, phase rotators 107, and transmit antennas 108.

Radar transmission signal generator 101 generates a radar transmission signal. Radar transmission signal generator 101 includes, for example, modulated signal emitter 102 and voltage controlled oscillator (VCO) 103. The following describes each of the components of radar transmission signal generator 101.

Figure 2:
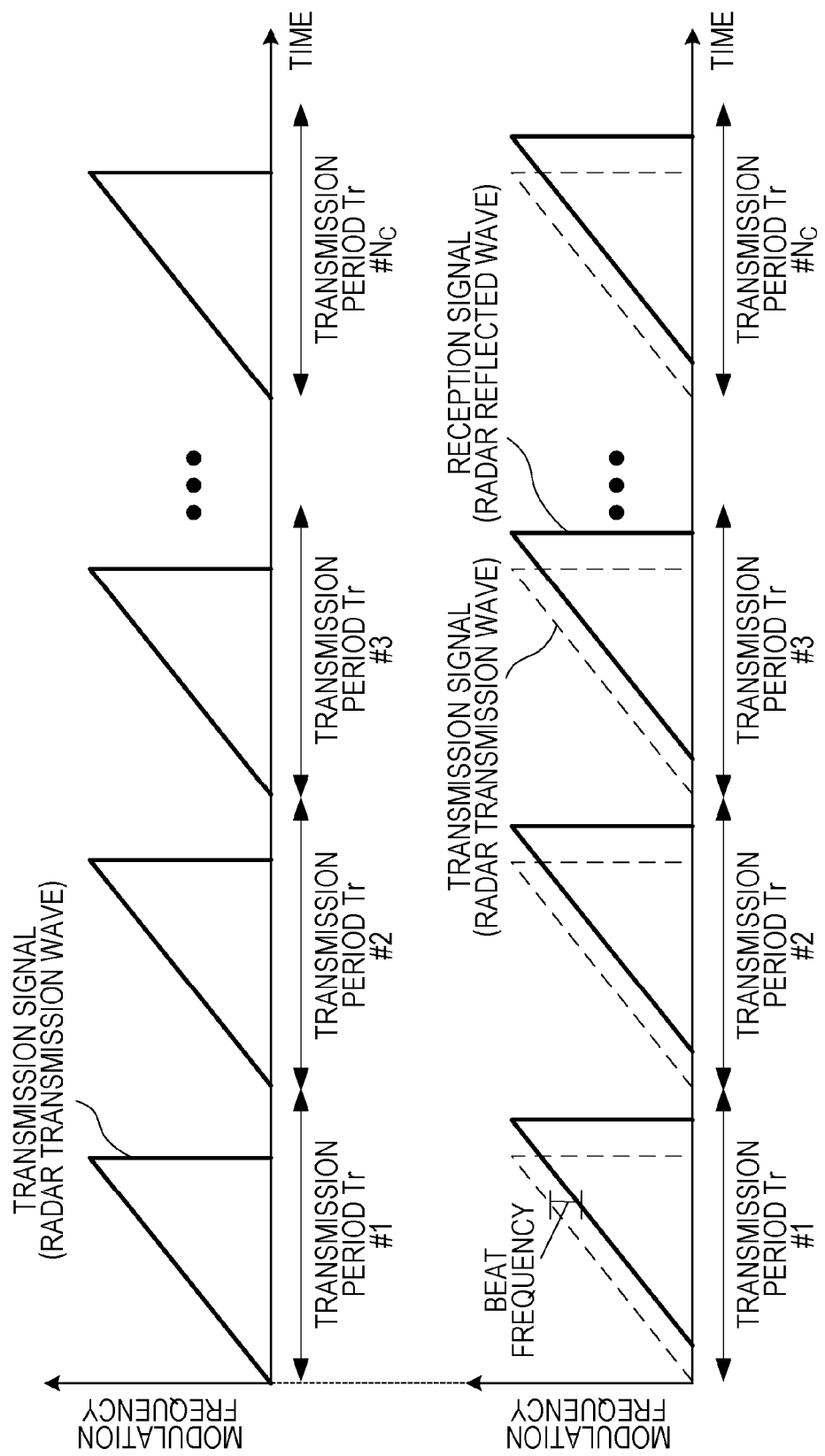
FIG. 2 is a diagram illustrating an example of transmission signals and reflected wave signals when chirp pulses are used.

For example, as illustrated in FIG. 2, modulated signal emitter 102 periodically emits sawtooth-shaped modulated signals. Here, the radar transmission period is represented by Tr.

VCO 103 outputs, based on the radar transmission signals (modulated signals) output from modulated signal emitter 102, frequency-modulated signals (hereinafter referred to as, for example, frequency chirp signals or chirp signals) to phase rotators 107 and radar receiver 200 (mixer section 204 described below).

Phase rotation amount setter 104 sets phase rotation amounts for phase rotators 107 (in other words, phase rotation amounts corresponding to coded Doppler multiplexing transmission). Phase rotation amount setter 104 includes, for example, Doppler shift setter 105 and coder 106.

Doppler shift setter 105 sets, for example, a phase rotation amount corresponding to a Doppler shift amount to be applied to each radar transmission signal (for example, chirp signal).

Coder 106 sets a phase rotation amount corresponding to coding. Coder 106 calculates phase rotation amounts for phase rotators 107, based on, for example, the phase rotation amounts output from Doppler shift setter 105 and the phase rotation amount corresponding to coding, and outputs the phase rotation amounts to phase rotators 107. Further, coder 106 outputs, for example, information about code sequences used for coding (for example, elements of orthogonal code sequences) to radar receiver 200 (for example, output switching section 209).

Phase rotators 107 applies the phase rotation amounts input from coder 106 to the chirp signals input from VCO 103 and outputs signals subjected to phase rotation to transmit antennas 108. For example, each phase rotator 107 includes a phase shifter, a phase modulator, and so on (not illustrated). The output signals of phase rotators 107 are amplified to defined transmission power and are then radiated into a space from the respective transmit antennas 108. In other words, phase rotation amounts corresponding to Doppler shift amounts and orthogonal code sequences are applied to radar transmission signals, which are then transmitted from plural transmit antennas 108 in a multiplexed manner.

Next, an example method for setting phase rotation amounts using phase rotation amount setter 104 will be described.

Doppler shift setter 105 sets phase rotation amount $\phi_{ndm}$ for applying Doppler shift amount $DOP_{ndm}$ and outputs phase rotation amount $\phi_{ndm}$ to coder 106. Here, ndm= 1, ..., $N_{DM}$. $N_{DM}$ denotes a set number of different Doppler shift amounts and is hereinafter referred to as the "number of Doppler multiplexes".

In Radar apparatus 10, since coding performed by coder 106 is also used, the number of Doppler multiplexes NDM may be set to be smaller than the number Nt of transmit antennas 108 used for multiplexing transmission. The number of Doppler multiplexes $N_{DM}$ is greater than or equal to 2.

Doppler shift amounts $DOP_1$, $DOP_2$, ..., and $DOP_{DM}$ are assigned different phase rotation amounts by, for example, dividing a phase rotation range greater than or equal to 0 and less than $2\pi$. For example, phase rotation amount $\phi_{ndm}$ for applying Doppler shift amount $DOP_{ndm}$ is assigned, as given by following equation 1. In the following, the angle is expressed in radian.

[1]
$$\phi_{ndm} = \frac{2\pi(ndm-1)}{N_{DM}} \qquad \text{(Equation 1)}$$

In equation 1, for example, in a case where the number of Doppler multiplexes NDM is equal to 2, phase rotation amount $\phi_1$ for applying Doppler shift amount $DOP_1$ is equal to 0, and phase rotation amount $\phi_2$ for applying Doppler shift amount $DOP_2$ is equal to $\pi$. Likewise, in equation 1, for example, in a case where the number of Doppler multiplexes $N_{DM}$ is equal to 4, phase rotation amount $\phi_1$ for applying Doppler shift amount $DOP_1$ is equal to 0, phase rotation amount $\phi_2$ for applying Doppler shift amount $DOP_2$ is equal to $\pi/2$, phase rotation amount $\phi_3$ for applying Doppler shift amount $DOP_3$ is equal to $\pi$, and phase rotation amount $\phi_4$ for applying Doppler shift amount $DOP_4$ is equal to $3\pi/2$. In other words, intervals of phase rotation amounts $\phi_{ndm}$ for applying Doppler shift amounts $DOP_{ndm}$ are equal.

The assignment of phase rotation amounts for applying Doppler shift amounts $DOP_1$, $DOP_2$, ..., and $DOP_{DM}$ is not limited to that in this assignment method. For example, the assignment of phase rotation amounts given by equation 1 may be shifted. For example, phase rotation amounts may be assigned such that $\phi_{ndm}=2\pi(ndm)/N_{DM}$. Alternatively, phase rotation amounts $\phi_1$, $\phi_2$, ..., and $\phi_{DM}$ may be randomly assigned to Doppler shift amounts $DOP_1$, $DOP_2$, ..., and $DOP_{DM}$ using a phase-rotation-amount assignment table.

Coder 106 sets a phase rotation amount based on one or a plurality of orthogonal code sequences less than or equal to $N_{CM}$ for each of phase rotation amounts $\phi_1$, ..., and $\phi_{NDM}$ for applying $N_{DM}$ Doppler shift amounts output from Doppler shift setter 105. Further, coder 106 sets phase rotation amounts based on both the Doppler shift amounts and the orthogonal code sequences, that is, "coded Doppler phase rotation amounts" for generating coded Doppler multiplexed signals, and outputs the phase rotation amounts to phase rotators 107.

The following describes an example of the operation of coder 106.

For example, coder 106 uses $N_{CM}$ orthogonal code sequences, the number of which is equal to the number of codes (in other words, the number of code multiplexes) with code length Loc.

In the following, $N_{CM}$ orthogonal code sequences with code length Loc are represented by $Code_{ncm}=\{OC_{ncm}(1), OC_{ncm}(2), ..., OC_{ncm}(Loc)\}$. $OC_{ncm}(noc)$ denotes the noc-th code element in the ncm-th orthogonal code sequence Code$_{ncm}$. Here, noc denotes the index of a code element, and noc=1, . . . , Loc.

The orthogonal code sequences used in coder 106 are, for example, codes that are orthogonal (uncorrelated) to each other. For example, orthogonal code sequences may be Walsh-Hadamard codes. In this case, code length Loc used to generate N$_{CM}$ orthogonal code sequences, the number of which is equal to the number of codes, is given by following equation 2.

$$\text{Loc}=2^{ceil[log2(N_{CM})]} \quad \text{(Equation 2)}$$

Here, ceil[x] denotes the operator (ceiling function) that outputs a minimum integer greater than or equal to real number x.

For example, in a case where N$_{CM}$=2, code length Loc of Walsh-Hadamard codes is equal to 2, and orthogonal code sequences are represented by Code$_1$={1, 1} and Code$_2$={1, −1}. When a code element in an orthogonal code sequence is 1, 1=exp(j0), with the phase thereof being 0. When a code element in an orthogonal code sequence is −1, −1=exp(j7), with the phase thereof being 7.

Further, for example, in a case where N$_{CM}$=4, code length Loc is equal to 4, and orthogonal code sequences are represented by Code$_1$={1, 1, 1, 1}, Code$_2$={1, −1, 1, −1}, Code$_3$={1, 1, −1, −1}, and Code$_4$={1, −1, −1, 1}.

Code elements in an orthogonal code sequence are not limited to real numbers and may include complex number values. For example, an orthogonal code sequence Code$_{ncm}$ given by following equation 3 may be used. Here, ncm=1, . . . , N$_{CM}$. In this case, a code length used to generate N$_{CM}$ orthogonal code sequences, the number of which is equal to the number of codes, is represented by Loc=N$_{CM}$.

[3]

$$\text{Code}_{ncm} = \left\{ 1, \exp\left[j\frac{2\pi}{N_{CM}}(ncm-1)\right], \right.$$
$$\exp\left[j\frac{2\pi}{N_{CM}}2(ncm-1)\right],$$
$$\left. \ldots \exp\left[j\frac{2\pi}{N_{CM}}(N_{CM}-1)(ncm-1)\right] \right\} \quad \text{(Equation 3)}$$

For example, in a case where N$_{CM}$=3, code length Loc is equal to 3 (=N$_{CM}$), and coder 106 generates orthogonal code sequences represented by Code$_1$={1, 1, 1}, Code$_2$={1, exp(j2π/3), exp(j4π/3)}, and Code$_3$={1, exp(−j2π/3), exp(−j4π/3)}.

For example, in a case where N$_{CM}$=4, code length Loc is equal to 4 (=N$_{CM}$), and coder 106 generates orthogonal code sequences represented by Code$_1$={1, 1, 1, 1}, Code$_2$={1, j, −1, −j}, Code$_3$={1,−1,1,−1}, and Code$_4$={1, −j, −1, j}. Here, j is the imaginary unit.

In Coder 106, the number of code multiplexes (hereinafter referred to as the number of coded Doppler multiplexes) for coding a Doppler multiplexed signal that uses the ndm-th Doppler shift amount DOP$_{ndm}$ output from Doppler shift setter 105 is represented by "N$_{DOP\_CODE}$(ndm)". Here, ndm=1, . . . , NDM.

Coder 106 sets the number of coded Doppler multiplexes N$_{DOP\_CODE}$(ndm) so that, for example, the sum of the numbers of coded Doppler multiplexes N$_{DOP\_CODE}$(1), N$_{DOP\_CODE}$(2), . . . , and N$_{DOP\_CODE}$(NDM) for coding Doppler multiplexed signals is equal to the number Nt of transmit antennas 108 used for multiplexing transmission. In other words, coder 106 sets the number of coded Doppler multiplexes N$_{DOP\_CODE}$(ndm) so as to satisfy following equation 4. This enables radar apparatus 10 to perform multiplexing transmission in the Doppler domain and the code domain (hereinafter referred to as coded Doppler multiplexing transmission) using Nt transmit antennas 108.

[4]

$$\sum_{ndm=1}^{N_{DM}} N_{DOP\_CODE}(ndm) = Nt \quad \text{(Equation 4)}$$

Here, coder 106 sets, for example, the numbers of coded Doppler multiplexes N$_{DOP\_CODE}$(1), N$_{DOP\_CODE}$(2), . . . , and N$_{DOP\_CODE}$(NDM) so as to include different numbers of coded Doppler multiplexes in the range greater than or equal to 1 and less than or equal to N$_{CM}$. For example, coder 106 sets the numbers of coded Doppler multiplexes such that not all of the numbers of coded Doppler multiplexes are set to N$_{CM}$, which is equal to the number of codes, but at least one of the numbers of coded Doppler multiplexes is set to be smaller than N$_{CM}$. In other words, coder 106 sets the numbers of coded Doppler multiplexes for Doppler multiplexed signals to be non-uniform. With this setting, for example, radar apparatus 10 can individually separate and receive signals transmitted from plural transmit antennas 108 in a coded Doppler multiplexed manner through reception processing described below.

Coder 106 sets, in the m-th transmission period Tr, coded Doppler phase rotation amount ψ$_{ndop\_code(ndm), ndm}$(m) given by following equation 5 for phase rotation amount φ$_{ndm}$ for applying the ndm-th Doppler shift amount DOP$_{ndm}$ and outputs coded Doppler phase rotation amount ψ$_{ndop\_code(ndm), ndm}$(m) to phase rotator 107.

[5]

$$\psi_{ndop\_code(ndm),ndm}(m) = \quad \text{(Equation 5)}$$
$$\text{floor}\left[\frac{(m-1)}{Loc}\right] \times \phi_{ndm} + \text{angle}[OC_{ndop\_code(ndm)}(\text{OC\_INDEX})]$$

Here, the subscript "ndop_code(ndm)" represents an index less than or equal to the number of coded Doppler multiplexes N$_{DOP\_CODE}$(ndm) for phase rotation amount φ$_{ndm}$ for applying Doppler shift amount DOP$_{ndm}$. For example, ndop_code(ndm)=1, . . . , N$_{DOP\_CODE}$(ndm). Further, angle[x] denotes the operator that outputs a radian phase of real number x. For example, angle[1]=0, angle[−1]=π, angle[j]=π/2, and angle[−j]=−π/2. Further, floor[x] denotes the operator that outputs a maximum integer not greater than real number x, where j is the imaginary unit For example, as given by equation 5, coded Doppler phase rotation amount ψ$_{ndop\_code(ndm), ndm}$(m) provides a constant phase rotation amount for applying Doppler shift amount DOP$_{ndm}$ (for example, the first term in equation 5) for the duration of Loc transmission periods, the number of which is equal to the code length used for coding, and applies a corresponding phase rotation amount to each of Loc code elements OC$_{ndop\_code(ndm)}$(1), . . . , and OC$_{ndop\_code(ndm)}$(Loc) of code Code$_{ndop\_code(ndm)}$ used for coding (the second term in equation 5).

Further, coder 106 outputs, for each transmission period (Tr), orthogonal code element index OC_INDEX to radar receiver 200 (output switching section 209 described below). OC_INDEX represents an orthogonal code element index that indicates the elements of orthogonal code sequence $\text{Code}_{ndop\_code(ndm)}$. OC_INDEX cyclically varies in the range of 1 to Loc for each transmission period (Tr), as given by following equation 6.

OC_INDEX=mod($m$−1,Loc)+1　　　　　　　　(Equation 6)

Here, mod(x, y) denotes a modulo operator and is a function that outputs the remainder of x divided by y. Further, m=1, . . . , Nc. Nc denotes the number of transmission periods used for radar position determination (hereinafter referred to as the "number of transmissions of radar transmission signals"). The number Nc of transmissions of radar transmission signals is set to an integer multiple (Ncode times) of Loc. For example, Nc=Loc×Ncode.

Next, an example method for setting the numbers of coded Doppler multiplexes $N_{DOP\_CODE}$(ndm) for Doppler multiplexed signals to be non-uniform using coder 106 will be described.

For example, coder 106 sets the number of orthogonal code sequences (in other words, the number of code multiplexes or the number of codes) $N_{CM}$ satisfying the condition below. For example, the number of orthogonal code sequences $N_{CM}$ and the number of Doppler multiplexes $N_{DM}$ satisfy the following relationship for the number Nt of transmit antennas 108 used for multiplexing transmission.

(Number of orthogonal code sequences $N_{CM}$)×(number of Doppler multiplexes $N_{DM}$)>number $Nt$ of transmit antennas used for multiplexing transmission For example, among the numbers of orthogonal code sequences $N_{CM}$ and the numbers of Doppler multiplexes $N_{DM}$ satisfying the above-described condition, the use of a combination having a smaller value of the product ($N_{CM}$× $N_{DM}$) is desirable in terms of both characteristics and complexity of circuit configuration. Note that among the numbers of orthogonal code sequences $N_{CM}$ and the numbers of Doppler multiplexes $N_{DM}$ satisfying the above-described condition, a combination having a smaller value of the product ($N_{CM} \times N_{DM}$) is not restrictive, and any other combination may be applied.

For example, in a case where Nt=3, the combination of $N_{DM}$=2 and $N_{CM}$=2 is desirable.

Figure 3A:
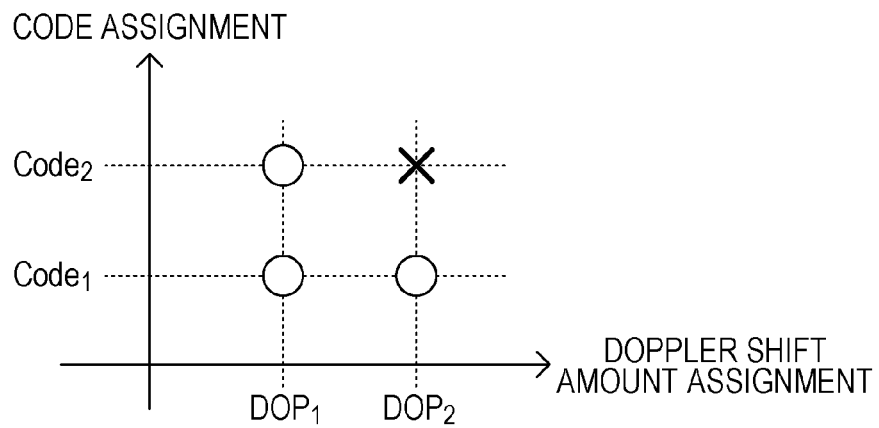
FIGS. 3A and 3B are diagrams illustrating an example of the assignment of Doppler shift amounts and orthogonal codes according to Embodiment 1.
Figure 3B:
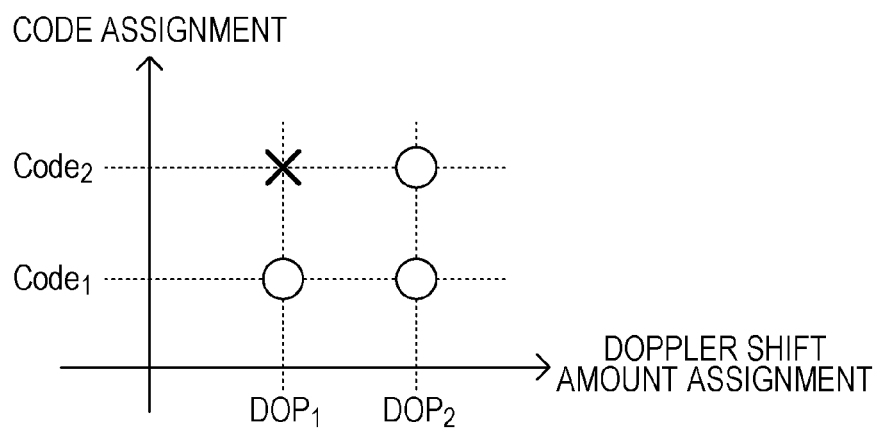

In this case, the assignment of Doppler shift amounts $DOP_1$ and $DOP_2$ and orthogonal codes $Code_1$ and $Code_2$ is determined in accordance with, for example, as illustrated in FIGS. 3A and 3B, the setting of $N_{DOP\_CODE}(1)$ and $N_{DOP\_CODE}(2)$. In FIGS. 3A and 3B, white circles ("◯") represent Doppler shift amounts and orthogonal codes used, and crosses ("×") represent Doppler shift amounts and orthogonal codes not used (the same applies to the following description).

For example, FIG. 3A illustrates an example where $N_{DOP\_CODE}(1)$=2 and $N_{DOP\_CODE}(2)$=1, and FIG. 3B illustrates an example where $N_{DOP\_CODE}(1)$=1 and $N_{DOP\_CODE}(2)$=2.

Figure 4A:
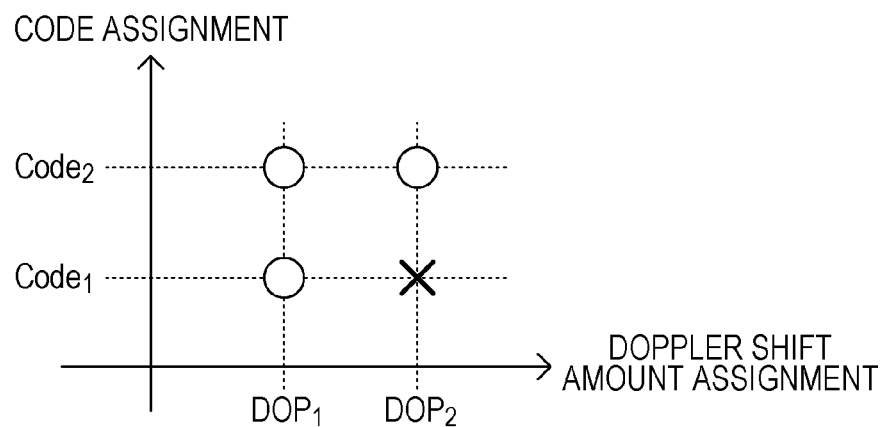
FIGS. 4A and 4B are diagrams illustrating an example of the assignment of Doppler shift amounts and orthogonal codes according to Embodiment 1.
Figure 4B:
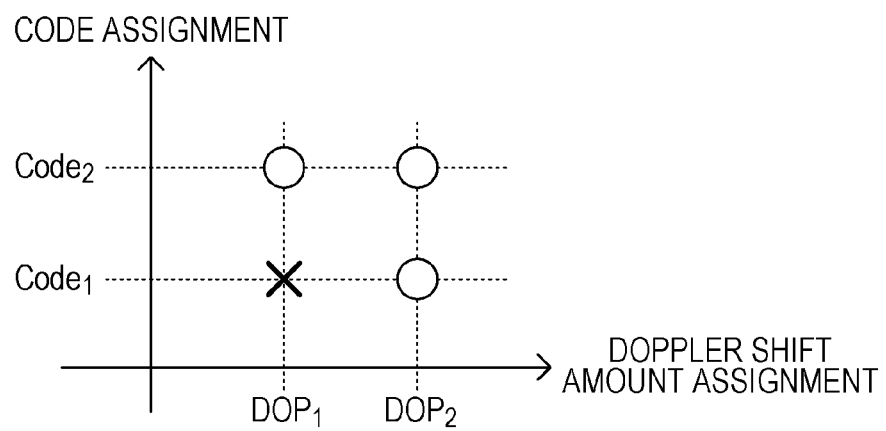

In FIGS. 3A and 3B, $Code_1$ is used for the Doppler shift amount corresponding to the number of coded Doppler multiplexes $N_{DOP\_CODE}$(ndm)=1 (for example, $DOP_2$ in FIGS. 3A and $DOP_1$ in FIG. 3B), which is not restrictive. For example, in a case where $N_{DOP\_CODE}(1)$<$N_{CM}$ or $N_{DOP\_CODE}(2)$<$N_{CM}$, as illustrated in FIGS. 4A and 4B, $Code_2$ may be used in place of $Code_1$ for the Doppler shift amount corresponding to $N_{DOP\_CODE}$(ndm)=1 (for example, $DOP_2$ in FIG. 4A and $DOP_1$ in FIG. 4B).

For example, in a case where Nt=4 or 5, the combination of $N_{DM}$=3 and $N_{CM}$=2 or the combination of $N_{DM}$=2 and $N_{CM}$=3 is desirable.

Figure 5A:
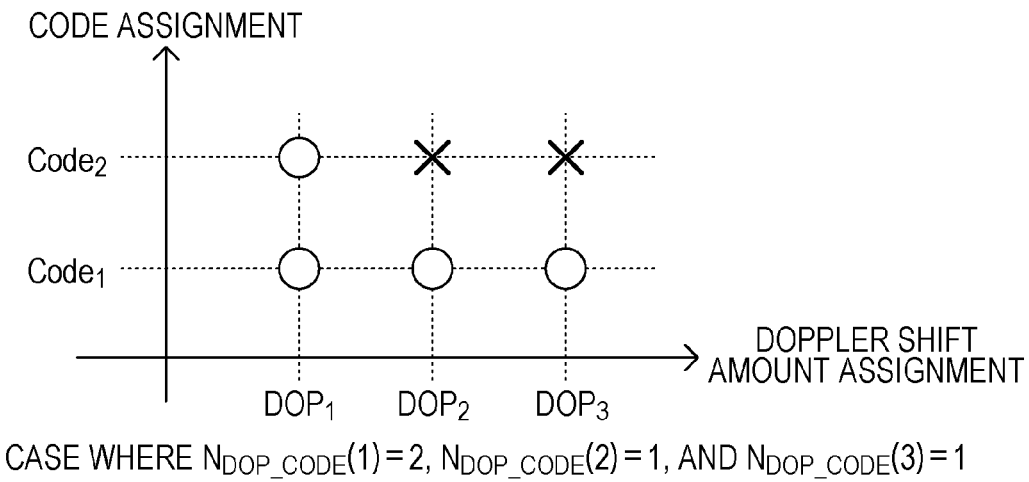
FIGS. 5A to 5C are diagrams illustrating an example of the assignment of Doppler shift amounts and orthogonal codes according to Embodiment 1.
Figure 5B:
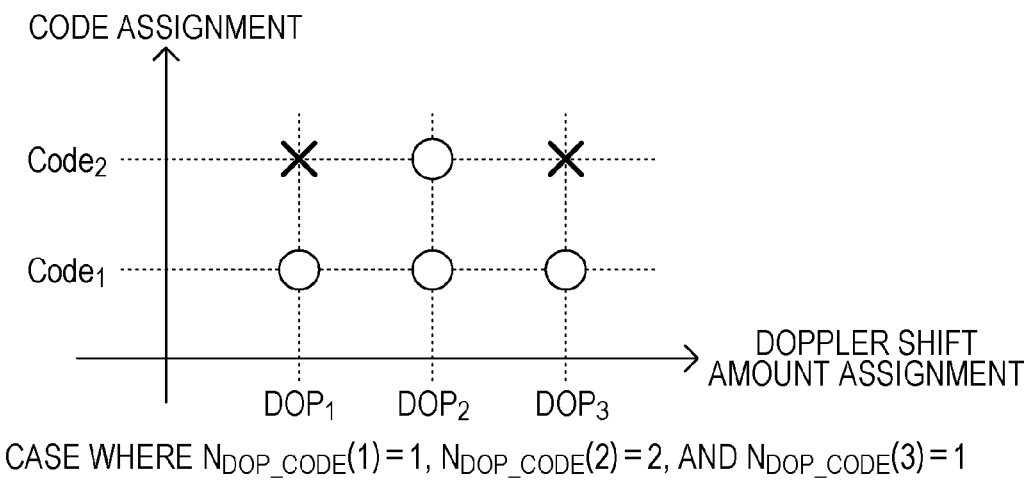
Figure 5C:
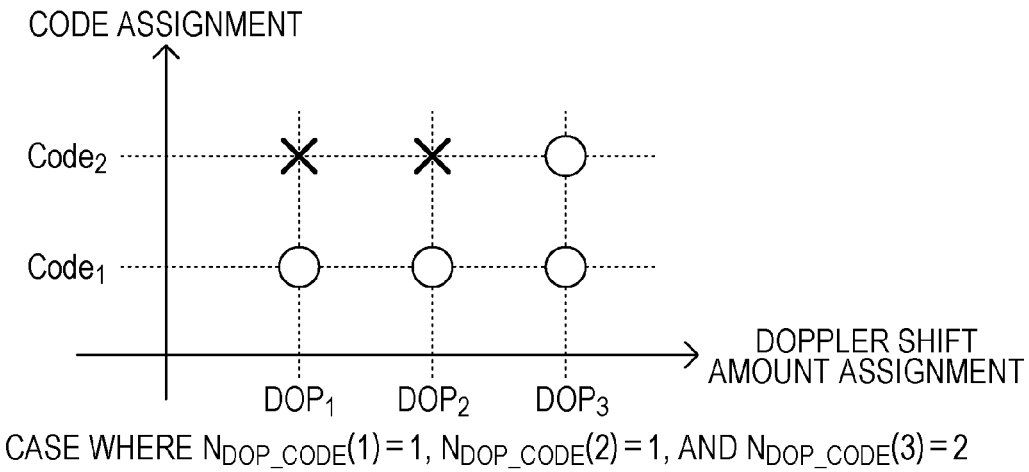

FIGS. 5A to 5C illustrate a case where Nt=4, $N_{DM}$=3, and $N_{CM}$=2, as an example. For example, the assignment of Doppler shift amounts $DOP_1$, $DOP_2$, and $DOP_3$ and orthogonal codes $Code_1$ and $Code_2$ is determined in accordance with, as illustrated in FIGS. 5A to 5C, the setting of $N_{DOP\_CODE}(1)$, $N_{DOP\_CODE}(2)$, and $N_{DOP\_CODE}(3)$.

For example, FIG. 5A illustrates an example where $N_{DOP\_CODE}(1)$=2, $N_{DOP\_CODE}(2)$=1, and $N_{DOP\_CODE}(3)$=1, FIG. 5B illustrates an example where $N_{DOP\_CODE}(1)$=1, $N_{DOP\_CODE}(2)$=2, and $N_{DOP\_CODE}(3)$=1, and FIG. 5C illustrates an example where $N_{DOP\_CODE}(1)$=1, $N_{DOP\_CODE}(2)$=1, and $N_{DOP\_CODE}(3)$=2.

Figure 6A:
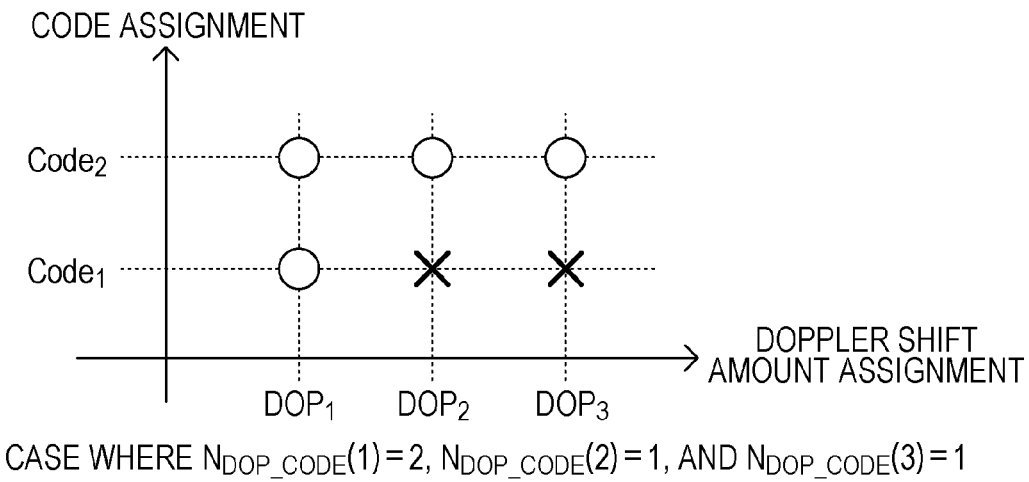
FIGS. 6A to 6C are diagrams illustrating an example of the assignment of Doppler shift amounts and orthogonal codes according to Embodiment 1.
Figure 6B:
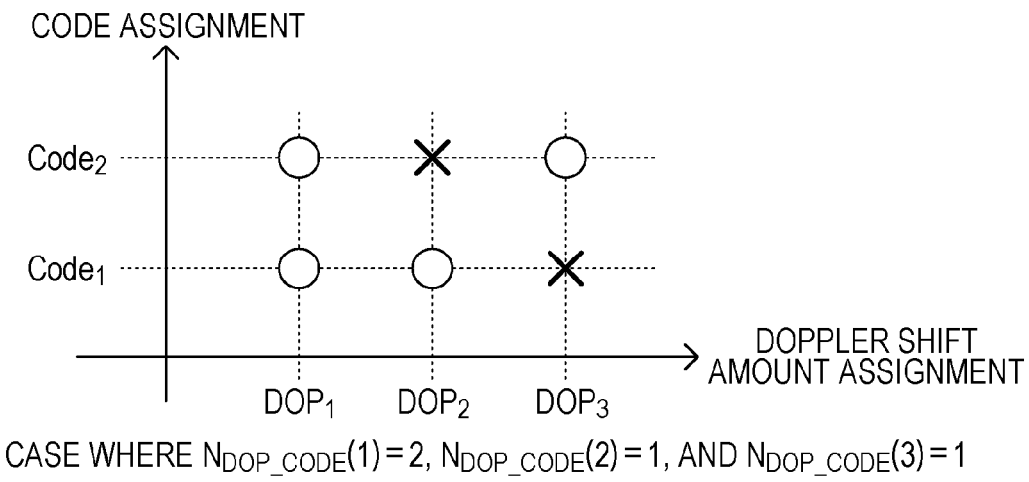
Figure 6C:
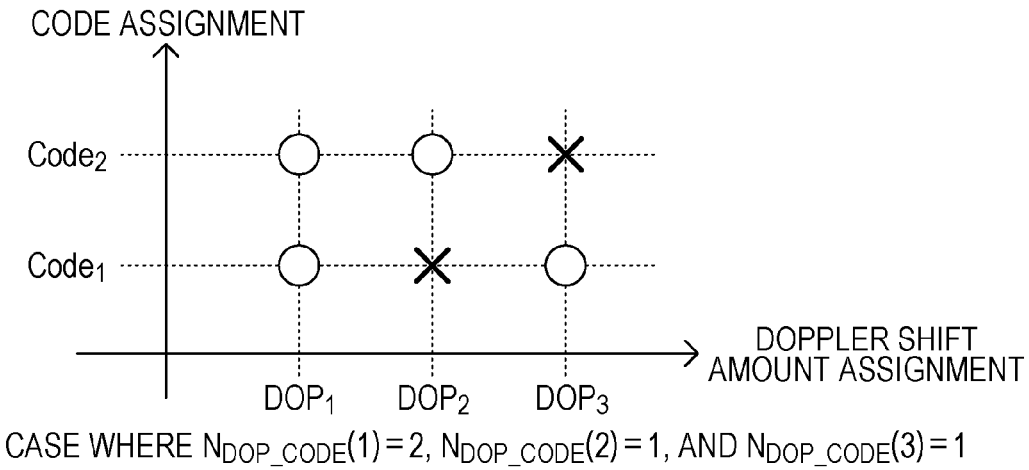

In FIGS. 5A to 5C, $Code_1$ is used for the Doppler shift amount corresponding to the number of coded Doppler multiplexes $N_{DOP\_CODE}$(ndm)=1, which is not restrictive. For example, for settings in which the numbers of coded Doppler multiplexes are each smaller than $N_{CM}$, $Code_2$ may be used in place of $Code_1$, as illustrated in FIG. 6A, or both $Code_1$ and $Code_2$ may be used, as illustrated in FIG. 6B or FIG. 6C.

Figure 7A:
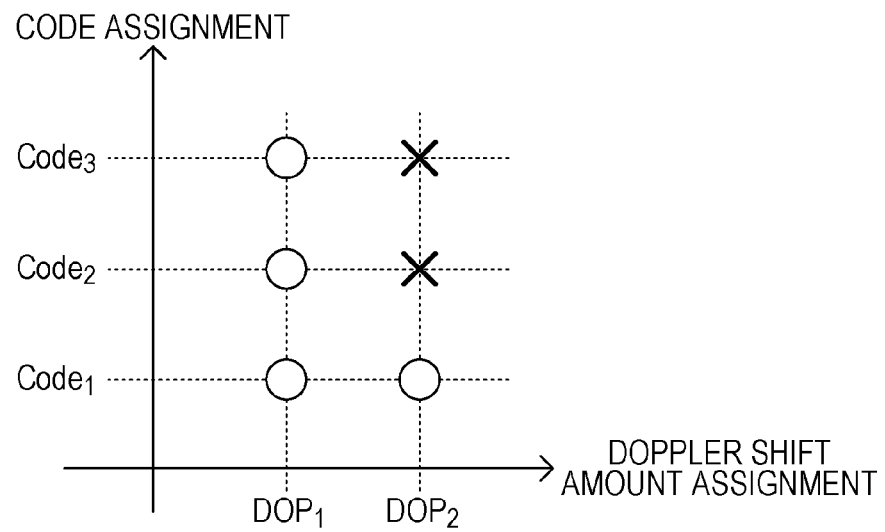
FIGS. 7A and 7B are diagrams illustrating an example of the assignment of Doppler shift amounts and orthogonal codes according to Embodiment 1.
Figure 7B:
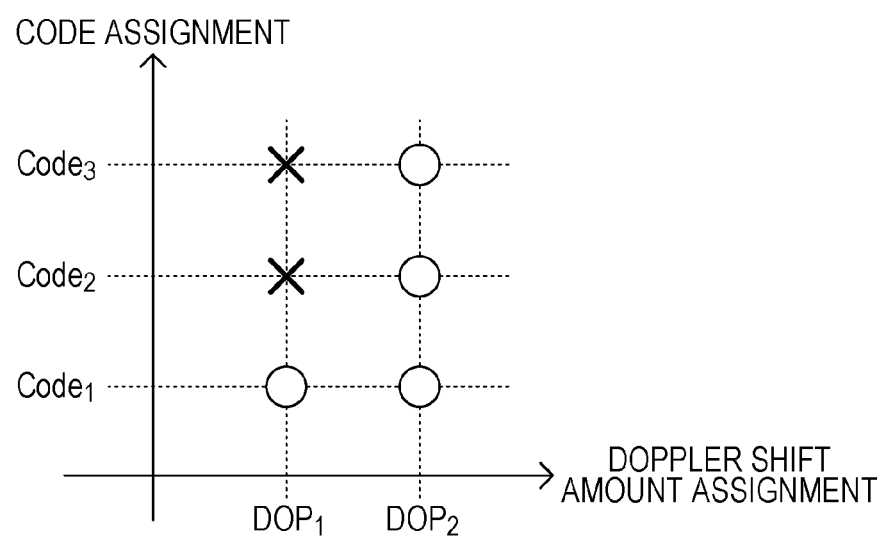

FIGS. 7A and 7B illustrate a case where Nt=4, $N_{DM}$=2, and $N_{CM}$=3, as another example. For example, the assignment of Doppler shift amounts $DOP_1$ and $DOP_2$ and orthogonal codes $Code_1$, $Code_2$, and $Code_3$ is determined in accordance with, as illustrated in FIGS. 7A and 7B, the setting of $N_{DOP\_CODE}(1)$ and $N_{DOP\_CODE}(2)$.

For example, FIG. 7A illustrates an example where $N_{DOP\_CODE}(1)$=3 and $N_{DOP\_CODE}(2)$=1, and FIG. 7B illustrates an example where $N_{DOP\_CODE}(1)$=1 and $N_{DOP\_CODE}(2)$=3.

Figure 8A:
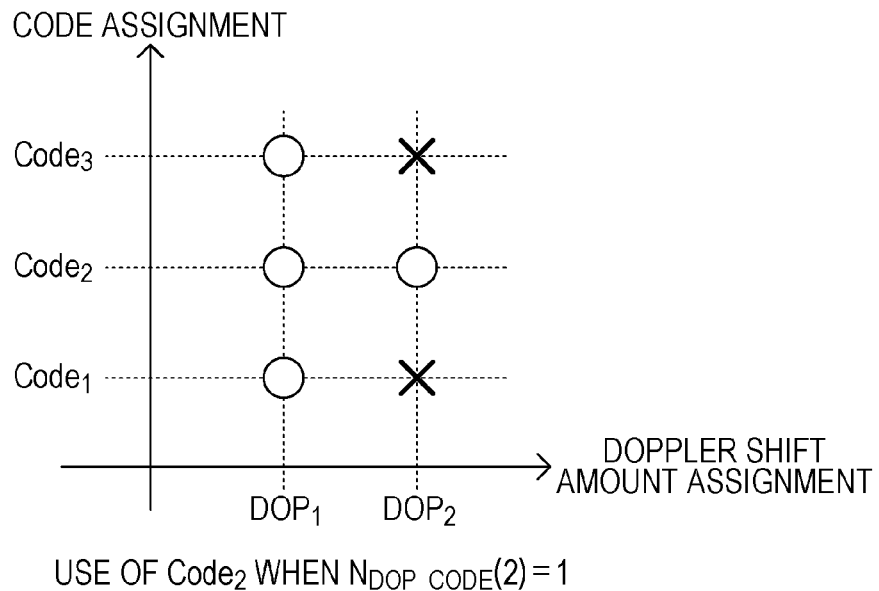
FIGS. 8A and 8B are diagrams illustrating an example of the assignment of Doppler shift amounts and orthogonal codes according to Embodiment 1.
Figure 8B:
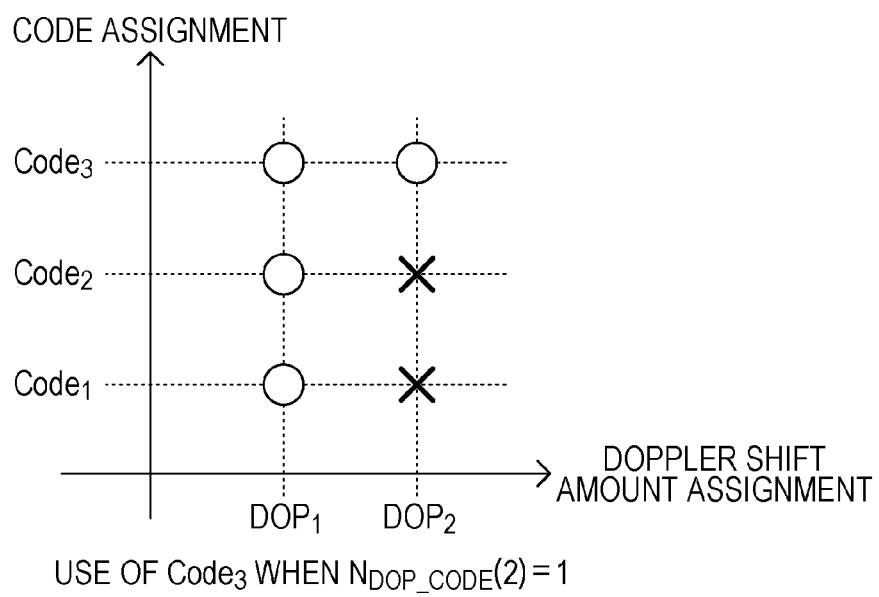

In FIGS. 7A and 7B, $Code_1$ is used for the Doppler shift amount corresponding to the number of coded Doppler multiplexes $N_{DOP\_CODE}$(ndm)=1, which is not restrictive. For example, when $N_{DOP\_CODE}(1)$<$N_{CM}$ or $N_{DOP\_CODE}(2)$<$N_{CM}$, $Code_2$ may be used in place of $Code_1$, as illustrated in FIG. 8A, or $Code_3$ may be used in place of $Code_1$, as illustrated in FIG. 8B.

Figure 9A:
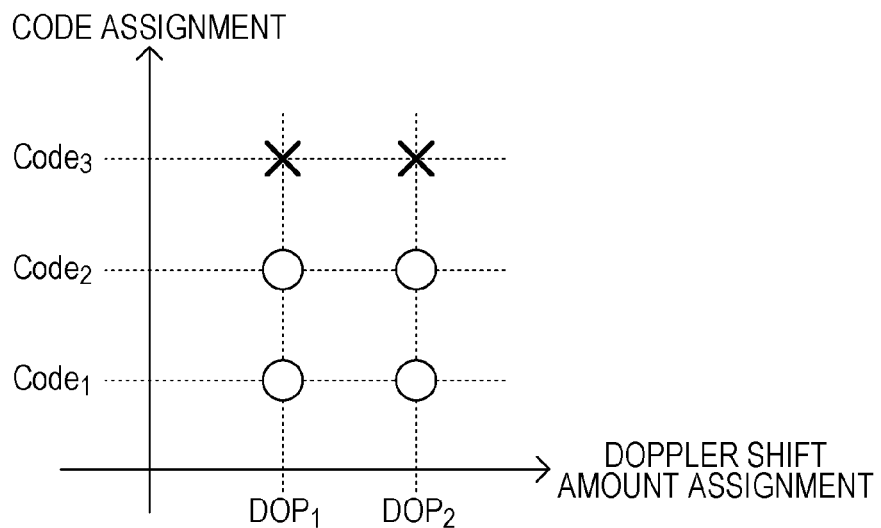
FIGS. 9A and 9B are diagrams illustrating an example of the assignment of Doppler shift amounts and orthogonal codes according to Embodiment 1.
Figure 9B:
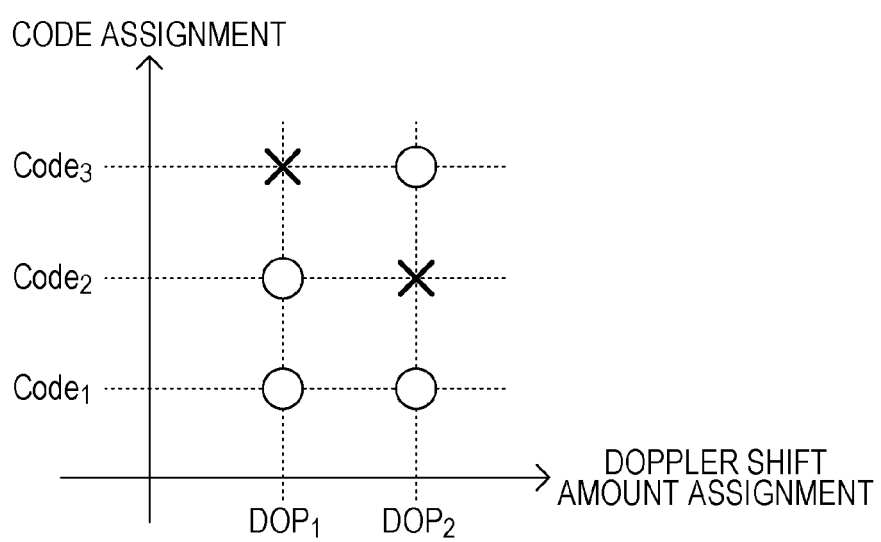

For example, in a case where Nt=4, $N_{DM}$=2, and $N_{CM}$=3, if, as illustrated in FIGS. 9A and 9B, $N_{DOP\_CODE}(1)$=2 and $N_{DOP\_CODE}(2)$=2 are set, the numbers of coded Doppler multiplexes $N_{DOP\_CODE}$ are uniform for Doppler shift amounts $DOP_1$ and $DOP_2$. In this setting, for example, it is assumed that, as illustrated in FIG. 9A, the same set of codes (for example, $Code_1$ and $Code_2$) is assigned to Doppler shift amounts $DOP_1$ and $DOP_2$, or that, as illustrated in FIG. 9B, different sets of codes are assigned to Doppler shift amounts $DOP_1$ and $DOP_2$. In either FIG. 9A or FIG. 9B, radar apparatus 10 is capable of identifying signals transmitted from plural transmit antennas 108 in a coded Doppler multiplexed manner if the Doppler frequency range is a Doppler frequency range within the range of $1/N_{CM}$ compared with the maximum Doppler velocity at the time of single-antenna transmission.

In this embodiment, in contrast, for example, in a case where Nt=4, NDM=2, and $N_{CM}$=3, the numbers of coded Doppler multiplexes $N_{DOP\_CODE}$ are set to be non-uniform for Doppler shift amounts $DOP_1$ and $DOP_2$, such as $N_{DOP\_CODE}(1)$=3 and $N_{DOP\_CODE}(2)$=1, or $N_{DOP\_CODE}(1)$=1 and $N_{DOP\_CODE}(2)$=3, as illustrated in FIGS. 7A and 7B. In this setting, the Doppler frequency range can be equivalent to, for example, the maximum Doppler velocity at the time of single-antenna transmission (the details will be described below).

For example, in a case where Nt=6 or 7, the combination of NDM=4 and $N_{CM}$=2 or the combination of $N_{DM}$=2 and $N_{CM}$=4 is desirable.

Figure 10A:
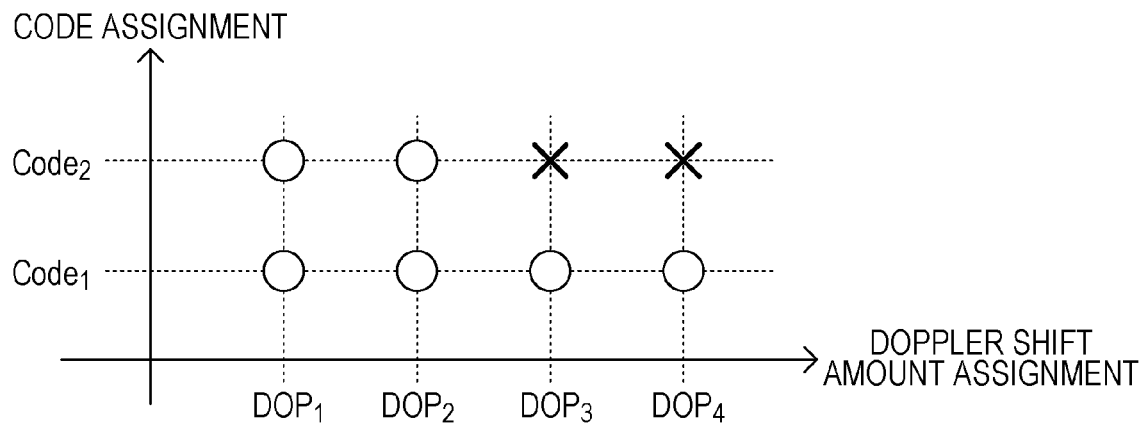
FIGS. 10A and 10B are diagrams illustrating an example of the assignment of Doppler shift amounts and orthogonal codes according to Embodiment 1.
Figure 10B:
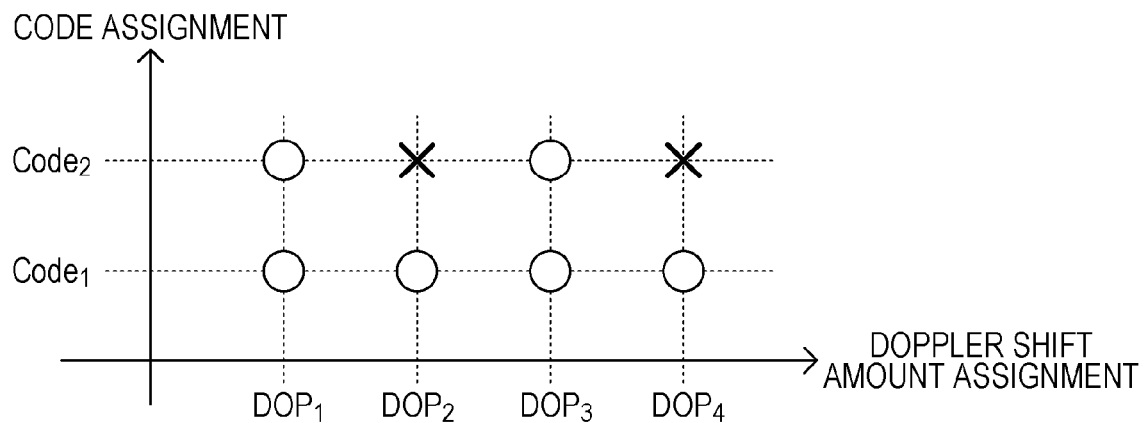

FIGS. 10A and 10B illustrate a case where Nt=6, $N_{DM}$=4, and $N_{CM}$=2, as an example. For example, the assignment of Doppler shift amounts $DOP_1$, $DOP_2$, $DOP_3$, and $DOP_4$ and orthogonal codes $Code_1$ and $Code_2$ is determined in accordance with, as illustrated in FIGS. 10A and 10B, the setting of $N_{DOP\_CODE}(1)$, $N_{DOP\_CODE}(2)$, $N_{DOP\_CODE}(3)$, and $N_{DOP\_CODE}(4)$.

For example, FIG. 10A illustrates an example where $N_{DOP\_CODE}(1) = N_{DOP\_CODE}(2) = 2$ and $N_{DOP\_CODE}(3) = N_{DOP\_CODE}(4) = 1$, and FIG. 10B illustrates an example where $N_{DOP\_CODE}(1) = N_{DOP\_CODE}(3) = 2$ and $N_{DOP\_CODE}(2) = N_{DOP\_CODE}(4) = 1$.

Figure 11A:
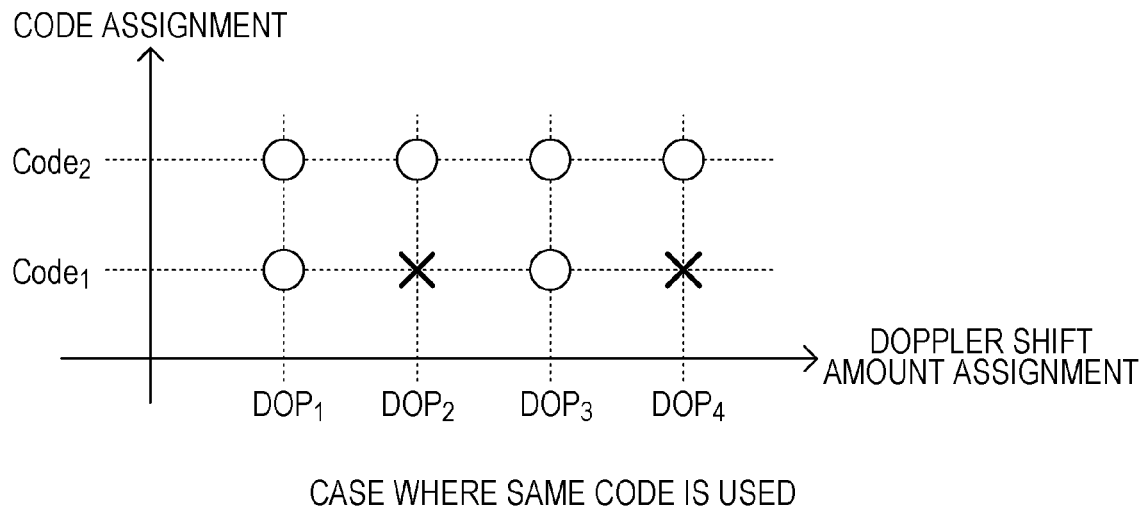
FIGS. 11A and 11B are diagrams illustrating an example of the assignment of Doppler shift amounts and orthogonal codes according to Embodiment 1.
Figure 11B:
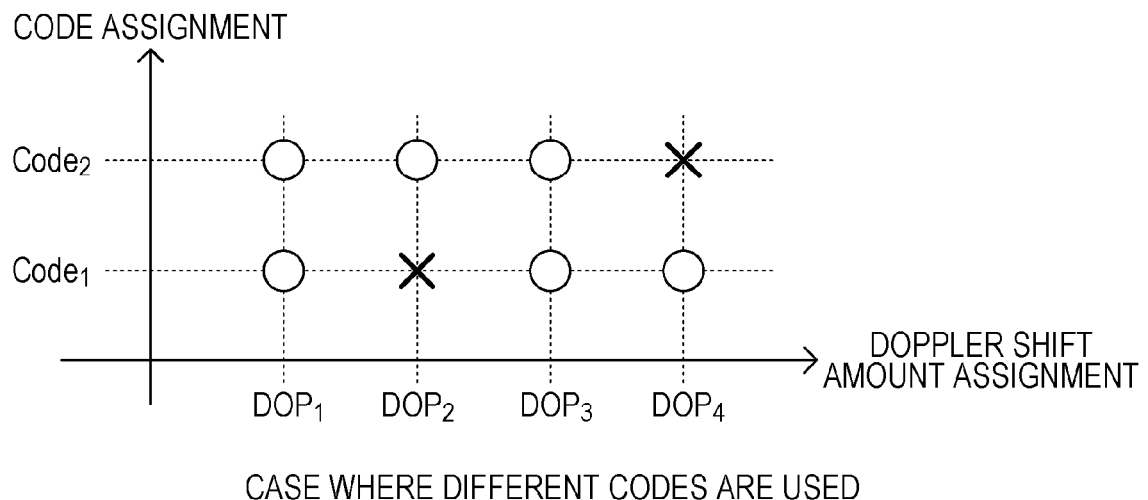

In FIGS. 10A and 10B, $Code_1$ is used for the Doppler shift amount corresponding to the number of coded Doppler multiplexes $N_{DOP\_CODE}(ndm) = 1$, which is not restrictive. For example, for settings in which the numbers of coded Doppler multiplexes are each smaller than $N_{CM}$, $Code_2$ may be used in place of $Code_1$, as illustrated in FIG. 11A, or both $Code_1$ and $Code_2$ may be used, as illustrated in FIG. 11B.

For example, as illustrated in FIGS. 10A and 10B, in a case where $Nt=6$, $N_{DM}=4$, and $N_{CM}=2$, there are two Doppler shift amounts that do not use all the codes. Further, for example, among $N_{DM}=4$, for combinations of Doppler shift amounts that do not use all the codes, there are six combinations ($=_4C_2$) of two Doppler shift amounts selected from four Doppler shift amounts, and in each combination, there are four combinations ($=N_{CM} \times N_{CM}$) of codes used. Accordingly, in a case where $Nt=6$, $NDM=4$, and $N_{CM}=2$, there is a total of 24 combinations of Doppler shift amounts DOP and orthogonal codes Code that are assigned.

Likewise, for example, in a case where $Nt=8$, the combination of $N_{DM}=3$ and $N_{CM}=3$ or the combination of $n_{DM}=5$ and $N_{CM}=2$ is desirable. For example, in a case where $Nt=9$, the combination of $N_{DM}=5$ and $N_{CM}=2$ is desirable. For example, in a case where $Nt=10$, the combination of $N_{DM}=6$ and $N_{CM}=2$ or the combination of $NDM=4$ and $N_{CM}=3$ is desirable. The number $Nt$ of transmit antennas 108 is not limited to that in the example described above, and an exemplary embodiment of the present disclosure is also applicable to $Nt=11$ or more.

Next, an example of how coded Doppler phase rotation amount $\psi_{ndop\_code(ndm),\ ndm}(m)$ is set will be described.

For example, a description will be given of a case where in coder 106, the number of transmit antennas used for multiplexing transmission $Nt=3$, the number of Doppler multiplexes $N_{DM}=2$, $N_{CM}=2$, and orthogonal code sequences $Code_1 = \{1, 1\}$ and $Code_2 = \{1, -1\}$ with code length $Loc=2$ are used. In this case, for example, if the numbers of coded Doppler multiplexes are set such that $N_{DOP\_CODE}(1)=1$ and $N_{DOP\_CODE}(2)=2$, coder 106 sets coded Doppler phase rotation amounts $\psi_{1,\ 1}(m)$, $\psi_{1,\ 2}(m)$, and $\psi_{2,\ 2}(m)$ given by following equations 7 to 9 and outputs coded Doppler phase rotation amounts $\psi_{1,\ 1}(m)$, $\psi_{1,\ 2}(m)$, and $\psi_{2,\ 2}(m)$ to phase rotators 107.

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\} = \{0,0,\phi_1,\phi_1,2\phi_1,2\phi_1,3\phi_1,3\phi_1,\ldots\} \quad \text{(Equation 7)}$$

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\} = \{0,0,\phi_2,\phi_2,2\phi_2,2\phi_2,3\phi_2,3\phi_2,\ldots\} \quad \text{(Equation 8)}$$

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\} = \{0,\pi,\phi_2,\phi_2+\pi,2\phi_2,2\phi_2+\pi,3\phi_2,3\phi_2+\pi,\ldots\} \quad \text{(Equation 9)}$$

Here, as an example, the phase rotation amount for applying Doppler shift amount $DOP_{ndm}$ is given by $\phi_{ndm} = 2\pi(ndm-1)/N_{DM}$ in equation 1, and phase rotation amount $\phi_1$ for applying Doppler shift amount $DOP_1$, which is equal to 0, and phase rotation amount $\phi_2$ for applying Doppler shift amount $DOP_2$, which is equal to $\pi$, are used. In this case, coder 106 sets coded Doppler phase rotation amounts $\psi_{1,\ 1}(m)$, $\psi_{1,\ 2}(m)$, and $\psi_{2,\ 2}(m)$ given by following equations 10 to 12 and outputs coded Doppler phase rotation amounts $\psi_{1,\ 1}(m)$, $\psi_{1,\ 2}(m)$, and $\psi_{2,\ 2}(m)$ to phase rotators 107. Here, $m=1, \ldots, Nc$. Here, a modulo operation for $2\pi$ is performed, and results are expressed in radians ranging from 0 or more to less than $2\pi$ (the same applies to the following description).

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\} = \{0,0,0,0,0,0,0,0,\ldots\} \quad \text{(Equation 10)}$$

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\} = \{0,0,\pi,\pi,0,0,\pi,\pi,\ldots\} \quad \text{(Equation 11)}$$

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\} = \{0,\pi,\pi,0,0,\pi,\pi,0,\ldots\} \quad \text{(Equation 11)}$$

As given by equations 10 to 12, when a phase rotation amount is set to $\phi_{ndm} = 2\pi(ndm-1)/N_{DM}$, into which $2\pi$ is equally divided, coded Doppler phase rotation amounts $\psi_{1,\ 1}(m)$, $\psi_{1,\ 2}(m)$, and $\psi_{2,\ 2}(m)$ are changed in transmission periods given by $N_{DM} \times N_{CM} = 2 \times 2 = 4$.

As another example, the phase rotation amount for applying Doppler shift amount $DOP_{ndm}$ may be set to $\phi_{ndm} = 2\pi(ndm)/NDM$, and phase rotation amount $\phi_1$ for applying Doppler shift amount $DOP_1$, which is equal to $\pi$, and phase rotation amount $\phi_2$ for applying Doppler shift amount $DOP_2$, which is equal to 0, may be used. In this case, coder 106 sets coded Doppler phase rotation amounts $\psi_{1,\ 1}(m)$, $\psi_{1,\ 2}(m)$, and $\psi_{2,\ 2}(m)$ given by following equations 13 to 15 and outputs coded Doppler phase rotation amounts $\psi_{1,\ 1}(m)$, $\psi_{1,\ 2}(m)$, and $\psi_{2,\ 2}(m)$ to phase rotators 107. Here, $m=1, \ldots, Nc$.

$$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\} = \{0,0,\pi,\pi,0,0,\pi,\pi,\ldots\} \quad \text{(Equation 13)}$$

$$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\} = \{0,0,0,0,0,0,0,0,\ldots\} \quad \text{(Equation 14)}$$

$$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\} = \{0,\pi,0,\pi,0,\pi,0,\pi,\ldots\} \quad \text{(Equation 15)}$$

As given by equations 10 to 12 or equations 13 to 15, the number of phases (for example, two, namely, 0 and $\pi$) used for a phase rotation amount (for example, a phase rotation amount for applying a Doppler shift amount) is smaller than the number of transmit antennas 108 used for multiplexing transmission, namely, $Nt=3$. In other words, as given by equations 10 to 12 or equations 13 to 15, the number of phases (for example, two, namely, 0 and $\pi$) used for a phase rotation amount for applying a Doppler shift amount is equal to the number of Doppler shift amounts used for multiplexing transmission (in other words, the number of Doppler multiplexes) $N_{DM}=2$.

Further, for example, a description will be given of a case where in coder 106, the number of transmit antennas used for multiplexing transmission $Nt=6$, the number of Doppler multiplexes $N_{DM}=4$, $N_{CM}=2$, and orthogonal code sequences $Code_1 = \{1, 1\}$ and $Code_2 = \{1, -1\}$ with code length $Loc=2$ are used. In this case, for example, if the numbers of coded Doppler multiplexes are set such that $N_{DOP\_CODE}(1)=1$, $N_{DOP\_CODE}(2)=1$, $N_{DOP\_CODE}(3)=2$, and $N_{DOP\_CODE}(4)=2$, coder 106 sets coded Doppler phase rotation amounts $\psi_{1,\ 1}(m)$, $\psi_{1,\ 2}(m)$, $\psi_{1,\ 3}(m)$, $\psi_{2,\ 3}(m)$, $\psi_{1,\ 4}(m)$, and $\psi_{2,\ 4}(m)$ given by following equations 16 to 21 and outputs coded Doppler phase rotation amounts $\psi_{1,\ 1}(m)$, $\psi_{1,2}(m)$, $\psi_{1,3}(m)$, $\psi_{2,3}(m)$, $\psi_{1,4}(m)$, and $\psi_{2,4}(m)$ to phase rotators 107. Here, m=1, . . . , Nc.

$$\{\psi_{1,1}(1), \psi_{1,1}(2), \psi_{1,1}(3), \psi_{1,1}(4), \psi_{1,1}(5), \psi_{1,1}(6), \psi_{1,1}(7)$$
$$\psi_{1,1}(8), \ldots \} = \{0, 0, \phi_1, \phi_1, 2\phi_1, 2\phi_1, 3\phi_1, 3\phi_1, \ldots\} \quad \text{(Equation 16)}$$

$$\{\psi_{1,2}(1), \psi_{1,2}(2), \psi_{1,2}(3), \psi_{1,2}(4), \psi_{1,2}(5), \psi_{1,2}(6), \psi_{1,2}(7)$$
$$\psi_{1,2}(8), \ldots \} = \{0, 0, \phi_2, \phi_2, 2\phi_2, 2\phi_2, 3\phi_2, 3\phi_2, \ldots\} \quad \text{(Equation 17)}$$

$$\{\psi_{1,3}(1), \psi_{1,3}(2), \psi_{1,3}(3), \psi_{1,3}(4), \psi_{1,3}(5), \psi_{1,3}(6), \psi_{1,3}(7)$$
$$\psi_{1,3}(8), \ldots \} = \{0, 0, \phi_3, \phi_3, 2\phi_3, 2\phi_3, 3\phi_3, 3\phi_3, \ldots\} \quad \text{(Equation 18)}$$

$$\{\psi_{2,3}(1), \psi_{2,3}(2), \psi_{2,3}(3), \psi_{2,3}(4), \psi_{2,3}(5), \psi_{2,3}(6), \psi_{2,3}(7)$$
$$\psi_{2,3}(8), \ldots \} = \{0, \pi, \phi_3, \phi_3 + \pi, 2\phi_3, 2\phi_3 + \pi, 3\phi_3, 3\phi_3 + \pi, \ldots\} \quad \text{(Equation 19)}$$

$$\{\psi_{1,4}(1), \psi_{1,4}(2), \psi_{1,4}(3), \psi_{1,4}(4), \psi_{1,4}(5), \psi_{1,4}(6), \psi_{1,4}(7)$$
$$\psi_{1,4}(8), \ldots \} = \{0, 0, \phi_4, \phi_4, 2\phi_4, 2\phi_4, 3\phi_4, 3\phi_4, \ldots\} \quad \text{(Equation 20)}$$

$$\{\psi_{2,4}(1), \psi_{2,4}(2), \psi_{2,4}(3), \psi_{2,4}(4), \psi_{2,4}(5), \psi_{2,4}(6), \psi_{2,4}(7)$$
$$\psi_{2,4}(8), \ldots \} = \{0, \pi, \phi_4, \phi_4 + \pi, 2\phi_4, 2\phi_4 + \pi, 3\phi_1, 3\phi_1 + \pi, \ldots\} \quad \text{(Equation 21)}$$

Here, as an example, the phase rotation amount for applying Doppler shift amount $DOP_{ndm}$ is given by $\phi_{ndm}=2\pi(ndm-1)/N_{DM}$, and phase rotation amount $\phi_1$ for applying Doppler shift amount $DOP_1$, which is equal to 0, phase rotation amount $\phi_2$ for applying Doppler shift amount $DOP_2$, which is equal to $\pi/2$, phase rotation amount $\phi_3$ for applying Doppler shift amount $DOP_3$, which is equal to $\pi$, and phase rotation amount $\phi_4$ for applying Doppler shift amount $DOP_4$, which is equal to $3\pi/2$, are used. In this case, coder 106 sets coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ given by following equations 22 to 27 and outputs coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ to phase rotators 107. Here, m=1, . . . , Nc.

[22]

$$\{\psi_{1,1}(1), \psi_{1,1}(2), \psi_{1,1}(3), \psi_{1,1}(4), \psi_{1,1}(5), \psi_{1,1}(6), \quad \text{(Equation 22)}$$
$$\psi_{1,1}(7), \psi_{1,1}(8), \ldots \} = \{0, 0, 0, 0, 0, 0, 0, 0, \ldots\}$$

[23]

$$\{\psi_{1,2}(1), \psi_{1,2}(2), \psi_{1,2}(3), \quad \text{(Equation 23)}$$
$$\psi_{1,2}(4), \psi_{1,2}(5), \psi_{1,2}(6), \psi_{1,2}(7),$$
$$\psi_{1,2}(8), \ldots \} = \left\{0, 0, \frac{\pi}{2}, \frac{\pi}{2}, \pi, \pi, \frac{3\pi}{2}, \frac{3\pi}{2}, \ldots\right\}$$

[24]

$$\{\psi_{1,3}(1), \psi_{1,3}(2), \psi_{1,3}(3), \psi_{1,3}(4), \psi_{1,3}(5), \psi_{1,3}(6), \quad \text{(Equation 24)}$$
$$\psi_{1,3}(7), \psi_{1,3}(8), \ldots \} = \{0, 0, \pi, \pi, 0, 0, \pi, \pi, \ldots\}$$

[25]

$$\{\psi_{2,3}(1), \psi_{2,3}(2), \psi_{2,3}(3), \psi_{2,3}(4), \psi_{2,3}(5), \psi_{2,3}(6), \quad \text{(Equation 25)}$$
$$\psi_{2,3}(7), \psi_{2,3}(8), \ldots \} = \{0, \pi, \pi, 0, 0, \pi, \pi, 0, \ldots\}$$

[26]

$$\{\psi_{1,4}(1), \psi_{1,4}(2), \psi_{1,4}(3), \quad \text{(Equation 26)}$$
$$\psi_{1,4}(4), \psi_{1,4}(5), \psi_{1,4}(6), \psi_{1,4}(7),$$
$$\psi_{1,4}(8), \ldots \} = \left\{0, 0, \frac{3\pi}{2}, \frac{3\pi}{2}, \pi, \pi, \frac{\pi}{2}, \frac{\pi}{2}, \ldots\right\}$$

[27]

$$\{\psi_{2,4}(1), \psi_{2,4}(2), \psi_{2,4}(3), \quad \text{(Equation 27)}$$
$$\psi_{2,4}(4), \psi_{2,4}(5), \psi_{2,4}(6), \psi_{2,4}(7),$$
$$\psi_{2,4}(8), \ldots \} = \left\{0, \pi, \frac{3\pi}{2}, \frac{\pi}{2}, \pi, 0, \frac{\pi}{2}, \frac{3\pi}{2}, \ldots\right\}$$

As given by equations 22 to 27, when a phase rotation amount is set to $\phi_{ndm}=2\pi(ndm-1)/N_{DM}$, into which 27 is equally divided, coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ are changed in transmission periods given by $N_{DM} \times N_{CM} = 4 \times 2 = 8$.

As given by equations 22 to 27, furthermore, the number of phases (for example, four, namely, 0, $\pi/2$, $\pi$, and $3\pi/2$) used for a phase rotation amount (for example, a phase rotation amount for applying a Doppler shift amount) is smaller than the number of transmit antennas 108 used for multiplexing transmission, namely, Nt=6. In other words, as given by equations 22 to 27, the number of phases (for example, four, namely, 0, $\pi/2$, $\pi$, and $3\pi/2$) used for a phase rotation amount for applying a Doppler shift amount is equal to the number of Doppler shift amounts used for multiplexing transmission (in other words, the number of Doppler multiplexes) $N_{DM}=4$.

While the description has been given of, as an example, the setting of phase rotation amounts in a case where the number Nt of transmit antennas 108 is equal to 3 and the number of Doppler multiplexes $N_{DM}$ is equal to 2 and in a case where the number Nt of transmit antennas 108 is equal to 6 and the number of Doppler multiplexes $N_{DM}$ is equal to 4, the number Nt of transmit antennas 108 and the number of Doppler multiplexes $N_{DM}$ are not limited to the values described above. For example, the number of phases used for a phase rotation amount may be set to be smaller than the number Nt of transmit antennas 108 used for multiplexing transmission, regardless of the number Nt of transmit antennas 108. Further, the number of phases used for a phase rotation amount for applying a Doppler shift amount may be equal to the number $N_{DM}$ of Doppler shift amounts used for multiplexing transmission.

The foregoing description has been given of a method for setting phase rotation amounts using phase rotation amount setter 104.

In FIG. 1, each phase rotator 107 applies a phase rotation amount to a chirp signal output from radar transmission signal generator 101, for each transmission period Tr, based on the coded Doppler phase rotation amount $\psi_{ndop\_code(ndm), ndm}(m)$ set by phase rotation amount setter 104. Here, ndm=1, . . . , $N_{DM}$, and ndop_code(ndm)= 1, . . . , $N_{DOP\_CODE}$(ndm).

The sum of the numbers of coded Doppler multiplexes $N_{DOP\_CODE}(1)$, $N_{DOP\_CODE}(2)$, . . . , and $N_{DOP\_CODE}$(NDM) is set to be equal to the number Nt of transmit antennas 108, and Nt coded Doppler phase rotation amounts are respectively input to Nt phase rotators 107.

Each of Nt phase rotators 107 applies coded Doppler phase rotation amount $\psi_{ndop\_code(ndm), ndm}(m)$ input thereto to a chirp signal output from radar transmission signal generator 101 for each transmission period Tr. The outputs of Nt phase rotators 107 (referred to as, for example, coded Doppler multiplexed signals) are amplified to defined transmission power and are then radiated into a space from Nt transmit antennas 108 in a transmit array antenna section.

In the following, phase rotator 107 that applies coded Doppler phase rotation amount $\psi_{ndop\_code(ndm), ndm}(m)$ is represented by "phase rotator PROT #[ndop_code(ndm), ndm]". Likewise, transmit antenna 108 that radiates the output of phase rotator PROT #[ndop_code(ndm), ndm] into a space is represented by "transmit antenna Tx #[ndop_code(ndm), ndm]". Here, ndm=1, . . . , $N_{DM}$, and ndop_code(ndm)=1, . . . , $N_{DOP\_CODE}$(ndm).

For example, a description will be given of a case where when the number of transmit antennas used for multiplexing transmission Nt=3, the number of Doppler multiplexes $N_{DM}$=2, $N_{CM}$=2, orthogonal code sequences $Code_1$={1, 1} and $Code_2$={1, −1} with code length Loc=2 are used, and the numbers of coded Doppler multiplexes are set such that $N_{DOP\_CODE}$(1)=1 and $N_{DOP\_CODE}$(2)=2. In this case, coded Doppler phase rotation amounts $\psi_{1,1}$(m), $\psi_{1,2}$(m), and $\psi_{2,2}$(m) are output from coder 106 to phase rotators 107 in respective transmission periods.

For example, phase rotator PROT #[1, 1] applies, for each transmission period, phase rotation amount $\psi_{1,1}$(m) as given by following equation 28 to a chirp signal generated by radar transmission signal generator 101 for each transmission period. The output of phase rotator PROT #[1, 1] is output from transmit antenna Tx #[1, 1]. Here, cp(t) denotes a chirp signal for each transmission period.

$$\exp[j\psi_{1,1}(1)]cp(t), \exp[j\psi_{1,1}(2)]cp(t), \exp[j\psi_{1,1}(3)]cp(t), \ldots, \exp[j\psi_{1,1}(Nc)]cp(t) \quad \text{(Equation 28)}$$

Likewise, phase rotator PROT #[1, 2] applies, for each transmission period, phase rotation amount $\psi_{1,2}$(m) as given by following equation 29 to a chirp signal generated by radar transmission signal generator 101 for each transmission period. The output of phase rotator PROT #[1, 2] is output from transmit antenna Tx #[1, 2].

$$\exp[j\psi_{1,2}(1)]cp(t), \exp[j\psi_{1,2}(2)]cp(t), \exp[j\psi_{1,2}(3)]cp(t), \ldots, \exp[\psi_{1,2}(Nc)]cp(t) \quad \text{(Equation 29)}$$

Likewise, phase rotator PROT #[2, 2] applies, for each transmission period, phase rotation amount $\psi_{2,2}$(m) as given by following equation 30 to a chirp signal generated by radar transmission signal generator 101 for each transmission period. The output of phase rotator PROT #[2, 2] is output from transmit antenna Tx #[2, 2].

$$\exp[j\psi_{2,2}(1)]cp(t), \exp[j\psi_{2,2}(2)]cp(t), \exp[j\psi_{2,2}(3)]cp(t), \ldots, \exp[j\psi_{2,2}(Nc)]cp(t) \quad \text{(Equation 30)}$$

The foregoing description has been given of an example of how coded Doppler phase rotation amount $\psi_{ndop\_code(ndm), ndm}$(m) is set.

In this embodiment, accordingly, plural transmit antennas 108 are associated with combinations (in other words, assignment) of Doppler shift amounts $DOP_{ndm}$ and orthogonal code sequences $Code_{ncm}$ such that in each of the combinations, at least one of Doppler shift amount $DOP_{ndm}$ or orthogonal code sequence $Code_{ncm}$ is different. In this embodiment, furthermore, the number of multiplexes of orthogonal code sequence $Code_{ncm}$ (in other words, the number of coded Doppler multiplexes $N_{DOP\_CODE}$(ndm)) corresponding to each Doppler shift amount $DOP_{ndm}$ in combinations of Doppler shift amounts $DOP_{ndm}$ and orthogonal code sequences $Code_{ncm}$ is different.

For example, in this embodiment, as illustrated in FIGS. 3A and 3B, Nt transmit antennas 108 include at least plural transmit antennas 108 from which transmission signals that are code-multiplexed using different orthogonal code sequences are transmitted, and at least one transmit antenna 108 from which a transmission signal that is not code-multiplexed is transmitted. In other words, radar transmission signals transmitted from radar transmitter 100 include at least a coded Doppler multiplexed signal for which the number of coded Doppler multiplexes $N_{DOP\_CODE}$(ndm) is set to the number of codes $N_{CM}$, and a coded Doppler multiplexed signal for which the number of coded Doppler multiplexes $N_{DOP\_CODE}$(ndm) is set to be smaller than the number of codes $N_{CM}$.

[Configuration of Radar Receiver 200]

In FIG. 1, radar receiver 200 includes Na receive antennas 202, which constitute an array antenna. Radar receiver 200 further includes Na antenna channel processors 201-1 to 201-Na, constant false alarm rate (CFAR) section 211, coded Doppler demultiplexer 212, and direction estimator 213.

Each receive antenna 202 receives a reflected wave signal that is a radar transmission signal reflected from a target object (target), and outputs the received reflected wave signal to the corresponding one of antenna channel processors 201 as a reception signal.

Each antenna channel processor 201 includes receiving radio section 203 and signal processor 206.

Receiving radio section 203 includes mixer section 204 and low pass filter (LPF) 205. Receiving radio section 203 mixes, using mixer section 204, a chirp signal input from radar transmission signal generator 101, which is a transmission signal, with the received reflected wave signal, and passes the resulting mixed signal through LPF 205. As a result, a beat signal having a frequency corresponding to the delay time of the reflected wave signal is acquired. For example, as illustrated in FIG. 2, the difference frequency between the frequency of a transmission chirp signal (transmission-frequency-modulated wave) and the frequency of a reception chirp signal (reception-frequency-modulated wave) is obtained as the beat frequency.

In each antenna channel processor 201-z (where z is equal to any of 1 to Na), signal processor 206 includes analog-to-digital (AD) converter 207, beat frequency analyzer 208, output switching section 209, and Doppler analyzers 210.

The signal (for example, beat signal) output from LPF 205 is passed to signal processor 206 and is converted into a discretely sampled data by AD converter 207.

Beat frequency analyzer 208 performs FFT processing of $N_{data}$ pieces of discretely sampled data, which are obtained in a defined time range (range gate), for each transmission period Tr. As a result, signal processor 206 outputs a frequency spectrum in which a peak appears at a beat frequency corresponding to the delay time of the reflected wave signal (radar reflected wave). In the FFT processing, for example, beat frequency analyzer 208 may perform multiplication by a window function coefficient such as of the Han window or the Hamming window. The use of a window function coefficient can suppress sidelobes around the beat frequency peak.

Here, a beat frequency response obtained by the m-th chirp pulse transmission, which is output from beat frequency analyzer 208 in the z-th signal processor 206, is represented by $RFT_z(f_b, m)$. Here, $f_b$ denotes the beat frequency index and corresponds to FFT index (bin number). For example, $f_b$=0, . . . , $N_{data}$/2, z=0, . . . , Na, and m=1, . . . , Nc. A beat frequency having smaller beat frequency index $f_b$ indicates that the delay time of a reflected wave signal is shorter (in other words, the distance to the target object is shorter).

Beat frequency index $f_b$ can be converted into distance information $R(f_b)$ using following equation 31. For this reason, beat frequency index $f_b$ is hereinafter referred to as the "distance index $f_b$".

[3]
$$R(f_b) = \frac{C_0}{2B_w} f_b \quad \text{(Equation 31)}$$

Here, $B_w$ denotes a frequency-modulation bandwidth in a range gate for a chirp signal, and $C_0$ denotes the speed of light.

Output switching section 209 selectively switches and outputs the output of beat frequency analyzer 208 for each transmission period to the OC_INDEX-th Doppler analyzer 210 among Loc Doppler analyzers 210, based on orthogonal code element index OC_INDEX output from coder 106 in phase rotation amount setter 104. In other words, output switching section 209 selects the OC_INDEX-th Doppler analyzer 210 in the m-th transmission period Tr.

Signal processor 206 includes Loc Doppler analyzers 210-1 to 210-Loc. For example, data is input to the noc-th Doppler analyzer 210 for every Loc transmission periods (Loc×Tr) by using output switching section 209. Accordingly, the noc-th Doppler analyzer 210 performs Doppler analysis for each distance index $f_b$ using data of Ncode transmission periods among Nc transmission periods (for example, beat frequency response $RFT_z(f_b, m)$ output from beat frequency analyzer 208). Here, noc denotes the index of a code element, and noc=1, . . . , Loc.

For example, when Ncode is a power of 2, FFT processing is applicable in Doppler analysis. In this case, the FFT size is Ncode, and a maximum Doppler frequency without causing aliasing derived from the sampling theorem is ±1/(2Loc×Tr). Further, the Doppler frequency interval for Doppler frequency index $f_s$ is 1/(Ncode×Loc×Tr), and the range of Doppler frequency index $f_s$ is given by $f_s$=−Ncode/2, . . . , 0, . . . , Ncode/2−1.

The following description will be given of a case where Ncode is a power of 2, as an example. When Ncode is not a power of 2, for example, data with zero padding can be used to perform FFT processing with a number of data sizes (FFT sizes) equal to a power of 2. In the FFT processing, Doppler analyzer 210 may perform multiplication by a window function coefficient such as of the Han window or the Hamming window. The application of a window function can suppress sidelobes around the beat frequency peak.

For example, output $VFT_z^{noc}(f_b, f_s)$ of Doppler analyzers 210 in the z-th signal processor 206 is given by following equation 32, where j is the imaginary unit and z=1 to Na.

[32]
$$VFT_z^{noc}(f_b, f_s) = \sum_{s=0}^{N_{code}-1} RFT_z(f_b, L_{OC} \times s + noc) \exp\left[-j\frac{2\pi s f_s}{N_{code}}\right] \quad \text{(Equation 32)}$$

The foregoing description has been given of the processing performed by the components of signal processor 206.

In FIG. 1, CFAR section 211 performs CFAR processing (in other words, adaptive threshold determination) using the outputs of Loc Doppler analyzers 210 in each of the first to Na-th signal processors 206 and extracts distance index $f_{b\_cfar}$ and Doppler frequency index $f_{s\_cfar}$ that provide a peak signal.

For example, CFAR section 211 performs two-dimensional CFAR processing with the distance axis and the Doppler frequency axis (corresponding to the relative velocity) or CFAR processing that is a combination of one-dimensional CFAR processing operations by power addition of outputs $VFT_z^{noc}(f_b, f_s)$ of Doppler analyzers 210 in the first to Na-th signal processors 206, for example, as given by following equation 33. As the two-dimensional CFAR processing or the CFAR processing that is a combination of one-dimensional CFAR processing operations, for example, processing disclosed in NPL 2 may be applied.

[33]
$$PowerFT(f_b, f_s) = \sum_{z=1}^{N_a} \sum_{noc=1}^{L_{oc}} |VFT_z^{noc}(f_b, f_s)|^2 \quad \text{(Equation 33)}$$

CFAR section 211 adaptively sets a threshold and outputs distance index $f_{b\_cfar}$ that provides received power greater than the threshold, Doppler frequency index $f_{s\_cfar}$, and received-power information $PowerFT(f_{b\_cfar}, f_{s\_cfar})$ to coded Doppler demultiplexer 212.

For example, when phase rotation amount $\phi_{ndm}$ for applying Doppler shift amount $DOP_{ndm}$ is determined using equation 1, intervals $\Delta FD$ of Doppler shift amounts in the Doppler frequency domain, which are output from Doppler analyzers 210, are equal, where $\Delta FD = Ncode/N_{DM}$. Accordingly, in the outputs of Doppler analyzers 210, peaks are detected at intervals of $\Delta FD$ for Doppler-shift multiplexed signals in the Doppler frequency domain. When phase rotation amount $\phi_{ndm}$ is determined using equation 1, $\Delta FD$ may not sometimes be an integer depending on Ncode and $N_{DM}$. In this case, equation 50 described below may be used to achieve $\Delta FD$ having an integer value. The following describes a reception processing operation using $\Delta FD$ having an integer value.

Figures 12A, 12B:
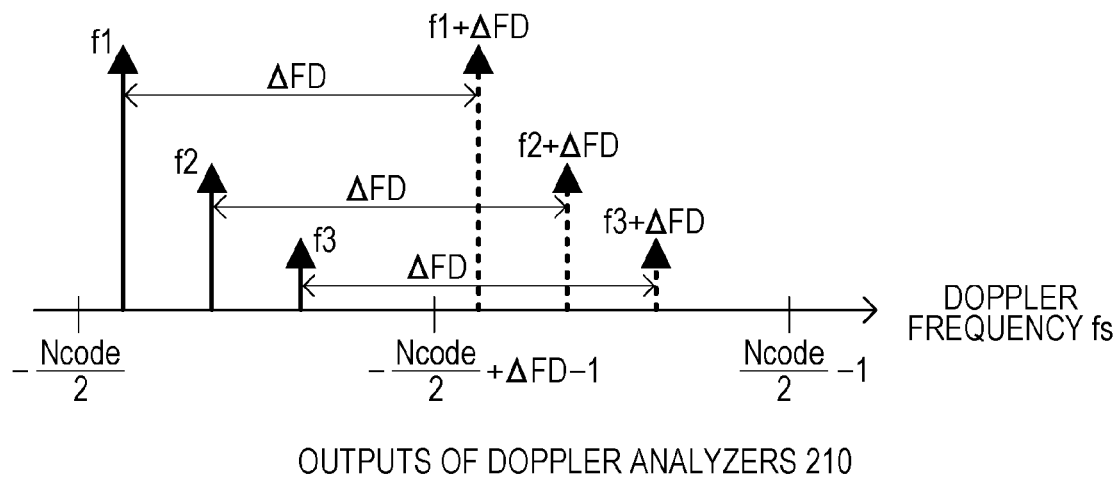
FIGS. 12A and 12B are diagrams illustrating an example Doppler domain compression process.

FIG. 12A illustrates an example of the outputs of Doppler analyzers 210 at the distances over which reflected waves from three targets exist in a case where $N_{DM}=2$. For example, as illustrated in FIG. 12A, when reflected waves from the three targets are observed at Doppler frequency indices f1, f2, and f3, the reflected waves are also observed at respective Doppler frequency indices (for example, f1+$\Delta FD$, f2+$\Delta FD$, and f3+$\Delta FD$) at intervals of $\Delta FD$ relative to f1, f2 and f3.

Accordingly, CFAR section 211 may divide the respective outputs of Doppler analyzers 210 into ranges at Doppler shift amount intervals $\Delta FD$ and CFAR processing (referred to as, for example, "Doppler domain compression CFAR processing") after, as given by following equation 34, providing power addition (referred to as, for example, "Doppler domain compression") for the respective ranges while matching peak positions of Doppler-shift multiplexed signals. Here, $f_{s\_comp} = -Ncode/2, \ldots, -Ncode/2 + \Delta FD - 1$.

[34]
$$PowerFT\_comp(f_b, f_{s\_comp}) = \sum_{nfd=1}^{N_{DM}} PowerFT(f_b, f_{s\_comp} + (nfd-1) \times \Delta FD) \quad \text{(Equation 34)}$$

This can compress the Doppler frequency range for the CFAR processing to $1/N_{DM}$ to reduce the amount of CFAR processing and can simplify the circuit configuration. In addition, CFAR section 211 enables power addition for $N_{DM}$ Doppler-shift multiplexed signals, resulting in signal to noise ratio (SNR) being improved by about $(N_{DM})^{1/2}$. As a result, the radar sensing performance of radar apparatus 10 can be improved.

FIG. 12B illustrates an example of the outputs of Doppler analyzers 210 illustrated in FIG. 12A after application of the Doppler domain compression process given by equation 34. As illustrated in FIG. 12B, in a case where $N_{DM}=2$, through the Doppler domain compression process, the power component for Doppler frequency index f1 and the power component for f1+ΔFD are added together and the sum is output. Likewise, as illustrated in FIG. 12B, the power component for Doppler frequency index f2 and the power component for f2+ΔFD are added together and the sum is output, and the power component for Doppler frequency index f2 and the power component for f3+ΔFD are added together and the sum is output.

As a result of Doppler domain compression, the range of Doppler frequency index fs_comp in the Doppler frequency domain is reduced to greater than or equal to −Ncode/2, . . . , and less than or equal to −Ncode/2+ΔFD−1, and the range for the CFAR processing is compressed, leading to a reduction in the operation amount of CFAR processing. In FIGS. 12A and 12B, for example, because of power addition for the reflected waves from the three targets, the SNR of the signal components is improved. Note that combined power of noise components results in an SNR improvement of, for example, about $(N_{DM})^{1/2}$.

For example, CFAR section 211, which uses Doppler domain compression CFAR processing, adaptively sets a threshold and outputs distance index $f_{b\_cfar}$ that provides received power greater than the threshold, Doppler frequency index $f_{s\_comp\_cfar}$, and received-power information PowerFT($f_{b\_cfar}$, $f_{s\_comp\_cfar}$+(nfd−1)×ΔFD) for Doppler frequency indices ($f_{s\_comp\_cfar}$+(nfd−1)×ΔFD) of NDM Doppler multiplexed signals, where nfd=1, . . . , $N_{DM}$, to coded Doppler demultiplexer 212.

Note that phase rotation amount $\phi_{ndm}$ for applying Doppler shift amount $DOP_{ndm}$ is not limited to that given in equation 1. CFAR section 211 can apply Doppler domain compression CFAR processing, for example, if Doppler-shift multiplexed signals have phase rotation amounts $\phi_{ndm}$ such that peaks are detected at constant intervals in the Doppler frequency domain output from Doppler analyzers 210.

Next, an example of the operation of coded Doppler demultiplexer 212 illustrated in FIG. 1 will be described. The following describes an example of processing performed by coded Doppler demultiplexer 212 when CFAR section 211 uses Doppler domain compression CFAR processing.

Coded Doppler demultiplexer 212 separates signals transmitted in a coded Doppler multiplexed manner, using the output of Doppler analyzers 210, based on the outputs of CFAR section 211, namely, distance index $f_{b\_cfar}$, Doppler frequency index $f_{s\_comp\_cfar}$, and received-power information PowerFT($f_{b\_cfar}$, $f_{s\_comp\_cfar}$+(nfd−1)×ΔFD) for Doppler frequency indices ($f_{s\_comp\_cfar}$+(nfd−1)×ΔFD) of $N_{DM}$ Doppler multiplexed signals, where nfd=1, . . . , $N_{DM}$, and performs discrimination (in other words, also referred to as determination or identification) of transmit antennas 108 and discrimination of Doppler frequencies (in other words, Doppler velocities or relative velocities).

As described above, for example, coder 106 in phase rotation amount setter 104 does not set all of $N_{DM}$ numbers of coded Doppler multiplexes $N_{DOP\_CODE}(1)$, $N_{DOP\_CODE}(2)$, . . . , and $N_{DOP\_CODE}(NDM)$ to $N_{CM}$, but sets at least one of the numbers of coded Doppler multiplexes to a value smaller than $N_{CM}$. For example, coded Doppler demultiplexer 212 performs (1) code separation process to detect a coded Doppler multiplexed signal for which the number of coded Doppler multiplexes is set to be smaller than $N_{CM}$ and performs (2) discrimination of transmit antennas 108 and discrimination of Doppler frequencies of the target based on the detected coded Doppler multiplexed signal for which the number of coded Doppler multiplexes is set to be smaller than $N_{CM}$.

The following describes the processes (1) and (2) described above, which are performed by coded Doppler demultiplexer 212.

<(1) Code Separation Process (Process for Detecting Coded Doppler Multiplexed Signal for which Number of Coded Doppler Multiplexes is Set to be Smaller than $N_{CM}$)>

There are NDM candidate correspondences between NDM coded Doppler multiplexed signals and the outputs of the respective Doppler analyzers 210 for Doppler frequency indices ($f_{s\_comp\_cfar}$), ($f_{s\_comp\_cfar}$+ΔFD), ($f_{s\_comp\_cfar}$+2ΔFD), . . . , and ($f_{s\_comp\_cfar}$+($N_{DM}$−1)ΔFD) of $N_{DM}$ coded Doppler multiplexed signals for distance index $f_{b\_cfar}$ output from CFAR section 211.

For example, if Doppler shift amount $DOP_{ndm}$ set in Doppler shift setter 105 is represented by $DOP_1 < DOP_2 < \ldots < DOP_{DM-1} < DOP_{DM}$, there are $N_{DM}$ candidate correspondences with cyclically shifted elements, as follows, with consideration given to Doppler aliasing. Here, patterns of the candidate correspondences are numbered DopCase=1 to $N_{DM}$.

DopCase=1: {$DOP_1$, $DOP_2$, . . . , $DOP_{DM-1}$, $DOP_{DM}$}
DopCase=2: {$DOP_{DM}$, $DOP_1$, $DOP_2$, . . . , $DOP_{DM-1}$}
. . . ,
DopCase=$N_{DM}$: {$DOP_2$, . . . , $DOP_{DM-1}$, $DOP_{DM}$, $DOP_1$}

For example, DopCase=1 indicates a correspondence among Doppler shift amounts in the initial state (when the relative velocity to the target is zero). For example, more aliasing components are included as the relative velocity of the target decreases in a direction in which the distance to the target decreases, and the resulting correspondences are associated with DopCase=2, 3, . . . , $N_{DM}$. In other words, DopCase=$N_{DM}$, $N_{DM}$−1, . . . , 2 is associated as the relative velocity of the target increases in a direction in which the distance to the target increases.

Here, a table indicating the position of $DOP_{ndm}$ counting from the beginning of each DopCase (the position (or order) of $DOP_{ndm}$ in DopCase) can be created in advance, based on the Doppler shift amounts set in Doppler shift setter 105. In the following, DOPposi($DOP_{ndm}$, DopCase) denotes the operator that outputs the position of $DOP_{ndm}$ counting from the beginning of each DopCase. For example, in the above-described example of DopCase, DOPposi($DOP_1$, 1)=1, DOPposi($DOP_1$, 2)=2, DOPposi($DOP_1$, $N_{DM}$)=$N_{DM}$, DOPposi($DOP_2$, 1)=2, DOPposi($DOP_2$, 2)=3, and DOPposi($DOP_2$, $N_{DM}$)=1.

Figure 13:
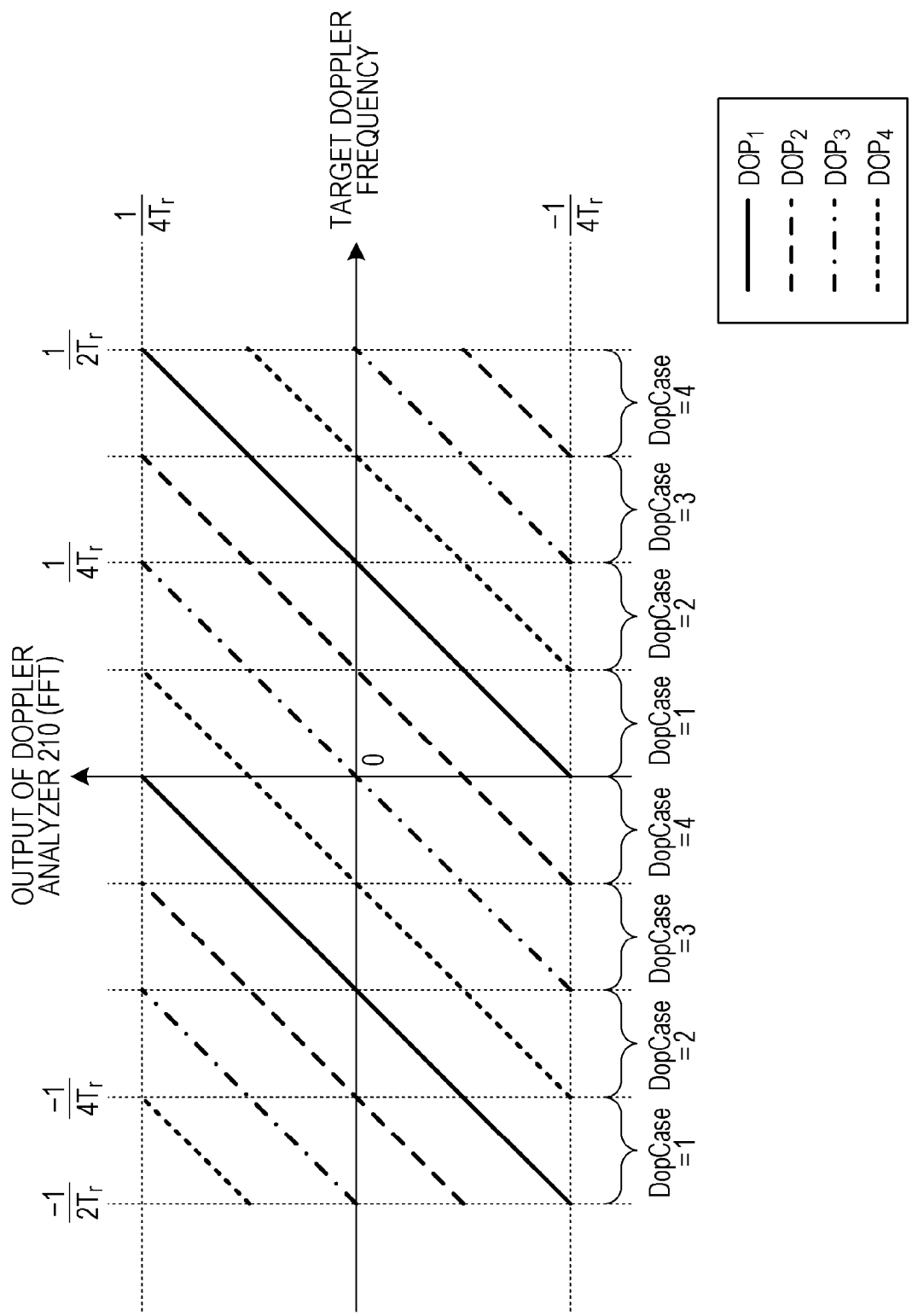
FIG. 13 is a diagram used to describe the Doppler domain compression process.

FIG. 13 illustrates an example of the outputs of Doppler analyzers 210 in a case where, as an example, $N_{DM}=4$, $N_{CM}=2$, Loc=2, the phase rotation amount for applying Doppler shift amount $DOP_{ndm}$ is given by $\phi_{ndm}=2\pi(ndm+1)/N_{DM}$, and Doppler shift amounts satisfy $DOP_1 < DOP_2 < DOP_3 < DOP_4$ using phase rotation amount $\phi_1$ for applying Doppler shift amount $DOP_1$, which is equal to π, phase rotation amount $\phi_2$ for applying Doppler shift amount $DOP_2$, which is equal to $3\pi/2$, phase rotation amount $\phi_3$ for applying Doppler shift amount $DOP_3$, which is equal to 0, and phase rotation amount $\phi_4$ for applying Doppler shift amount $DOP_4$, which is equal to $\pi/2$. In FIG. 13, the horizontal axis represents the target Doppler frequency ($f_{TARGET}$), and the vertical axis represents the output of Doppler analyzers 210.

In Doppler analyzers 210, the range of Doppler frequencies without causing aliasing is greater than or equal to $-1/(2 \times Loc \times Tr)$ and less than $1/(2 \times Loc \times Tr)$, and Doppler aliasing occurs outside this range. For example, in a case where Loc=2, in the outputs of Doppler analyzers 210, the range of Doppler frequencies without causing aliasing is greater than or equal to $1/(4 \times Tr)$ and less than $1/(4 \times Tr)$.

In FIG. 13, accordingly, the order of coded Doppler multiplexed signals cyclically changes as follows depending on Doppler frequency $f_{TARGET}$ of the target.

DopCase=1: when $0-1/(2 \times Tr) \leq f_{TARGET} < -3/(8 \times Tr)$, $DOP_1 < DOP_2 < DOP_3 < DOP_4$ DopCase=2: when $-3/(8 \times Tr) \leq f_{TARGET} < -1/(4 \times Tr)$, $DOP_4 < DOP_1 < DOP_2 < DOP_3$ DopCase=3: when $-1/(4 \times Tr) \leq f_{TARGET} < -1/(8 \times Tr)$, $DOP_3 < DOP_4 < DOP_1 < DOP_2$ DopCase=4: when $-1/(8 \times Tr) \leq f_{TARGET} < 0$, $DOP_2 < DOP_3 < DOP_4 < DOP_1$ DopCase=1: when $0 \leq f_{TARGET} < 1/(8 \times Tr)$, $DOP_1 < DOP_2 < DOP_3 < DOP_4$ DopCase=2: when $1/(8 \times Tr) \leq f_{TARGET} < 1/(4 \times Tr)$, $DOP_4 < DOP_1 < DOP_2 < DOP_3$ DopCase=3: when $1/(4 \times Tr) \leq f_{TARGET} < 3/(8 \times Tr)$, $DOP_3 < DOP_4 < DOP_1 < DOP_2$ DopCase=4: when $3/(8 \times Tr) \leq f_{TARGET} < 1/(2 \times Tr)$, $DOP_2 < DOP_3 < DOP_4 < DOP_1$ Here, for Doppler frequency $f_{TARGET}$ of the target in the range of $-1/(2 \times Tr)$ $f_{TARGET} < 1/(2 \times Tr)$, the candidate patterns of the order of coded Doppler multiplexed signals are numbered DopCase=1 to 4 ($=N_{DM}$). There are 4 ($=N_{DM}$) candidate patterns to be associated with the order of coded Doppler multiplexed signals.

In the outputs of Doppler analyzers 210, furthermore, the range of Doppler frequencies without causing aliasing is greater than or equal to $-1/(2 \times Loc \times Tr)$ and less than $1/(2 \times Loc \times Tr)$. Thus, for Doppler frequency $f_{TARGET}$ of the target in the range of $-1/(2 \times Tr) \leq f_{TARGET} < 1/(2 \times Tr)$, the outputs of Doppler analyzers 210 include (Loc−1) occurrences of aliasing. Therefore, for example, in the example (Loc=2) illustrated in FIG. 13, the outputs of Doppler analyzers 210 corresponding to DopCase=1 to 4 ($=N_{DM}$) are output 2 ($=$Loc) times including the case where aliasing is present and the case where aliasing is absent. Accordingly, to detect Doppler frequency $f_{TARGET}$ of the target in the range of $-1/(2 \times Tr) \leq f_{TARGET} < 1/(2 \times Tr)$, for example, coded Doppler demultiplexer 212 performs a process of determining a DopCase and further determining the presence or absence of aliasing (an example of the process will be described below).

Coded Doppler demultiplexer 212 performs a code separation process on, for example, the outputs of Doppler analyzers 210 in the z-th signal processor 206 indicated by Doppler frequency indices ($f_{s\_comp\_cfar}+(nfd-1) \times \Delta FD$) of $N_{DM}$ coded Doppler multiplexed signals for distance index $f_{b\_cfar}$ output from CFAR section 211.

The code separation process may be performed on, for example, all of nfd=1, ..., $N_{DM}$ for all the candidates of DopCase=1, ..., $N_{DM}$. Note that coded Doppler demultiplexer 212 detects a coded Doppler multiplexed signal for which the number of coded Doppler multiplexes is set to be smaller than $N_{CM}$, and performs discrimination of transmit antennas 108 and determination of a target Doppler frequency. Accordingly, for example, coded Doppler demultiplexer 212 performs a code separation process, as given by following equation 35, to reduce the operation amount of the separation process.

[35]

$$DeMUL_z^{ncm}(f_{b\_cfar}, f_{s\_comp\_cfar} + \{DOPposi(DOP_{ndm1}, DopCase) - 1\} \times \Delta FD) = \sum_{noc=1}^{Loc} [OC^*_{ncm}(noc)VFT_z^{noc}(f_{b\_cfar}, f_{s\_comp\_cfar} + \{DOPposi(DOP_{ndm1}, DopCase) - 1\} \times \Delta FD) \times \exp\left\{-j\frac{2\pi(f_{s\_comp\_cfar} + (DopCase - 1) \times \Delta FD - DOP_1)}{N_{code}} \times \frac{noc - 1}{Loc}\right\}]$$

(Equation 35)

The superscript asterisk(*) indicates the complex conjugate operator. Further, nfd=1, ..., $N_{DM}$, ncm=1, ..., $N_{CM}$, and DopCase=1, ..., $N_{DM}$.

For example, when a coded Doppler multiplexed signal for which the number of coded Doppler multiplexes is set to be smaller than $N_{CM}$ is Doppler shift amount "$DOP_{ndm1}$", coded Doppler demultiplexer 212 performs a code separation process using candidate $DOPposi(DOP_{ndm1}, DopCase)$ including Doppler shift amount $DOP_{ndm1}$ in each DopCase.

Here, code separation signal $DeMUL_z^{ncm}(f_{b\_cfar}, f_{s\_comp\_cfar}+(DOPposi(DOP_{ndm1}, DopCase)-1) \times \Delta FD)$ obtained in equation 35 represents a code separation signal that uses the ncm-th orthogonal code sequence $Code_{ncm}$ for the output of Doppler analyzer 210 in the z-th signal processor 206 for distance index $f_{b\_cfar}$ and Doppler frequency index ($f_{s\_comp\_cfar}+(DOPposi(DOP_{ndm1}, DopCase)-1) \times \Delta FD$).

In the exp term of equation 35, since the sampling times for the outputs of Doppler analyzers 210 for each code element $OC_{ncm}(noc)$ are shifted, phase correction is performed in accordance with Doppler frequency index ($f_{s\_comp\_cfar}$(DopCase−1)×ΔFD−$DOP_1$).

Further, Doppler shift amount $DOP_{ndm}$ set in Doppler shift setter 105 is represented by $DOP_1 < DOP_2 < ... < DOP_{DM-1} < DOP_{DM}$, and $DOP_1$ falls within the range of $f_{s\_comp}=-Ncode/2, ..., -Ncode/2+\Delta FD-1$ in the initial state (when the relative velocity to the target is zero). Accordingly, for example, coded Doppler demultiplexer 212 calculates an amount of phase correction using $DOP_1$ as a reference.

When a coded Doppler multiplexed signal for which the number of coded Doppler multiplexes is set to be smaller than $N_{CM}$ is Doppler shift amount $DOP_{ndm1}$, signals separated based on $N_{CM}$ orthogonal codes are obtained by equation 35 for candidate $DOPposi(DOP_{ndm1}, DopCase)$ including Doppler shift amount $DOP_{ndm1}$, where DopCase=1, ..., $N_{DM}$. Accordingly, coded Doppler demultiplexer 212 obtains the outputs of a total of $N_{DM} \times N_{CM}$ code separation signals. For example, coded Doppler demultiplexer 212 calculates code separation signals for all receive antennas z=1, ..., Na in accordance with equation 35 and calculates code separation signal power sum Pow_DeMUL$^{ncm}$(f$_{b\_cfar}$, f$_{s\_comp\_cfar}$+(DOPposi(DOP$_{ndm1}$, DopCase)−1)×ΔFD) using following equation 36.

$$\text{Pow\_DeMUL}^{ncm}(f_{b\_cfar}, f_{s\_comp\_cfar} + \quad \text{(Equation 36)}$$
$$\{DOPposi(DOP_{ndm1}, DopCase) - 1\} \times \Delta FD) =$$
$$\sum_{z=1}^{Na} |DeMUL_z^{ncm}(f_{b\_cfar}, f_{s\_comp\_cfar} +$$
$$\{DOPposi(DOP_{ndm1}, DopCase) - 1\} \times \Delta FD)|^2$$

Here, a coded Doppler multiplexed signal for which the number of coded Doppler multiplexes is set to be smaller than $N_{CM}$ does not use all the $N_{CM}$ orthogonal codes. In other words, a coded Doppler multiplexed signal for which the number of coded Doppler multiplexes is set to be smaller than $N_{CM}$ uses some of the orthogonal codes (for example, one orthogonal code). Thus, code separation signal power sum Pow_DeMUL$^{ncm}$(f$_{b\_cfar}$, f$_{s\_comp\_cfar}$+(DOPposi(DOP$_{ndm1}$, DopCase)−1)×ΔFD) corresponding to a coded Doppler multiplexed signal (Doppler shift amount: DOP$_{ndm1}$) for which the number of coded Doppler multiplexes is set to be smaller than $N_{CM}$, where ncm=1, . . . , $N_{CM}$ and DopCase=1, . . . , $N_{DM}$, contains a component whose received power has as low power value as about the noise level.

As an example, a description will be given of a case where the number of coded Doppler multiplexes of only a coded Doppler multiplexed signal that uses DOP$_{ndm1}$ is set to ($N_{CM}$−1), which is smaller than $N_{CM}$ (see, for example, the examples of the assignment of Doppler shift amounts and orthogonal codes illustrated in FIGS. 3 and 4).

In this case, coded Doppler demultiplexer 212 detects, among Pow_DeMUL$^{ncm}$(f$_{b\_cfar}$, f$_{s\_comp\_cfar}$+(DOPposi(DOP$_{ndm1}$, DopCase)−1)×ΔFD), where ncm=1, . . . , $N_{CM}$ and DopCase=1, . . . , $N_{DM}$, Pow_DeMUL$^{ncm\_min}$(f$_{b\_cfar}$, f$_{s\_comp\_cfar}$+(DOPposi(DOP$_{ndm1}$, DopCase_min)−1)×ΔFD) with the minimum received power. Here, "ncm_min" and "DopCase_min" represent the index numbers of ncm and DopCase for which Pow_DeMUL$^{ncm}$(f$_{b\_cfar}$, f$_{s\_comp\_cfar}$+(DOPposi(DOP$_{ndm1}$, DopCase)−1)×ΔFD) has the minimum received power.

As another example, a description will be given of a case where the number of coded Doppler multiplexes of only a coded Doppler multiplexed signal that uses DOP$_{ndm1}$ is set to ($N_{CM}$−2), which is smaller than $N_{CM}$ (see, for example, the examples of the assignment of Doppler shift amounts and orthogonal codes illustrated in FIGS. 7A, 7B, 8A, and 8B).

In this case, among Pow_DeMUL$^{ncm}$(f$_{b\_cfar}$, f$_{s\_comp\_cfar}$+(DOPposi(DOP$_{ndm1}$, DopCase)−1)×ΔFD), where ncm=1, . . . , $N_{CM}$ and DopCase=1, . . . , $N_{DM}$, a certain DopCase does not use two code s (for example, the orthogonal codes indicated by crosses ("x") in FIGS. 7A, 7B, 8A, and 8B)) among the $N_{CM}$ orthogonal codes and thus contains two components whose received power has as low power value as about the noise level.

Accordingly, coded Doppler demultiplexer 212 detects Pow_DeMUL$^{ncm\_min1}$(f$_{b\_cfar}$, f$_{s\_comp\_cfar}$+(DOPposi(DOP$_{ndm1}$, DopCase_min)−1)×ΔFD)+Pow_DeMUL$^{ncm\_min2}$(f$_{b\_cfar}$, f$_{s\_comp\_cfar}$+(DOPposi(DOP$_{ndm1}$, DopCase)−1)×ΔFD) for which, for a combination of two different orthogonal codes Code$_{ncm1}$ and Code$_{ncm2}$ (where ncm1≠ncm2) among the $N_{CM}$ orthogonal codes, power sum Pow_DeMUL$^{ncm2}$(f$_{b\_cfar}$, f$_{s\_comp\_cfar}$+(DOPposi(DOP$_{ndm1}$, DopCase)−1)×ΔFD)+Pow_DeMUL$^{ncm2}$(f$_{b\_cfar}$, f$_{s\_comp\_cfar}$+(DOPposi(DOP$_{ndm1}$, DopCase)−1)×ΔFD) has the minimum received power. Here, "ncm_min1", "ncm_min2", and "DopCase_min" represent the index numbers of ncm1, ncm2, and DopCase for which Pow_DeMUL$^{ncm1}$(f$_{b\_cfar}$, f$_{s\_comp\_cfar}$+(DOPposi(DOP$_{ndm1}$, DopCase)−1)×ΔFD)+Pow_DeMUL$^{ncm2}$(f$_{b\_cfar}$, f$_{s\_comp\_cfar}$+(DOPposi(DOP$_{ndm1}$, DopCase)−1)×ΔFD) has the minimum received power.

Also when the number of coded Doppler multiplexes is set to be smaller than ($N_{CM}$−2), coded Doppler demultiplexer 212 detects a combination of candidate codes with the minimum code separation signal power sum among combinations of candidate codes that are not used among the $N_{CM}$ orthogonal codes. Accordingly, a combination of DopCase_min and codes (ncm_min1, ncm_min2, . . . ) can be detected.

Coded Doppler demultiplexer 212 determines, based on the detection result described above, that a correspondence pattern of $N_{DM}$ coded Doppler multiplexed signals and the outputs of the respective Doppler analyzers 210 for Doppler frequency indices (f$_{s\_comp\_cfar}$), (f$_{s\_comp\_cfar}$+ΔFD), (f$_{s\_comp\_cfar}$+2ΔFD), . . . , and (f$_{s\_comp\_cfar}$+($N_{DM}$−1)ΔFD) of the $N_{DM}$ coded Doppler multiplexed signals for distance index f$_{b\_cfar}$ output from CFAR section 211 is DopCase_min among DopCase=1 to $N_{DM}$.

Further, coded Doppler demultiplexer 212 determines that a coded Doppler multiplexed signal transmitted using DOP$_{ndm1}$ for which the number of coded Doppler multiplexes is set to be smaller than $N_{CM}$ in the pattern corresponding to DopCase_min is the output of Doppler analyzer 210 for distance index f$_{b\_cfar}$ and Doppler frequency index (f$_{s\_comp\_cfar}$+(DOPposi(DOP$_{ndm1}$, DopCase_min)−1)×ΔFD).

A reduction in the SNR of a reception signal that is a reflected wave may make it difficult to discriminate between a signal power level and a noise power level. To address this difficulty, coded Doppler demultiplexer 212 may introduce a determination condition and perform a process of, for example, adopting a determination result (in other words, detection result) when the determination condition is satisfied and removing (in other words, not adopting) a determination result when the determination condition is not satisfied. This can reduce the probability of erroneous detection of the noise component and the like. For example, coded Doppler demultiplexer 212 may adopt, as a determination result, detection value P$_{MIN}$ with the minimum received power when satisfying PowerFT(f$_{b\_cfar}$, f$_{s\_comp\_cfa}$)> LEV$_{DETECT}$×P$_{MIN}$. Here, LEV$_{DETECT}$ is a determination threshold. LEV$_{DETECT}$ is a real number satisfying 0< LEV$_{DETECT}$<1.

<(2) Process for Discrimination of Transmit Antennas 108 and Discrimination of Doppler Frequencies of Target>

For example, coded Doppler demultiplexer 212 detects Doppler frequency f$_{TARGET}$ of the target in the range of −1/(2×Tr)≤f$_{TARGET}$<1/(2×Tr).

For example, coded Doppler demultiplexer 212 determines the presence or absence of aliasing as in Case (a) and Case (b) below, based on the determination result of DopCase (for example, DopCase_min) and the determination result of the code whose received power is minimum (for example, ncm_min). Then, coded Doppler demultiplexer 212 discriminates transmit antennas 108 and Doppler frequencies of the target.

A plurality of codes whose received power is minimum (for example, ncm_min1, ncm_min2, . . . ) are also applicable by replacing ncm_min in the following description with (ncm_min1, ncm_min2, . . . ).

[Case (a): Case without Aliasing]

For example, when ncm_min matches the index of an orthogonal code sequence that is not used (not assigned) for coded Doppler multiplexing in $DOP_{ndm1}$ for which the number of coded Doppler multiplexes is set to be smaller than $N_{CM}$, coded Doppler demultiplexer 212 determines that no Doppler aliasing occurs. In other words, when a coded Doppler multiplexed signal corresponding to $DOP_{ndm1}$ is not coded using orthogonal code sequence $Code_{ncm\_min}$, coded Doppler demultiplexer 212 determines that no Doppler aliasing occurs.

If it is determined that no Doppler aliasing occurs, Coded Doppler demultiplexer 212 determines the Doppler frequency of the target and a transmit antenna in the following way.

Doppler Frequency Determination for Target:

Coded Doppler demultiplexer 212 determines that the Doppler frequency index of the target is ($f_{s\_comp\_cfar}$+(DopCase_min−1)×ΔFD−$DOP_1$). For example, the Doppler frequency interval for Doppler frequency index $f_{s\_comp\_cfar}$ is 1/(Ncode×Loc×Tr). Therefore, coded Doppler demultiplexer 212 determines that Doppler frequency $f_{TARGET}$ of the target is ($f_{s\_comp\_cfar}$+(DopCase_min−1)×ΔFD−$DOP_1$)/ (Ncode×Loc×Tr).

Transmit Antenna Determination:

Coded Doppler demultiplexer 212 determines that for the output of Doppler analyzer 210 for distance index $f_{b\_cfar}$ and Doppler frequency index ($f_{s\_comp\_cfar}$+(DOPposi($DOP_{ndm}$, DopCase_min)−1)×ΔFD) in the z-th signal processor 206, code separation signal $DeMUL_z^{ncm}$($f_{b\_cfar}$, $f_{s\_comp\_cfar}$+ (DOPposi($DOP_{ndm}$, DopCase_min)−1)×ΔFD) using $Code_{ncm}$ is the reception signal corresponding to transmit antenna Tx #[ncm, ndm].

[Case (b): Case with Aliasing]

For example, when ncm_min does not match the index of an orthogonal code sequence that is not used for coded Doppler multiplexing in $DOP_{ndm1}$ for which the number of coded Doppler multiplexes is set to be smaller than $N_{CM}$, coded Doppler demultiplexer 212 determines that Doppler aliasing occurs. In other words, when a coded Doppler multiplexed signal corresponding to $DOP_{ndm1}$ includes a multiplexed signal coded using orthogonal code sequence $Code_{ncm\_min}$, coded Doppler demultiplexer 212 determines that the output of Doppler analyzer 210 for distance index $f_{b\_cfar}$, Doppler frequency index ($f_{s\_comp\_cfar}$+(DOPposi ($DOP_{ndm}$, DopCase_min)−1)×ΔFD) in the z-th signal processor 206 exceeds the range of maximum Doppler frequencies without causing aliasing derived from the sampling theorem.

If it is determined that Doppler aliasing occurs, coded Doppler demultiplexer 212 decides (in other words, fixes) a Doppler frequency index of the target and a transmit antenna.

Doppler Frequency Determination for Target:

Coded Doppler demultiplexer 212 determines that the Doppler frequency index of the target is ($f_{s\_comp\_cfar}$+(DopCase_min−1)×ΔFD)−$DOP_1$−Ncode×Sign($f_{s\_comp\_cfar}$+ (DopCase_min−1)×ΔFD−$DOP_1$)). For example, the Doppler frequency interval for Doppler frequency index $f_{s\_comp\_cfar}$ is 1/(Ncode×Loc×Tr). Therefore, coded Doppler demultiplexer 212 determines that Doppler frequency $f_{TARGET}$ of the target is ($f_{s\_comp\_cfar}$+(DopCase_min−1)× ΔFD−$DOP_1$−Ncode×Sign($f_{s\_comp\_cfar}$+(DopCase_min−1)× ΔFD−$DOP_1$))/(Ncode×Loc×Tr). Sign(x) is a sign function and is a function for real numbers x, providing as output 1 when x>0, 0 when x=0, and −1 when x<0.

In this manner, when the outputs of Doppler analyzers 210 contain Doppler aliasing, coded Doppler demultiplexer 212 determines a Doppler frequency of the target, with consideration given to the aliasing component (for example, Ncode×Sign($f_{s\_comp\_cfar}$+(DopCase_min−1)×ΔFD−$DOP_1$)).

Transmit Antenna Determination:

When the outputs of Doppler analyzers 210 contain Doppler aliasing, incorrect phase correction is performed by phase correction used in the code separation process (for example, the exp term in equation 35). This equivalently indicates that a code separation process is performed in a case where the elements of an orthogonal code sequence used for the code separation process are code elements given by following equations 37 and 38.

[37]
$$\left\{OC_{ncm}(1), OC_{ncm}(2)\exp\left[-j2\pi\text{Sign}(f_{est})\frac{2-1}{Loc}\right],\right.$$
$$\left. \ldots, OC_{ncm}(Loc)\exp\left[-j2\pi\text{Sign}(f_{est})\frac{Loc-1}{Loc}\right]\right\} \quad \text{(Equation 37)}$$

[38]
$$f_{est} = f_{s\_comp\_cfar} + (\text{DopCase\_min} - 1) \times \Delta FD - DOP_1 \quad \text{(Equation 38)}$$

For example, in a case where $N_{CM}$=2 and orthogonal code sequence $Code_1$={1, 1} with code length Loc=2 is used, a process equivalent to a separation process using $Code_2$={1, −1}, as given by following equation 39, is performed, regardless of Sign($f_{est}$).

[39]
$$\left\{OC_1(1), OC_1(2)\exp\left[-j2\pi\text{Sign}(f_{est})\frac{1}{2}\right]\right\} = \quad \text{(Equation 39)}$$
$$\{1, 1 \times \exp[-j\pi\text{Sign}(f_{est})]\} = \{1, -1\} = Code_2$$

In a case where $Code_2$={1, −1} is used, on the other hand, a process equivalent to a separation process using $Code_1$={1, 1}, as given by following equation 40, is performed, regardless of Sign($f_{est}$).

[40]
$$\left\{OC_2(1), OC_2(2)\exp\left[-j2\pi\text{Sign}(f_{est})\frac{1}{2}\right]\right\} = \quad \text{(Equation 40)}$$
$$\{1, -1 \times \exp[j\pi\text{Sign}(f_{est})]\} = \{1, 1\} = Code_1.$$

Accordingly, in a case where $N_{CM}$=2 and orthogonal code sequences $Code_1$={1, 1} and $Code_2$={1, −1} with code length Loc=2 are used, coded Doppler demultiplexer 212 determines that for the output of Doppler analyzer 210 for distance index $f_{b\_cfar}$ and Doppler frequency index ($f_{s\_comp\_cfar}$+(DOPposi($DOP_{ndm}$, DopCase_min)−1)×ΔFD) in the z-th signal processor 206, code separation signal $DeMUL_z^{1}$($f_{b\_cfar}$, $f_{s\_comp\_cfar}$+(DOPposi($DOP_{ndm}$, DopCase_min)−1)×ΔFD) using $Code_1$ is the reception signal of the reflected wave transmitted from transmit antenna Tx #[2, ndm] and code separation signal $DeMUL_z^{2}$($f_{b\_cfar}$, $f_{s\_comp\_cfar}$+(DOPposi(DOP$_{ndm}$, DopCase_min)−1)×ΔFD) using Code$_2$ is the reception signal of the reflected wave transmitted from transmit antenna Tx #[1, ndm].

For example, in a case where N$_{CM}$=3 and orthogonal code sequences Code$_1$={1, 1, 1}, Code$_2$={1, exp(j2π/3), exp(j4π/3)}, and Code$_3$={1, exp(−j2π/3), exp(−j4π/3)} with code length Loc=3 (=N$_{CM}$) are used, determination is made as following.

For example, in a case where Code$_1$={1, 1, 1} is used, as given by following equation 41, a process equivalent to a separation process using Code$_3$ or Code$_2$ in accordance with positive or negative Sign(f$_{est}$) is performed.

[41]

$$\left\{ OC_1(1), OC_1(2)\exp\left[-j2\pi \text{Sign}(f_{est})\frac{1}{3}\right], \right.$$

$$\left. OC_1(3)\exp\left[-j2\pi \text{Sign}(f_{est})\frac{2}{3}\right] \right\} = \begin{cases} Code_3, & \text{if Sign}(f_{est}) > 0 \\ Code_2, & \text{if Sign}(f_{est}) < 0 \end{cases}$$

(Equation 41)

For example, in a case where Code$_2$={1, exp(j2π/3), exp(j4π/3)} is used, as given by following equation 42, a process equivalent to a separation process using Code$_1$ or Code$_3$ in accordance with positive or negative Sign(f$_{est}$) is performed.

[42]

$$\left\{ OC_2(1), OC_2(2)\exp\left[-j2\pi \text{Sign}(f_{est})\frac{1}{3}\right], \right.$$

$$\left. OC_2(3)\exp\left[-j2\pi \text{Sign}(f_{est})\frac{2}{3}\right] \right\} = \begin{cases} Code_1, & \text{if Sign}(f_{est}) > 0 \\ Code_3, & \text{if Sign}(f_{est}) < 0 \end{cases}$$

(Equation 42)

For example, in a case where Code$_3$={1, exp(−j2π/3), exp(−j4π/3)} is used, as given by following equation 43, a process equivalent to a separation process using Code$_2$ or Code$_1$ in accordance with positive or negative Sign(f$_{est}$) is performed.

[43]

$$\left\{ OC_3(1), OC_3(2)\exp\left[-j2\pi \text{Sign}(f_{est})\frac{1}{3}\right], \right.$$

$$\left. OC_3(3)\exp\left[-j2\pi \text{Sign}(f_{est})\frac{2}{3}\right] \right\} = \begin{cases} Code_2, & \text{if Sign}(f_{est}) > 0 \\ Code_1, & \text{if Sign}(f_{est}) < 0 \end{cases}$$

(Equation 43)

Accordingly, in a case where N$_{CM}$=3 and orthogonal code sequences Code$_1$={1, 1, 1}, Code$_2$={1, exp(j2π/3), exp(j4π/3)}, and Code$_3$={1, exp(−j2π/3), exp(−j4π/3)} with code length Loc=3 (=N$_{CM}$) are used, coded Doppler demultiplexer 212 determines transmit antenna 108 in the following way for the output of Doppler analyzer 210 for distance index f$_{b\_cfar}$ and Doppler frequency index (f$_{s\_comp\_cfar}$+(DOPposi(DOP$_{ndm}$, DopCase_min)−1)×ΔFD) in the z-th signal processor 206.

Case where Sign(f$_{est}$)>0:

Coded Doppler demultiplexer 212 determines that code separation signal DeMUL$_z^1$(f$_{b\_cfar}$, f$_{s\_comp\_cfar}$+(DOPposi(DOP$_{ndm}$, DopCase_min)−1)×ΔFD) using Code$_1$ is the reception signal of the reflected wave transmitted from transmit antenna Tx #[3, ndm], that code separation signal DeMUL$_z^2$(f$_{b\_cfar}$, f$_{s\_comp\_cfar}$+(DOPposi(DOP$_{ndm}$, DopCase_min)−1)×ΔFD) using Code$_2$ is the reception signal of the reflected wave transmitted from transmit antenna Tx #[1, ndm], and that code separation signal DeMUL$_z^3$(f$_{b\_cfar}$, f$_{s\_comp\_cfar}$+(DOPposi(DOP$_{ndm}$, DopCase_min)−1)×ΔFD) using Code$_3$ is the reception signal of the reflected wave transmitted from transmit antenna Tx #[2, ndm].

Case where Sign(f$_{est}$)<0:

Coded Doppler demultiplexer 212 determines that code separation signal DeMUL$_z^1$(f$_{b\_cfar}$, f$_{s\_comp\_cfar}$+(DOPposi(DOP$_{ndm}$, DopCase_min)−1)×ΔFD) using Code$_1$ is the reception signal of the reflected wave transmitted from transmit antenna Tx #[2, ndm], that code separation signal DeMUL$_z^2$(f$_{b\_cfar}$, f$_{s\_comp\_cfar}$+(DOPposi(DOP$_{ndm}$, DopCase_min)−1)×ΔFD) using Code$_2$ is the reception signal of the reflected wave transmitted from transmit antenna Tx #[3, ndm], and that code separation signal DeMUL$_z^3$(f$_{b\_cfar}$, f$_{s\_comp\_cfar}$+(DOPposi(DOP$_{ndm}$, DopCase_min)−1)×ΔFD) using Code$_3$ is the reception signal of the reflected wave transmitted from transmit antenna Tx #[1, ndm].

As described above, the correspondence between a code used for coding during transmission and a code separated by the code separation process during aliasing determination is decided in advance based on orthogonal code sequence Code$_{ncm}$(ncm=1, . . . , Ncm) and Sign(f$_{est}$). This enables coded Doppler demultiplexer 212 to use, for example, code conversion function AliasConv[ncm, Sign(f$_{est}$)]=Tx_ncm (that outputs orthogonal code sequence Code$_{Tx\_ncm}$ index Tx_ncm separated in the code separation process using Code$_{ncm}$ during aliasing determination).

Further, inverse code conversion functionAliasConv$^{-1}$[Tx_ncm, Sign(f$_{est}$)]=ncm (that outputs index ncm of code sequence Code$_{ncm}$ used in the code separation process, where the index of an orthogonal code sequence separated in the code separation process during aliasing determination is Tx_ncm) can also be defined in a similar manner.

For example, in a case where Ncm=2 and orthogonal code sequences Code$_1$={1, 1} and Code$_2$={1, −1} with code length Loc=2 are used, code conversion function AliasConv[ncm, Sign(f$_{est}$)] is decided in advance such that AliasConv[1, Sign(f$_{est}$)]=2 and AliasConv[2, Sign(f$_{est}$)]=1. Further, the inverse code conversion function is decided in advance such that AliasConv$^{-1}$[1, Sign(f$_{est}$)]=2 and AliasConv$^{-1}$[2, Sign(f$_{est}$)]=1.

For example, in a case where N$_{CM}$=3 and orthogonal code sequences Code$_1$={1, 1, 1}, Code$_2$={1, exp(j2π/3), exp(j4π/3)}, and Code$_3$={1, exp(−j2π/3), exp(−j4π/3)} with code length Loc=3 (=Ncm) are used, code conversion function AliasConv[ncm, Sign(f$_{est}$)] is decided in advance in the following way.

Case where Sign(f$_{est}$)>0:

Code conversion function AliasConv[ncm, Sign(f$_{est}$)] is decided in advance such that AliasConv[1, Sign(f$_{est}$)]=3, AliasConv[2, Sign(f$_{est}$)]=1, and AliasConv[3, Sign(f$_{est}$)]=2. Further, the inverse code conversion function is decided in advance such that AliasConv$^{-1}$[1, Sign(f$_{est}$)]=2, AliasConv$^{-1}$[2, Sign(f$_{est}$)]=3, and AliasConv$^{-1}$[3, Sign(f$_{est}$)]=1.

Case where Sign(f$_{est}$)<0:

Code conversion function AliasConv[ncm, Sign(f$_{est}$)] is decided in advance such that AliasConv[1, Sign(f$_{est}$)]=2, AliasConv[2, Sign(f$_{est}$)]=3, and AliasConv[3, Sign(f$_{est}$)]=1. Further, the inverse code conversion function is decided in advance such that AliasConv$^{-1}$[1, Sign(f$_{est}$)]=3, AliasConv$^{-1}$[2, Sign(f$_{est}$)]=1, and AliasConv$^{-1}$[3, Sign(f$_{est}$)]=2.

Accordingly, for example, with the use of code conversion function AliasConv[ncm, Sign(f$_{est}$)], coded Doppler demultiplexer 212 performs transmit antenna determination during aliasing determination in the following way. For example, coded Doppler demultiplexer 212 determines that for the output of Doppler analyzer 210 for distance index $f_{b\_cfar}$ and Doppler frequency index ($f_{s\_comp\_cfar}$+(DOPposi(DOP$_{ndm}$, DopCase_min)−1)×ΔFD) in the z-th signal processor 206, code separation signal DeMUL$_z^{ncm}$($f_{b\_cfar}$, $f_{s\_comp\_cfar}$+(DOPposi(DOP$_{ndm}$, DopCase_min)−1)×ΔFD) using Code$_{ncm}$ is the reception signal corresponding to transmit antenna Tx #[AliasConv[ncm, Sign($f_{est}$)], ndm].

Alternatively, coded Doppler demultiplexer 212 may determine that the reception signal corresponding to transmit antenna Tx #[Tx_ncm, ndm] is a code separation signal given by following equation 44 that uses Code$_{ncm}$ (where ncm=AliasConv$^{-1}$[Tx_ncm, Sign($f_{est}$)]).

$$\text{DeMUL}_z^{AliasConv^{-1}[Tx\_ncm,Sign(fest)]}(f_{b\_cfar}, f_{s\_comp\_cfar}+ \\ (\text{DOPposi}(\text{DOP}_{ndm},\text{DopCase\_min})-1)\times\Delta FD) \quad \text{(Equation 44)}$$

Also in a case where $N_{CM}$>3, the code conversion function and the inverse code conversion function can be determined in advance, and the determination of a transmit antenna can be performed in a similar manner.

In this embodiment, accordingly, radar receiver 200 can perform aliasing determination (for example, determination of the presence or absence of aliasing and determination of correspondence DopCase) based on the result of code separation of a coded Doppler multiplexed signal for which the number of coded Doppler multiplexes is set to be smaller than $N_{CM}$. This enables radar apparatus 10 to discriminate transmit antennas 108 corresponding to coded Doppler multiplexed signals and to discriminate Doppler frequencies of the target even if aliasing occurs. According to this embodiment, therefore, for example, the range over which a Doppler frequency is detectable without ambiguity can be extended to the range greater than or equal to −1/(2Tr) and less than 1/(2Tr).

For example, the range over which a Doppler frequency is detectable without ambiguity when one transmit antenna 108 is used for transmission is the range greater than or equal to −1/(2Tr) and less than 1/(2Tr). In this embodiment, therefore, even when plural transmit antennas 108 are used, the range over which a Doppler frequency is detectable without ambiguity can be achieved in a manner similar to that when a single antenna is used for transmission.

Next, processing for a plurality of coded Doppler multiplexed signals for which the numbers of coded Doppler multiplexes are set to be smaller than $N_{CM}$ (see, for example, FIGS. 5A to 5C, 6A to 6C, 10A, 10B, 11A, 11B, and so on) will be described.

For example, a coded Doppler multiplexed signal for which the number of coded Doppler multiplexes is set to be smaller than $N_{CM}$ is not only Doppler shift amount DOP$_{ndm1}$, but there is a plurality of coded Doppler multiplexed signals for which the numbers of coded Doppler multiplexes are set to be smaller than $N_{CM}$. In this case, coded Doppler demultiplexer 212 detects ncm_min1, ncm_min2, and DopCase_min in the following way.

For example, when coded Doppler multiplexed signals for which the numbers of coded Doppler multiplexes are set to ($N_{CM}$−1), which is smaller than $N_{CM}$, are Doppler shift amounts DOP$_{ndm1}$ and DOP$_{ndm2}$, coded Doppler demultiplexer 212 calculates, based on equation 36, code separation signal power sums Pow_DeMUL$^{ncm}$($f_{b\_cfar}$, $f_{s\_comp\_cfar}$+(DOPposi(DOP$_{ndm1}$, DopCase)−1)×ΔFD) and Pow_DeMUL$^{ncm}$($f_{b\_cfar}$, $f_{s\_comp\_cfar}$+(DOPposi(DOP$_{ndm2}$, DopCase)−1)×ΔFD). Here, ncm=1, . . . , $N_{CM}$ and DopCase=1, . . . , $N_{DM}$.

Here, in a coded Doppler multiplexed signal that uses Doppler shift amount DOP$_{ndm1}$, an orthogonal code that is not used for coded Doppler multiplexing is represented by Code$_{ncm1}$, and in a coded Doppler multiplexed signal that uses Doppler shift amount DOP$_{ndm2}$, an orthogonal code that is not used for coded Doppler multiplexing is represented by Code$_{ncm2}$.

In this case, in code separation signal power sum Pow_DeMUL$^{ncm1}$($f_{b\_cfar}$, $f_{s\_comp\_cfar}$+(DOPposi(DOP$_{ndm1}$, DopCase)−1)×ΔFD)+Pow_DeMUL$^{ncm2}$($f_{b\_cfar}$, $f_{s\_comp\_cfar}$+(DOPposi(DOP$_{ndm2}$, DopCase)−1)×ΔFD) or code separation signal power sum Pow_DeMUL$^{AliasConv[ncm1],\ Sign(fest)]}$($f_{b\_cfar}$, $f_{s\_comp\_cfar}$+(DOPposi(DOP$_{ndm1}$, DopCase)−1)×ΔFD)+Pow_DeMUL$^{AliasConv[ncm2],\ Sign(fest)]}$($f_{b\_cfar}$, $f_{s\_comp\_cfar}$+(DOPposi(DOP$_{ndm2}$, DopCase)−1)×ΔFD) during Doppler aliasing determination, coded Doppler demultiplexer 212 detects Pow_DeMUL$^{ncm\_min1}$($f_{b\_cfar}$, $f_{s\_comp\_cfar}$+(DOPposi(DOP$_{ndm1}$, DopCase_min)−1)×ΔFD)+Pow_DeMUL$^{ncm\_min2}$($f_{b\_cfar}$, $f_{s\_comp\_cfar}$+(DOPposi(DOP$_{ndm2}$, DopCase_min)−1)×ΔFD) with the minimum received power when DopCase is equal to any of 1, . . . , and $N_{DM}$.

Here, "ncm_min1", "ncm_min2", and "DopCase_min" represent the index numbers of ncm1, ncm2, and DopCase for which code separation signal power sum Pow_DeMUL$^{ncm1}$($f_{b\_cfar}$, $f_{s\_comp\_cfar}$+(DOPposi(DOP$_{ndm1}$, DopCase)−1)×ΔFD)+Pow_DeMUL$^{ncm2}$($f_{b\_cfar}$, $f_{s\_comp\_cfar}$+(DOPposi(DOP$_{ndm2}$, DopCase)−1)×ΔFD) has the minimum received power.

The number of coded Doppler multiplexed signals for which the numbers of coded Doppler multiplexes are set to be smaller than $N_{CM}$ is not limited to two and may be three or more.

The foregoing description has been given of an example of the operation of coded Doppler demultiplexer 212.

In FIG. 1, direction estimator 213 performs a direction estimation process for the target based on distance index $f_{b\_cfar}$ input from coded Doppler demultiplexer 212, the output of Doppler analyzer 210 for Doppler frequency index ($f_{s\_comp\_cfar}$(DOPposi(DOP$_{ndm}$, DopCase_min)−1)×ΔFD), the Doppler frequency determination result for the target, and the transmit antenna determination result (or determination result of Doppler aliasing).

For example, direction estimator 213 generates, based on the output of coded Doppler demultiplexer 212, virtual receive array correlation vector h($f_{b\_cfar}$, $f_{s\_comp\_cfar}$) given by following equation 45 or 46 and performs a direction estimation process.

Virtual receive array correlation vector h($f_{b\_cfar}$, $f_{s\_comp\_cfar}$) includes Nt×Na elements, the number of which is equal to the product of the number Nt of transmit antennas and the number Na of receive antennas. Virtual receive array correlation vector h($f_{b\_cfar}$, $f_{s\_comp\_cfar}$) is used in a process for performing direction estimation on reflected wave signals from the target, the direction estimation being based on a phase difference among receive antennas 202. Here, z=1, . . . , Na.

Case without Aliasing:

$$h(f_{b\_cfar}, f_{s\_comp\_cfar}) =$$

$$\begin{bmatrix} DeMUL_1^1(f_{b\_cfar}, f_{s\_comp\_cfar} + \{DOP_{posi}(DOP_1, DopCase\_min) - 1\} \times \Delta FD) \\ DeMUL_2^1(f_{b\_cfar}, f_{s\_comp\_cfar} + \{DOP_{posi}(DOP_1, DopCase\_min) - 1\} \times \Delta FD) \\ \vdots \\ DeMUL_{Na}^1(f_{b\_cfar}, f_{s\_comp\_cfar} + \{DOP_{posi}(DOP_1, DopCase\_min) - 1\} \times \Delta FD) \\ \vdots \\ DeMUL_1^{N_{DOP\_CODE(1)}}(f_{b\_cfar}, f_{s\_comp\_cfar} + \{DOP_{posi}(DOP_1, DopCase\_min) - 1\} \times \Delta FD) \\ DeMUL_2^{N_{DOP\_CODE(1)}}(f_{b\_cfar}, f_{s\_comp\_cfar} + \{DOP_{posi}(DOP_1, DopCase\_min) - 1\} \times \Delta FD) \\ \vdots \\ DeMUL_{Na}^{N_{DOP\_CODE(1)}}(f_{b\_cfar}, f_{s\_comp\_cfar} + \{DOP_{posi}(DOP_1, DopCase\_min) - 1\} \times \Delta FD) \\ \vdots \\ DeMUL_1^1(f_{b\_cfar}, f_{s\_comp\_cfar} + \{DOP_{posi}(DOP_{N_{DM}}, DopCase\_min) - 1\} \times \Delta FD) \\ DeMUL_2^1(f_{b\_cfar}, f_{s\_comp\_cfar} + \{DOP_{posi}(DOP_{N_{DM}}, DopCase\_min) - 1\} \times \Delta FD) \\ \vdots \\ DeMUL_{Na}^1(f_{b\_cfar}, f_{s\_comp\_cfar} + \{DOP_{posi}(DOP_{N_{DM}}, DopCase\_min) - 1\} \times \Delta FD) \\ \vdots \\ DeMUL_1^{N_{DOP\_CODE(N_{DM})}}(f_{b\_cfar}, f_{s\_comp\_cfar} + \{DOP_{posi}(DOP_{N_{DM}}, DopCase\_min) - 1\} \times \Delta FD) \\ DeMUL_2^{N_{DOP\_CODE(N_{DM})}}(f_{b\_cfar}, f_{s\_comp\_cfar} + \{DOP_{posi}(DOP_{N_{DM}}, DopCase\_min) - 1\} \times \Delta FD) \\ \vdots \\ DeMUL_{Na}^{N_{DOP\_CODE(N_{DM})}}(f_{b\_cfar}, f_{s\_comp\_cfar} + \{DOP_{posi}(DOP_{N_{DM}}, DopCase\_min) - 1\} \times \Delta FD) \end{bmatrix}$$

Case with Aliasing:

(Equation 46)

$$h(f_{b\_cfar}, f_{s\_comp\_cfar}) =$$

-continued $$\begin{bmatrix} DeMUL_1^{AliasConv^{-1}[1,Sign(f_{est})]}(f_{b\_cfar}, f_{s\_comp\_cfar} + \{DOP_{posi}(DOP_1, DopCase\_min) - 1\} \times \Delta FD) \\ DeMUL_2^{AliasConv^{-1}[1,Sign(f_{est})]}(f_{b\_cfar}, f_{s\_comp\_cfar} + \{DOP_{posi}(DOP_1, DopCase\_min) - 1\} \times \Delta FD) \\ \vdots \\ DeMUL_{Na}^{AliasConv^{-1}[1,Sign(f_{est})]}(f_{b\_cfar}, f_{s\_comp\_cfar} + \{DOP_{posi}(DOP_1, DopCase\_min) - 1\} \times \Delta FD) \\ \vdots \\ DeMUL_1^{AliasConv^{-1}[N_{DOP\_Code}(1),Sign(f_{est})]}(f_{b\_cfar}, f_{s\_comp\_cfar} + \{DOP_{posi}(DOP_1, DopCase\_min) - 1\} \times \Delta FD) \\ DeMUL_2^{AliasConv^{-1}[N_{DOP\_Code}(1),Sign(f_{est})]}(f_{b\_cfar}, f_{s\_comp\_cfar} + \{DOP_{posi}(DOP_1, DopCase\_min) - 1\} \times \Delta FD \\ \vdots \\ DeMUL_{Na}^{AliasConv^{-1}[N_{DOP\_Code}(1),Sign(f_{est})]}(f_{b\_cfar}, f_{s\_comp\_cfar} + \{DOP_{posi}(DOP_1, DopCase\_min) - 1\} \times \Delta FD \\ \vdots \\ DeMUL_1^{AliasConv^{-1}[1,Sign(f_{est})]}(f_{b\_cfar}, f_{s\_comp\_cfar} + \{DOP_{posi}(DOP_{N_{DM}}), DopCase\_min) - 1\} \times \Delta FD) \\ DeMUL_2^{AliasConv^{-1}[1,Sign(f_{est})]}(f_{b\_cfar}, f_{s\_comp\_cfar} + \{DOP_{posi}(DOP_{N_{DM}}), DopCase\_min) - 1\} \times \Delta FD) \\ \vdots \\ DeMUL_{Na}^{AliasConv^{-1}[1,Sign(f_{est})]}(f_{b\_cfar}, f_{s\_comp\_cfar} + \{DOP_{posi}(DOP_{N_{DM}}), DopCase\_min) - 1\} \times \Delta FD) \\ \vdots \\ DeMUL_1^{AliasConv^{-1}[N_{DOP\_Code}(N_{DM}),Sign(f_{est})]}(f_{b\_cfar}, f_{s\_comp\_cfar} + \{DOP_{posi}(DOP_{N_{DM}}), DopCase\_min) - 1\} \times \Delta FD) \\ DeMUL_2^{AliasConv^{-1}[N_{DOP\_Code}(N_{DM}),Sign(f_{est})]}(f_{b\_cfar}, f_{s\_comp\_cfar} + \{DOP_{posi}(DOP_{N_{DM}}), DopCase\_min) - 1\} \times \Delta FD \\ \vdots \\ DeMUL_{Na}^{AliasConv^{-1}[N_{DOP\_Code}(N_{DM}),Sign(f_{est})]}(f_{b\_cfar}, f_{s\_comp\_cfar} + \{DOP_{posi}(DOP_{N_{DM}}), DopCase\_min) - 1\} \times \Delta FD \end{bmatrix}$$

For example, direction estimator 213 calculates a spatial profile, with azimuth direction θ in direction estimation evaluation function value $P_H(\theta, f_{b\_cfar}, f_{s\_comp\_cfar})$ being variable within a defined angular range. Direction estimator 213 extracts a predetermined number of local maximum peaks in the calculated spatial profile in order from the largest and outputs the azimuth directions of the local maximum peaks as direction-of-arrival estimation values (for example, position measurement output).

There are various methods with direction estimation evaluation function value $P_H(\theta, f_{b\_cfar}, f_{s\_comp\_cfar})$ depending on the direction-of-arrival estimation algorithm. For example, an estimation method using an array antenna, as disclosed in NPL 3, may be used.

For example, when a virtual receive array includes Nt×Na elements arranged in a straight line at equal intervals $d_H$, a beamformer method can be given by following equations 47 and 48. Any other technique, such as Capon or MUSIC, may be applicable.

[47]
$$P_H(\theta_u, f_{b\_cfar}, f_{s\_comp\_cfar}) = \qquad \text{(Equation 47)}$$
$$|a^H(\theta_u)D_{cal}h(f_{b\_cfar}, f_{s\_comp\_cfar})|^2$$

[48]
$$a(\theta_u) = \begin{bmatrix} 1 \\ \exp\{-j2\pi d_H \sin\theta_u/\lambda\} \\ \vdots \\ \exp\{-j2\pi(N_t N_a - 1)d_H \sin\theta_u/\lambda\} \end{bmatrix} \qquad \text{(Equation 48)}$$

In equation 47, the superscript H denotes the Hermitian transpose operator. Further, $a(\theta_u)$ denotes the direction vector of the virtual receive array relative to an incoming wave in azimuth direction $\theta_u$.

Azimuth direction $\theta_u$ is a vector that is changed at azimuth interval $\beta_1$, in an azimuth range over which direction-of-arrival estimation is performed. For example, $\theta_u$ is set as follows.

$$\theta_u = \theta\min + u\beta_1, u = 0, \ldots, NU$$

$$NU = \text{floor}[(\theta\max - \theta\min)/\beta_1] + 1$$

Here, floor(x) is a function that returns the largest integer value not greater than real number x.

In equation 47, furthermore, Dcal is an (Nt×Na) order matrix including an array correction coefficient for correcting phase deviations and amplitude deviations across the transmit array antenna and across the receive array antenna, and a coefficient for reducing the influence of coupling of elements across the antennas. If the coupling between antennas in the virtual receive array is negligible, Dcal is a diagonal matrix with diagonal components including an array correction coefficient for correcting phase deviations and amplitude deviations across the transmit array antenna and across the receive array antenna.

For example, direction estimator 213 may output, as position measurement results, distance information based on distance index $f_{b\_cfar}$ and Doppler velocity information of the target based on the Doppler frequency determination result for the target, together with the direction estimation result, to, for example, a vehicle control apparatus (not illustrated) in the case of an in-vehicle radar or to an infrastructure control apparatus (not illustrated) in the case of an infrastructure radar.

Doppler frequency information may be converted into the relative velocity component and then output. Doppler frequency index $f_{out}$ in the Doppler frequency determination result for the target can be converted into relative velocity component $v_d(f_{out})$ using following equation 49. Here, λ denotes the wavelength of the carrier frequency of an RF signal output from a transmission radio section (not illustrated). Further, $\Delta_f$ denotes the Doppler frequency interval in FFT processing performed in Doppler analyzer 210). For example, in this embodiment, $\Delta_f=1/\{N_{code} \times Loc \times T_r\}$.

[49]
$$v_d(f_{out}) = \frac{\lambda}{2} f_{out} \Delta_f \quad \text{(Equation 49)}$$

As described above, in this embodiment, radar apparatus 10 applies phase rotation amounts corresponding to Doppler shift amounts and orthogonal code sequences to radar transmission signals to transmit radar transmission signals (in other words, coded Doppler multiplexed signals) from plural transmit antennas 108 in a multiplexed manner. In this embodiment, plural transmit antennas 108 are associated with combinations of Doppler shift amounts ($DOP_{ndm}$) and orthogonal code sequences ($DOP_{ncm}$) such that in each of the combinations, at least one of Doppler shift amount ($DOP_{ndm}$) or orthogonal code sequence ($DOP_{ncm}$) is different. In this embodiment, furthermore, the number of multiplexes of the orthogonal code sequence (in other words, the number of codes) corresponding to each Doppler shift amount in combinations of Doppler shift amounts and orthogonal code sequences is different. In other words, the numbers of coded Doppler multiplexes for the respective Doppler-multiplexed transmission signals are set to be non-uniform.

Radar apparatus 10 can determine, based on, for example, the received power of a code-separated signal for each coded Doppler multiplexed signal, transmit antenna 108 associated with the coded Doppler multiplexed signal (in other words, the combination of Doppler shift amount and orthogonal code sequence) and the presence or absence of Doppler aliasing (for example, DopCase and the like). This enables radar apparatus 10 to appropriately determine a Doppler frequency of the target even in the presence of Doppler aliasing.

According to this embodiment, therefore, radar apparatus 10 can extend the effective Doppler frequency bandwidth to $1/(Tr)$ and can extend the Doppler frequency (relative velocity) detection range with no ambiguity. Accordingly, radar apparatus 10 can improve target-object sensing accuracy over a wider Doppler frequency range.

In this embodiment, furthermore, coded Doppler multiplexing, which is performed using both Doppler multiplexing and coding, can reduce the number of Doppler multiplexes compared with the use of only Doppler multiplexing in multiplexing transmission. This can increase the intervals of phase rotation amounts for applying Doppler shifts, thereby, for example, relieving the accuracy requirements (phase modulation accuracy) for the phase shifters and achieving the cost reduction effect of an RF section, including reduction of the man-hours required for the adjustment of the phase shifters.

In this embodiment, furthermore, since coded Doppler multiplexing is performed using both Doppler multiplexing and coding, radar apparatus 10 performs, for each code element, Fourier frequency analysis (FFT processing) to detect the Doppler frequency (detect the relative velocity). Accordingly, for example, compared with Fourier frequency analysis (FFT processing) to detect the Doppler frequency (detect the relative velocity) using only Doppler multiplexing in multiplexing transmission, the FFT size corresponds to (1/code length) and the number of times FFT processing is performed is increased by (code length) times. For example, when the FFT operation amount with FFT size Nc is roughly estimated to be $Nc \times \log_2(Nc)$, coded Doppler multiplexing according to this embodiment has an operation amount ratio of about $\{Loc \times Nc/Loc \times \log_2(Nc/Loc)\}/\{Nc \times \log_2(Nc)\} = 1 - \log_2(Loc)/\log_2(Nc)$ relative to FFT operation with only Doppler multiplexing. For example, in a case where Loc=2 and Nc=1024, the operation amount ratio is 0.9. The operation reduction effect of FFT processing can be achieved, and the effect of simplification of the circuit configuration and cost reduction can also be achieved.

(Variation 1 of Embodiment 1)

Phase rotation amount $\phi_{ndm}$ for applying Doppler shift amount $DOP_{ndm}$ is not limited to, for example, the value given in equation 1 and so on. For example, phase rotation amount $\phi_{ndm}$ may be a value given by following equation 50. Here, round(x) represents the round function that outputs a rounded integer value for real number x. The round($N_{code}/N_{DM}$) term is introduced so that the phase rotation amount is an integer multiple of the Doppler frequency interval in Doppler analyzer 210. In equation 50, the angle is expressed in radian.

[50]
$$\phi_{ndm} = \frac{2\pi}{N_{code}} \text{round}\left(\frac{N_{code}}{N_{DM}}\right)(ndm - 1) \quad \text{(Equation 50)}$$

Variation 2 of Embodiment 1

Embodiment 1 has described a case where in coder 106 in phase rotation amount setter 104, the numbers of coded Doppler multiplexes $N_{DOP\_CODE}(1)$, $N_{DOP\_CODE}(2)$, . . . , and $N_{DOP\_CODE}(N_{DM})$ are set to be different (in other words, non-uniform) in a range greater than or equal to 1 and less than or equal to $N_{CM}$; however, this is not required. For example, at least one of the numbers of coded Doppler multiplexes $N_{DOP\_CODE}(1)$, $N_{DOP\_CODE}(2)$, . . . , and $N_{DOP\_CODE}(N_{DM})$ may be greater than or equal to 1 and less than $N_{CM}$, and the number of coded Doppler multiplexes, whose value is 0, may be included.

For example, coded Doppler demultiplexer 212 detects, for combinations of candidate codes that are not used among $N_{CM}$ orthogonal codes, a combination with the minimum code separation signal power sum. Accordingly, combinations of DopCase_min and codes (ncm_min1, ncm_min2, . . . ) can be detected. Further, coded Doppler demultiplexer 212 performs Doppler aliasing determination by utilizing the inclusion of at least one $DOP_{ndm1}$ for which the number of coded Doppler multiplexes is set to be greater than or equal to 1 and less than $N_{CM}$.

This enables radar apparatus 10 to detect Doppler frequency $f_{TARGET}$ of the target in the range of $-1/(2 \times Tr) \leq f_{TARGET} < 1/(2 \times Tr)$ and to perform discrimination of transmit antennas 108 and discrimination of Doppler frequencies of the target.

Figure 14A:
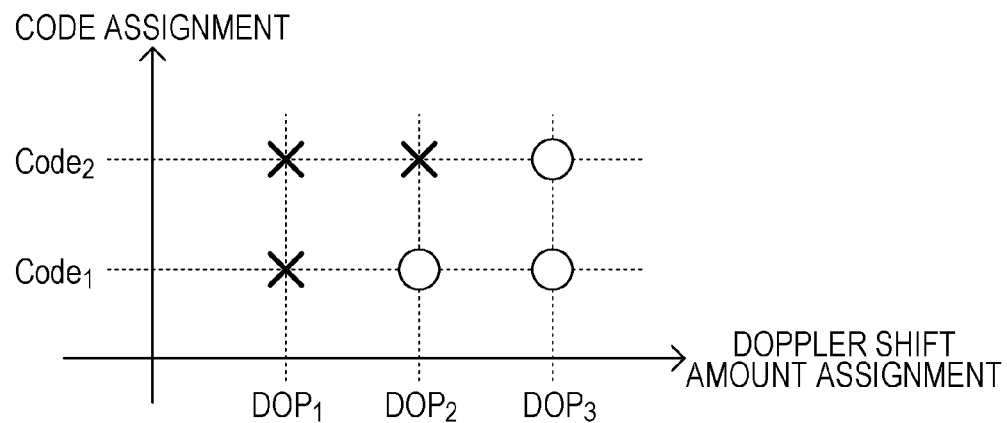
FIGS. 14A and 14B are diagrams illustrating an example of the assignment of Doppler shift amounts and orthogonal codes according to Embodiment 1.

For example, FIG. 14A illustrates a case where Nt=3, $N_{DM}=3$, and $N_{CM}=2$ and where the assignment numbers (in other words, the numbers of coded Doppler multiplexes) of orthogonal codes Code₁ and Code₂ to Doppler shift amounts $DOP_1$, $DOP_2$, and $DOP_3$ are set such that $N_{DOP\_CODE}(1)=0$, $N_{DOP\_CODE}(2)=1$, and $N_{DOP\_CODE}(3)=2$. Also in FIG. 14A, effects similar to those in Embodiment 1 are obtained.

Figure 14B:
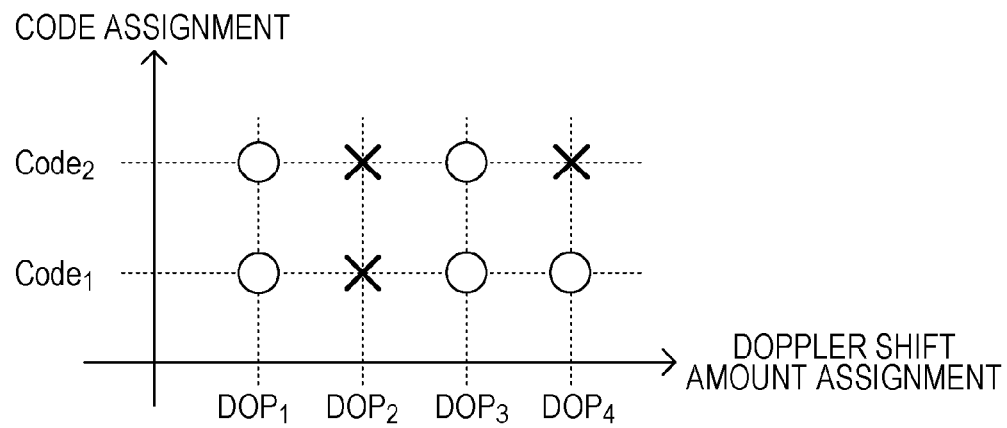

FIG. 14B illustrates a case where Nt=5, $N_{DM}=4$, and $N_{CM}=2$ and where the assignment numbers (in other words, the numbers of coded Doppler multiplexes) of orthogonal codes Code₁ and Code₂ to Doppler shift amounts $DOP_1$, $DOP_2$, $DOP_3$, and $DOP_4$ are set such that $N_{DOP\_CODE}(1)=2$, $N_{DOP\_CODE}(2)=0$, $N_{DOP\_CODE}(3)=2$, and $N_{DOP\_CODE}(4)=1$. Also in FIG. 14B, effects similar to those in Embodiment 1 are obtained.

Variation 3 of Embodiment 1

Variation 3 describes the sub-array configuration of transmit antennas of a radar apparatus.

A combination of some of the transmit antennas may be used as a sub-array to narrow the beam width of a transmission directional beam pattern to improve transmission directional gain. This narrows the sensible angular range, but increases the sensible distance range. In addition, a beam weight factor for generating a directional beam can be made variable to control the beam direction to be variable.

Figure 15:
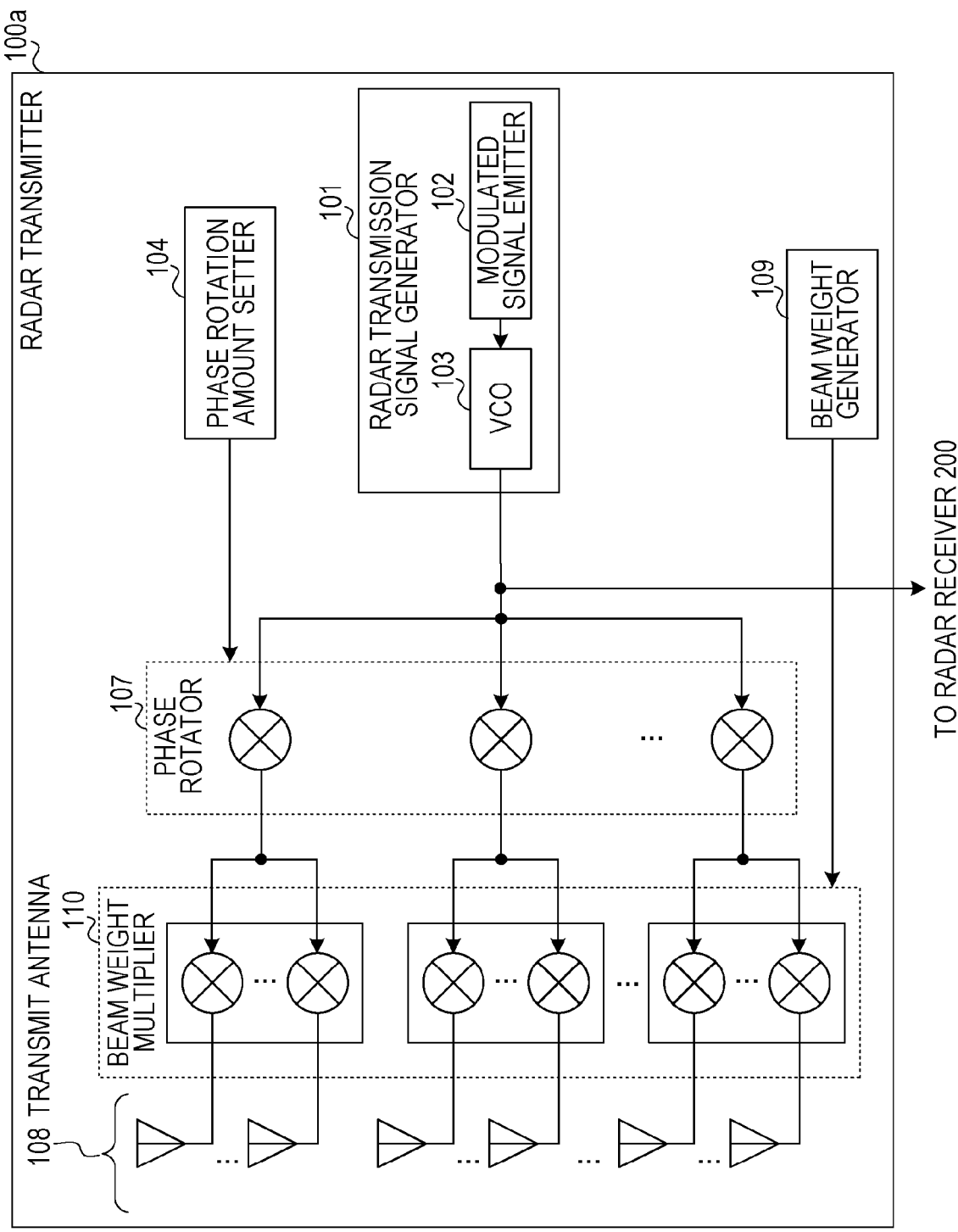
FIG. 15 is a block diagram illustrating an example configuration of a radar transmitter according to Variation 3 of Embodiment 1.

FIG. 15 is a block diagram illustrating an example configuration of radar transmitter 100a according to Variation 3. In FIG. 15, components that perform operations similar to those in radar transmitter 100 illustrated in FIG. 1 are identified with the same numerals, and a description thereof is omitted. A radar receiver according to Variation 3 has substantially the same basic configuration as that of radar receiver 200 illustrated in FIG. 1 and will thus be described with reference to FIG. 1.

In FIG. 15, for example, sub-arrays (for example, Nt sub-arrays) each having $N_{SA}$ transmit antennas 108 are configured for the respective outputs of Nt phase rotators 107. The sub-array configuration of transmit antennas 108 is not limited to that in the example illustrated in FIG. 15. For example, the number of transmit antennas (in other words, $N_{SA}$) included in a sub-array for the output of each phase rotator 107 may differ from phase rotator 107 to phase rotator 107. Here, $N_{SA}$ is an integer greater than or equal to 1. In a case where $N_{SA}=1$, a configuration similar to that in FIG. 1 is provided.

In FIG. 15, beam weight generator 109 generates a beam weight for directing the main beam direction of transmission beams to a predetermined direction using sub-arrays. For example, the transmission beam direction when sub-arrays each having $N_{SA}$ transmit antennas are arranged along a straight line at element spacing $d_{SA}$ is represented by $\theta_{TxBF}$. In this case, for example, beam weight generator 109 generates beam weight $W_{Tx}(Index\_TxSubArray, \theta_{TxBF})$ as given by following equation 51.

[51]
$$W_{Tx}(Index\_TxSubArray, \theta_{TxBF}) = \begin{bmatrix} 1 \\ \exp(j2\pi d \sin \theta_{TxBF}/\lambda) \\ \vdots \\ \exp[j2\pi(Index\_TxSubArray - 1)d_{SA} \sin \theta_{TxBF}/\lambda] \end{bmatrix}$$ (Equation 51)

Here, Index_TxSubArray represents the element index of a sub-array, and Index_TxSubArray=1, . . . , $N_{SA}$. Further, k denotes the wavelength of a radar transmission signal, and $d_{SA}$ denotes sub-array antenna spacing.

Each beam weight multiplier 110 multiplies the output of the corresponding one of phase rotators 107 by beam weight factor $W_{Tx}(Index\_TxSubArray, \theta_{TxBF})$ input from beam weight generator 109. Transmission signals multiplied by beam weight $W_{Tx}(Index\_TxSubArray, \theta_{TxBF})$ are transmitted from $N_{SA}$ sub-array antennas. Here, Index_TxSubArray=1, . . . , $N_{SA}$.

With the operation described above, radar transmitter 100a can perform transmission such that transmission directional beams can be directed in a predetermined direction using sub-arrays for the outputs of phase rotators 107. This can improve transmission directional gain in a predetermined direction and extend the sensible distance range. Additionally, the SNR can be improved.

Further, radar transmitter 100a can variably set a beam weight factor for generating a transmission directional beam to control the beam direction to be variable.

The configuration for sub-array transmission described in Variation 3 is also applicable to other variations or embodiments.

In the configuration illustrated in FIG. 15, phase rotation using phase rotators 107 and beam weight multiplication using beam weight multipliers 110 are separately performed; however, this configuration is not required. For example, each beam weight multiplier 110 may perform multiplication such that phase rotation $\psi_{ndop\_code(ndm), ndm}(m)$ obtained by the corresponding one of phase rotators 107 is included in beam weight factor $W_{Tx}(Index\_TxSubArray, \theta_{TxBF})$. That is, each beam weight multiplier 110 may multiply a chirp signal output from radar transmission signal generator 101 by $W_{Tx}(Index\_TxSubArray, \theta_{TxBF}) \times \exp(j\psi_{ndop\_code(ndm), ndm}(m))$. This configuration can remove phase shifters and phase modulators of phase rotators and simplify the circuit configuration.

Variation 4 of Embodiment 1

Variation 4 describes a case where the Doppler shift amount (or transmission period Tr) varies for each transmission frame. In other words, the intervals of Doppler shift amounts used for coded Doppler multiplexing transmission are each set to vary for each frame (for example, every Nc transmission periods (Nc×Tr)) in which a radar transmission signal is transmitted.

For example, there is a plurality of targets having substantially equal reception levels for the same distance index $f_{b\_cfar}$. In this case, if the intervals of Doppler peaks of the plurality of targets match the intervals of Doppler shift amounts in Doppler multiplexing, coded Doppler demultiplexer 212 may be unable to discriminate transmit antennas 108 and the Doppler frequencies of the targets.

Since the Doppler frequencies of a plurality of targets may differ, the relative movement speeds between the targets and radar apparatus 10 may differ. Radar apparatus 10 continuously performs radar observation such that even if transmit antennas 108 and the Doppler frequencies of the targets fail to be discriminated in radar position measurement output at a certain point in time, the distance between the plurality of targets is different in radar position measurement output at the subsequent point in time, resulting in it being likely that measurement is successful. It is therefore assumed that separate output of each of the plurality of targets is likely to be obtained.

In addition, to more reliably separate signals corresponding to the plurality of targets, for example, radar apparatus 10 may continuously perform radar position measurement by setting at least one of transmission period Tr and the Doppler shift amount to vary for each radar position measurement (for example, every Nc transmission periods (Nc× Tr)).

Accordingly, for example, even if, for the same distance index $f_{b\_cfar}$, the reception levels of Doppler peaks of a plurality of targets are substantially equal, the intervals of the Doppler peaks match the intervals of Doppler shift amounts, and coded Doppler demultiplexer 212 is unable to discriminate transmit antennas 108 and to discriminate the Doppler frequencies of the targets, the intervals of the Doppler shift amounts may be more likely to be different in the subsequent radar position measurement. This enables radar apparatus 10 to more reliably separate the signals corresponding to the plurality of targets.

For example, phase rotation amount $\phi_{ndm}$ for applying Doppler shift amount $DOP_{ndm}$ may be set as given by following equation 52 (the angle is expressed in radian).

[52]
$$\phi_{ndm} = \frac{2\pi(ndm-1)}{N_{DM} + \delta} \quad \text{(Equation 52)}$$

For example, in equation 52, radar apparatus 10 varies 6 for each radar position measurement, thereby variably setting the intervals of the Doppler shift amounts. For example, radar apparatus 10 may periodically vary 6 for each radar position measurement to 0, 1, 0, 1, ....

Further, for example, radar apparatus 10 sets transmission period Tr to vary for each radar position measurement, thereby changing the intervals of the Doppler shift amounts. As a result, an effect equivalent to that when the Doppler shift amounts are variably set is achieved.

Variation 5 of Embodiment 1

Variation 5 describes, for example, a method for reducing the influence of interference from a plurality of radar apparatuses for which the same or some frequency bands overlap.

Figure 16:
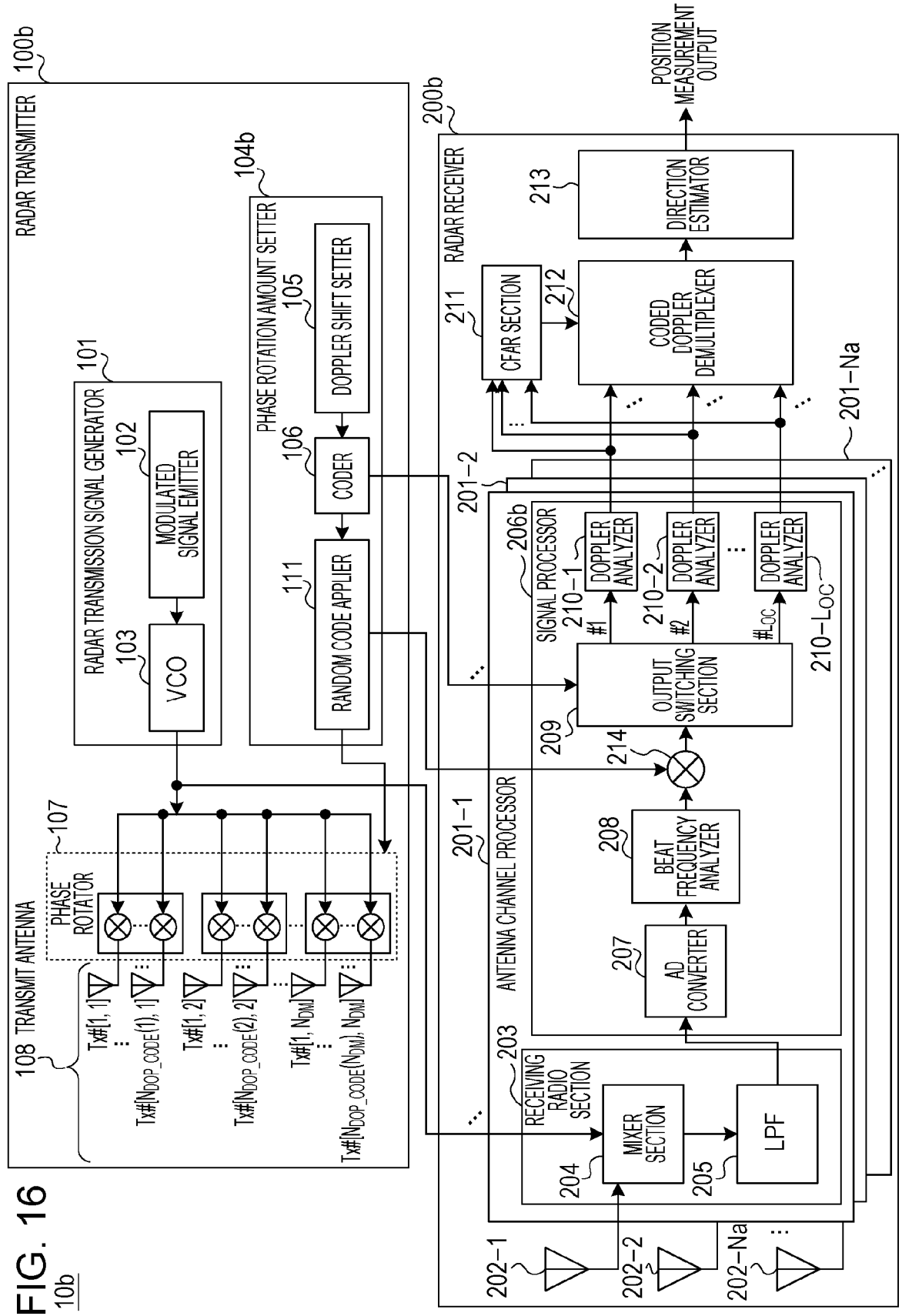
FIG. 16 is a block diagram illustrating an example configuration of a radar apparatus according to Variation 5 of Embodiment 1.

FIG. 16 is a block diagram illustrating an example configuration of radar apparatus 10b according to Variation 5. In FIG. 16, the same components as those in FIG. 1 are identified with the same numerals, and a description thereof is omitted. For example, in radar apparatus 10b illustrated in FIG. 16, compared with radar apparatus 10 illustrated in FIG. 1, phase rotation amount setter 104b in radar transmitter 100b further includes random code applier 111, and signal processor 206b in radar receiver 200b further includes random code multiplier 214.

In FIG. 16, random code applier 111 multiplies, for example, coded Doppler phase rotation amount $\psi_{ndop\_code(ndm),\ ndm}(m)$ output from coder 106 by code element RC(RC_INDEX(m)) of pseudo-random code sequence RCode and outputs the result to phase rotators 107. Here, m=1, ..., Nc, mdn=1, ..., $N_{DM}$, and ndop_code(ndm)=1, ..., $N_{DOP\_CODE}$(ndm).

Pseudo random noise (PN) codes, M-sequence codes, or Gold codes may be used as pseudo-random codes, for example. Pseudo-random code sequence RCode is constituted by, for example, LRC code elements, as given by following equation 53.

$$RCode=\{RC(1),RC(2), \ldots ,RC(N_{LRC})\} \quad \text{(Equation 53)}$$

Code elements of a pseudo-random code sequence include, for example, values of 1 to −1, where a phase rotation of 0 is applied for 1 and a phase rotation of 7 is applied for −1. A pseudo-random code sequence has code length $N_{LRC}$ less than or equal to $N_c$. Further, for example, random code applier 111 cyclically varies code element index RC_INDEX(m) for the pseudo-random code sequence every m-th transmission period, as given by following equation 54.

$$RC\_INDEX(m)=\text{mod}(m-1,N_{LRC})+1 \quad \text{(Equation 54)}$$

Further, random code applier 111 outputs random code element RC(RC_INDEX(m)) of pseudo-random code sequence RCode to random code multiplier 214.

In radar transmitter 100b, each of Nt phase rotators 107 applies, for each transmission period Tr, coded Doppler phase rotation amount $\psi_{ndop\_code(ndm),\ ndm}(m)$ to which code element RC(RC_INDEX(m)) of pseudo-random code sequence RCode is applied, namely, phase rotation amount $\psi_{ndop\_code(ndm),\ ndm}(m)$+angle[RC(RC_INDEX(m))], to a chirp signal output from radar transmission signal generator 101.

For example, a description will be given of a case where when the number of transmit antennas used for multiplexing transmission Nt=3, the number of Doppler multiplexes $N_{DM}$=2, $N_{CM}$=2, orthogonal code sequences Code$_1$={1, 1} and Code$_2$={1, −1} with code length Loc=2 are used, and the numbers of coded Doppler multiplexes are set such that $N_{DOP\_CODE}$(1)=1 and $N_{DOP\_CODE}$(2)=2.

In this case, random code applier 111 applies random code RC(RC_INDEX(m)) to coded Doppler phase rotation amounts $\psi_{1,1}(m)$, $\psi_{1,2}(m)$, and $\psi_{2,2}(m)$ and outputs the resulting phase rotation amounts to phase rotators 107 for each transmission period.

Phase rotator PROT #[1, 1] applies, for each transmission period, phase rotation to a chirp signal generated in radar transmission signal generator 101 in a manner given by following expression 55 for each transmission period. The output of phase rotator PROT #[1, 1] is output from transmit antenna Tx #[1, 1]. Here, cp(t) denotes a chirp signal for each transmission period.

$$\exp[j\{\psi_{1,1}(1)+\text{angle}[RC(1)]\}]cp(t), \exp[j\{\psi_{1,1}(2)+\text{angle}[RC(2)]\}]cp(t), \ldots, \quad \text{(Expression 55)}$$

Likewise, phase rotator PROT #[1, 2] applies, for each transmission period, phase rotation to a chirp signal generated in radar transmission signal generator 101 in a manner given by following expression 56 for each transmission period. The output of phase rotator PROT #[1, 2] is output from transmit antenna Tx #[1, 2].

$$\exp[j\{\psi_{1,2}(1)+\text{angle}[RC(1)]\}]cp(t), \exp[j\{\psi_{1,2}(2)+\text{angle}[RC(2)]\}]cp(t), \ldots, \quad \text{(Expression 56)}$$

Likewise, phase rotator PROT #[2, 2] applies, for each transmission period, phase rotation to a chirp signal generated in radar transmission signal generator 101 in a manner given by following expression 57 for each transmission period. The output of phase rotator PROT #[2, 2] is output from transmit antenna Tx #[2, 2].

$$\exp[j\{\psi_{2,2}(1)+\text{angle}[RC(1)]\}]cp(t), \exp[j\{\psi_{2,2}(2)+\text{angle}[RC(2)]\}]cp(t), \ldots, \quad \text{(Expression 57)}$$

In radar receiver 200b, random code multiplier 214 multiplies output signal $RFT_z(f_b, m)$ of beat frequency analyzer 208 in transmission period m by random code element RC(RC_INDEX(m)) input from random code applier 111. Random code multiplier 214 outputs a signal represented by RC(RC_INDEX(m))×$RFT_z(f_b, m)$ to output switching section 209. Here, z=1, ..., Na.

With the operation described above, even in the presence of interference from a plurality of radar apparatuses for which the same or some frequency bands overlap, in radar apparatus 10b, the interference signals can be converted into pseudo-random signals by random code multiplier 214 before being input to Doppler analyzers 210. Accordingly, in the outputs of Doppler analyzers 210, the effect of diffusing the signal power of interference waves over the Doppler frequency domain is achieved. For example, multiplication of a pseudo-random code sequence can reduce peak power of an interference wave to about 1/Ncode. This can greatly reduce the probability of CFAR section 211 in the subsequent stage erroneously detecting peaks of interference waves.

If phase rotators 107 do not have sufficient phase rotation accuracy, a phase rotation error caused by the application of a random code during a transmission period of an orthogonal code may cause interference between orthogonal codes. To address the interference, for example, code length $N_{LRC}$ of the pseudo-random code sequence is set to be less than or equal to Ncode, and random code applier 111 may apply the same random code element during the transmission period of orthogonal code length Loc. For example, random code applier 111 may set pseudo-random code element index RC_INDEX(m) given by following equation 58 for each transmission period m.

$$RC\_INDEX(m) = \text{mod}\left(\frac{\text{floor}[m-1]}{Loc}, N_{LRC}\right) + 1 \quad \text{(Equation 58)}$$

This allows the same random code element to be applied during the transmission period of an orthogonal code. Even when phase rotators 107 do not have sufficient phase rotation accuracy, phase rotation errors caused by random codes are constant, and interference between orthogonal codes can be reduced.

For example, a description will be given of a case where when RC_INDEX(m) given by equation 58 is used, the number of transmit antennas used for multiplexing transmission Nt=3, the number of Doppler multiplexes $N_{DM}=2$, $N_{CM}=2$, orthogonal code sequences $Code_1=\{1, 1\}$ and $Code_2=\{1, -1\}$ with code length Loc=2 are used, and the numbers of coded Doppler multiplexes are set such that $N_{DOP\_CODE}(1)=1$ and $N_{DOP\_CODE}(2)=2$.

In this case, random code applier 111 applies random code RC(RC_INDEX(m)) to coded Doppler phase rotation amounts $\psi_{1,1}(m)$, $\psi_{1,2}(m)$, and $\psi_{2,2}(m)$ and outputs the resulting phase rotation amounts to phase rotators 107 for each transmission period.

Phase rotator PROT #[1, 1] applies, for each transmission period, phase rotation to a chirp signal generated in radar transmission signal generator 101 in a manner given by following expression 59 for each transmission period. The output of phase rotator PROT #[1, 1] is output from transmit antenna Tx #[1, 1]. Here, cp(t) denotes a chirp signal for each transmission period.

$$\exp[j\{\psi_{1,1}(1)+\text{angle}[RC(1)]\}]cp(t), \exp[j\{\psi_{1,1}(2)+\text{angle}[RC(1)]1\}]cp(t), \exp[j\{\psi_{1,1}(3)+\text{angle}[RC(2)]\}]cp(t), \exp[j\{\varphi_{1,1}(4)+\text{angle}[RC(2)]\}]cp(t), \ldots, \quad \text{(Expression 59)}$$

Likewise, phase rotator PROT #[1, 2] applies, for each transmission period, phase rotation to a chirp signal generated in radar transmission signal generator 101 in a manner given by following expression 60 for each transmission period. The output of phase rotator PROT #[1, 2] is output from transmit antenna Tx #[1, 2].

$$\exp[j\{\psi_{1,2}(1)+\text{angle}[RC(1)]\}]cp(t), \exp[j\{\psi_{1,2}(2)+\text{angle}[RC(1)]\}]cp(t), \exp[j\{\psi_{1,2}(3)+\text{angle}[RC(2)]\}]cp(t), \exp[j\{\psi_{1,2}(4)+\text{angle}[RC(2)]\}]cp(t), \ldots, \quad \text{(Expression 60)}$$

Likewise, phase rotator PROT #[2, 2] applies, for each transmission period, phase rotation to a chirp signal generated in radar transmission signal generator 101 in a manner given by following expression 61 for each transmission period. The output of phase rotator PROT #[2, 2] is output from transmit antenna Tx #[2, 2].

$$\exp[j\{\psi_{2,2}(1)+\text{angle}[RC(1)]\}]cp(t), \exp[j\{\psi_{2,2}(2)+\text{angle}[RC(1)]\}]cp(t), \exp[j\{\psi_{2,2}(3)+\text{angle}[RC(2)]\}]cp(t), \exp[j(\psi_{2,2}(4)+\text{angle}[RC(2)]\}]cp(t), \ldots, \quad \text{(Expression 61)}$$

Variation 6 of Embodiment 1

Embodiment 1 has described the case where the output of phase rotator PROT #[ndop_code(ndm), ndm] is transmitted from transmit antenna Tx #[ndop_code(ndm), ndm]; however, this is not required.

For example, the association between each of plural transmit antennas 108 and the assignment of a coded Doppler multiplexed signal (in other words, a combination of Doppler shift amount and code sequence) may be set to vary for each frame in which a radar transmission signal is transmitted.

For example, when continuously performing radar position measurement, radar apparatus 10 may vary transmit antenna 108, which transmits the output of phase rotator PROT #[ndop_code(ndm), ndm], for each radar position measurement (for example, every Nc transmission periods (Nc×Tr)). Here, ndm=1, . . . , $N_{DM}$, and ndop_code(ndm)=1, . . . , $N_{DOP\_CODE}$(ndm).

For example, radar apparatus 10 may hold a plurality of assignment tables for assignment as to from which of Nt transmit antennas $\phi_1$, . . . , and $\phi Nt$ to transmit the output of each of Nt phase rotators PROT #[ndop_code(ndm), ndm]. For example, radar apparatus 10 can modify an assignment table for each radar position measurement (for example, every Nc transmission periods (Nc×Tr)) to variably set transmit antenna 108 to be used for transmission for each radar position measurement.

Accordingly, when continuously performing radar position measurement, radar apparatus 10 variably sets, for the output of each of Nt phase rotators 107 in each radar position measurement, the corresponding one of transmit antennas 108. Accordingly, in cases such as when signals affected by interference (for example, inter-code interference) different depending on transmit antenna 108 are received, the effect of randomizing the influence of interference can be achieved by varying transmit antennas 108.

Variation 7 of Embodiment 1

In Embodiment 1, coder 106 applies phase rotation based on one or a plurality of orthogonal code sequences less than or equal to $N_{CM}$ to each of phase rotation amounts $\phi_1$, . . . , and $\phi_{NDM}$ for applying $N_{DM}$ Doppler shift amounts output from Doppler shift setter 105 to set coded Doppler phase rotation amount $\psi_{ndop\_code(ndm),\ ndm}(m)$ and outputs coded Doppler phase rotation amount $\psi_{ndop\_code(ndm),\ ndm}(m)$ to phase rotators 107. However, the processing performed by coder 106 is not limited to this.

Variation 7 describes a case where associations between transmit antennas 108 and Doppler multiplexed signals are set to vary for each transmission period.

For example, the assignment of Doppler multiplexing (in other words, Doppler shift amounts) to transmit antennas 108 may vary for each transmission period without changing the number of Doppler multiplexes used for coded Doppler multiplexing transmission.

For example, coder 106 sets, for each code element of an orthogonal code sequence (for example, each transmission period Tr), a coded Doppler phase rotation amount using a phase rotation amount for applying a different Doppler shift amount. In other words, coder 106 may make the value of Doppler shift amount $DOP_{ndm}$ different for each code element of an orthogonal code sequence (for example, each transmission period Tr) in coded Doppler phase rotation amount $\psi_{ndop\_code(ndm),\ ndm}(m)$ applied to a radar transmission signal to be transmitted from each transmit antenna 108.

The setting of coded Doppler phase rotation amounts in the manner described above achieves effects similar to those of Embodiment 1. Further, for example, when signals affected by interference (for example, inter-code interference) different depending on transmit antenna 108 are received, the effect of randomizing the influence of interference can be achieved by varying transmit antennas 108.

For example, coder 106 may set coded Doppler phase rotation amount $\psi_{ndop\_code(ndm),\ ndm}(m)$ using following equation 62 instead of equation 5.

[61]

$$\psi_{ndop\_code(ndm),ndm}(m) = \mathrm{floor}\left[\frac{(m-1)}{Loc}\right] \times \phi_{mod(ndm+OC\_INDEX-2,N_{DM})+1} + \mathrm{angle}[OC_{ndop\_code(ndm)}(OC\_INDEX)]$$

(Equation 62)

In coded Doppler phase rotation amount $\psi_{ndop\_code(ndm),\ ndm}(m)$ given by equation 62, a phase rotation amount for applying a Doppler shift amount is set to vary for transmission periods in such manner as to be $\phi_{mod(ndm+OC\_INDEX-2,NDM)+1}$ for the duration of Loc transmission periods, the number of which is equal to the code length used for coding (the first term in equation 62), and the phase rotation amounts of Loc code elements $OC_{ndop\_code(ndm)}(1), \ldots$, and $OC_{ndop\_code(ndm)}(Loc)$ of code $Code_{ndop\_code(ndm)}$ used for coding are applied (the second term in equation 62). In equation 62, phase rotation amount $\phi_{mod(ndm+OC\_INDEX-2,NDM)+1}$ for applying a Doppler shift amount is set to vary for each code element (for example, OC_INDEX).

As an example, a description will be given of a case where when Nt=3, $N_{DM}=2$, and $N_{CM}=2$, coded Doppler phase rotation amount $\psi_{ndop\_code(ndm),\ ndm1}(m)$ given by equation 62 is set.

Figure 17A:
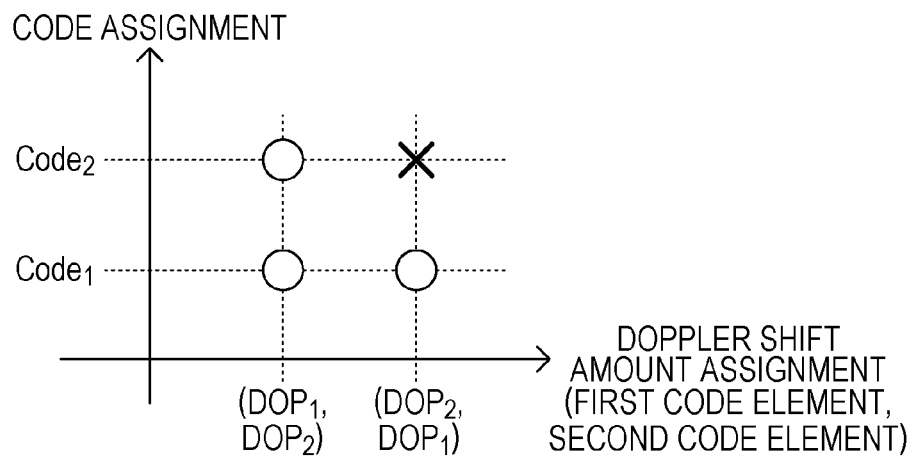
FIGS. 17A and 17B are diagrams illustrating an example of the assignment of Doppler shift amounts and orthogonal codes according to Variation 7 of Embodiment 1.
Figure 17B:
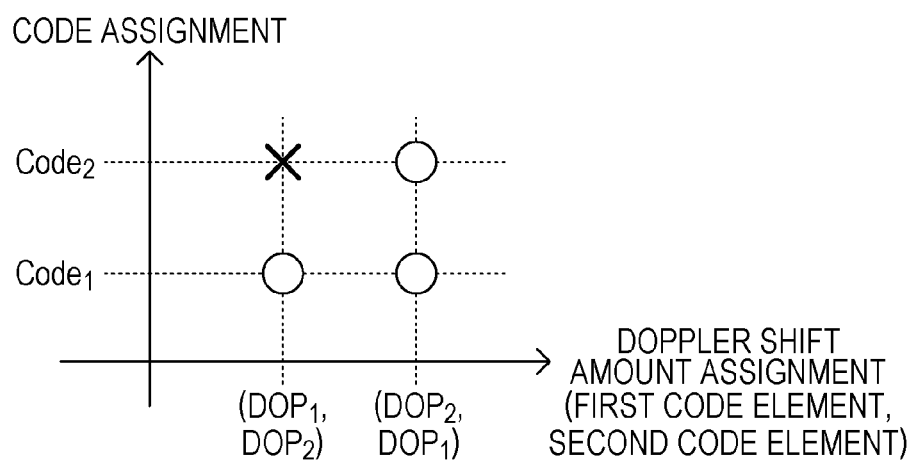

In this case, the assignment of Doppler shift amounts $DOP_1$ and $DOP_2$ and orthogonal codes $Code_1$ and $Code_2$ is determined in accordance with, for example, the setting of $N_{DOP\_CODE}(1)$ and $N_{DOP\_CODE}(2)$, as illustrated in FIGS. 17A and 17B. In FIGS. 17A and 17B, the horizontal axis represents a combination of a Doppler shift amount used for the first code element (for example, OC_INDEX=1) and a Doppler shift amount used for the second code element (for example, OC_INDEX=2).

As illustrated in FIGS. 17A and 17B, for example, in a code sequence with the code length for $N_{CM}=2$, the Doppler shift amount corresponding to the first code element and the Doppler shift amount corresponding to the second code element are different.

For example, a description will be given of a case where in coder 106, using equation 62, when the number of transmit antennas used for multiplexing transmission Nt=3, the number of Doppler multiplexes $N_{DM}=2$, $N_{CM}=2$, and orthogonal code sequences $Code_1=\{1, 1\}$ and $Code_2=\{1, -1\}$ with code length Loc=2 are used, the numbers of coded Doppler multiplexes are set such that $N_{DOP\_CODE}(1)=1$ and $N_{DOP\_CODE}(2)=2$ (see, for example, FIG. 17B). In this case, coder 106 sets coded Doppler phase rotation amounts $\psi_{1,1}(m)$, $\psi_{1,2}(m)$, and $\psi_{2,2}(m)$ given by following equations 63 to 65 and outputs coded Doppler phase rotation amounts $\psi_{1,1}(m)$, $\psi_{1,2}(m)$, and $\psi_{2,2}(m)$ to phase rotators 107.

$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,\phi_1,\phi_2,2\phi_1,2\phi_2,3\phi_1,3\phi_2,\ldots\}$  (Equation 63)

$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}=\{0,0,\phi_2,\phi_1,2\phi_2,2\phi_1,3\phi_2,3\phi_1,\ldots\}$  (Equation 64)

$\{\psi_{2,2}(1),\psi_{2,2}(2),\psi_{2,2}(3),\psi_{2,2}(4),\psi_{2,2}(5),\psi_{2,2}(6)\psi_{2,2}(7),\psi_{2,2}(8),\ldots\}=\{0,\pi,\phi_2,\phi_1+\pi,2\phi_2,2\phi_1+\pi,3\phi_2,3\phi_1+\pi,\ldots\}$  (Equation 65)

In each of coded Doppler phase rotation amounts $\psi_{1,1}(m)$, $\psi_{1,2}(m)$, and $\psi_{2,2}(m)$ given by equations 63 to 65, phase rotation amounts $\phi_1$ and $\phi_2$ for applying Doppler shift amounts $DOP_1$ and $DOP_2$ are alternately used in a period with code length Loc=2.

For $\psi_{1,2}(m)$ and $\psi_{2,2}(m)$ given by equations 64 and 65, phase rotations using orthogonal code sequences $Code_1$ and $Code_2$ are applied, with a relationship maintained in which phase rotation amounts $\phi_1$ and $\phi_2$ for applying Doppler shift amounts $DOP_1$ and $DOP_2$ are the same phase rotation amount in a period with code length Loc=2. In other words, for $\psi_{1,2}(m)$ and $\psi_{2,2}(m)$, phase rotation amounts for applying Doppler shift amounts are changed in a similar manner in a period with code length Loc, and a plurality of orthogonal code sequences are used to perform code multiplexing.

For $\psi_{1,1}(m)$ and $\psi_{1,2}(m)$ given by equations 63 and 64, phase rotation amounts $\phi_1$ and $\phi_2$ for applying Doppler shift amounts $DOP_1$ and $DOP_2$ are different phase rotation amounts in a period with code length Loc=2. Also for $\psi_{1,1}(m)$ and $\psi_{2,2}(m)$ given by equations 63 and 65, phase rotation amounts $\phi_1$ and $\phi_2$ for applying Doppler shift amounts $DOP_1$ and $DOP_2$ are different phase rotation amounts in a period with code length Loc=2.

Here, for example, a description will be given of a case where a phase rotation amount for applying Doppler shift amount $DOP_{ndm}$ is $\phi_{ndm}=2\pi(ndm-1)/N_{DM}$ given by equation 1, and phase rotation amount $\phi_1$ for applying Doppler shift amount $DOP_1$, which is equal to 0, and phase rotation amount $\phi_2$ for applying Doppler shift amount $DOP_2$, which is equal to $\pi$, are used. In this case, coder 106 sets coded Doppler phase rotation amounts $\psi_{1,1}(m)$, $\psi_{1,2}(m)$, and $\psi_{2,2}(m)$ given by following equations 66 to 68 and outputs coded Doppler phase rotation amounts $\psi_{1,1}(m)$, $\psi_{1,2}(m)$, and $\psi_{2,2}(m)$ to phase rotators 107. Here, m=1, ..., Nc.

$\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,0,\pi,0,0,0,\pi,\ldots\}$  (Equation 66)

$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}=\{0,0,\pi,0,0,0,\pi,0,\ldots\}$  (Equation 67)

$\{\psi_{2,2}(1),\psi_{2,2}(2),\psi_{2,2}(3),\psi_{2,2}(4),\psi_{2,2}(5),\psi_{2,2}(6),\psi_{2,2}(7),\psi_{2,2}(8),\ldots\}=\{0,\pi,\pi,\pi 0,\pi,\pi,\pi,\ldots\}$  (Equation 68)

As another example, a description will be given of a case where when Nt=6, $N_{DM}=4$, and $N_{CM}=2$, coded Doppler phase rotation amount $\psi_{ndop\_code(ndm),\ ndm1}(m)$ given by equation 62 is set.

Figure 18A:
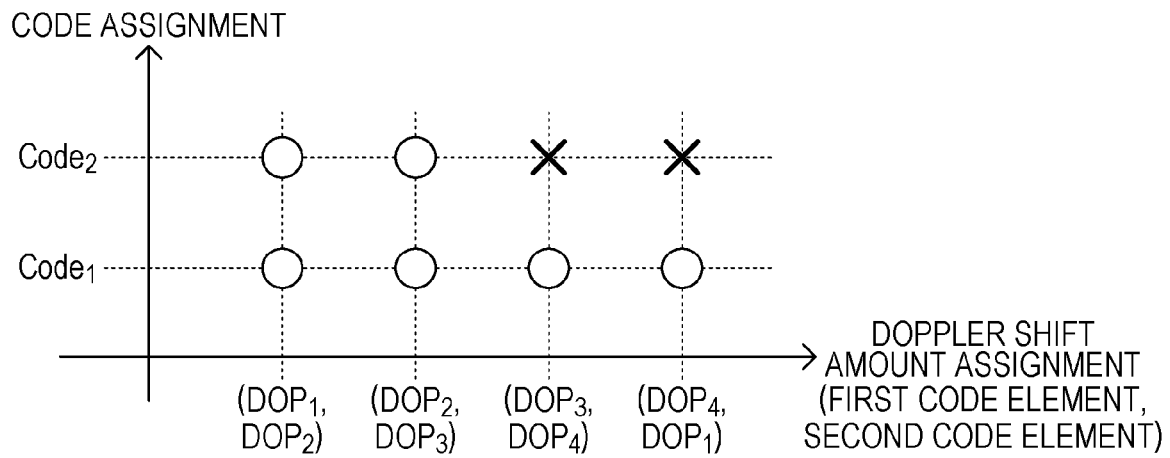
FIGS. 18A and 18B are diagrams illustrating an example of the assignment of Doppler shift amounts and orthogonal codes according to Variation 7 of Embodiment 1.
Figure 18B:
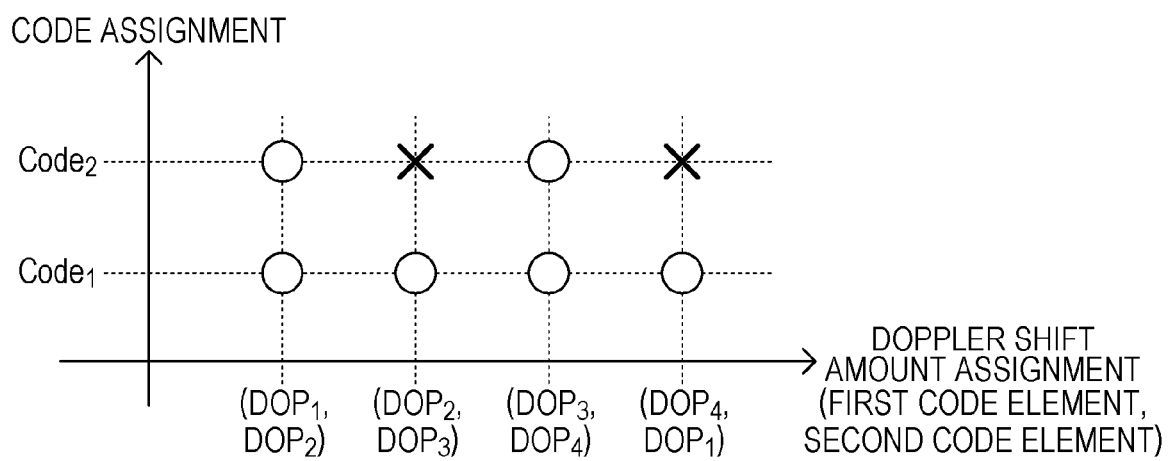

In this case, the assignment of Doppler shift amounts $DOP_1$, $DOP_2$, $DOP_3$, and $DOP_4$ and orthogonal codes $Code_1$ and $Code_2$ is determined in accordance with, for example, the setting of $N_{DOP\_CODE}(1)$, $N_{DOP\_CODE}(2)$, $N_{DOP\_CODE}(3)$, and $N_{DOP\_CODE}(4)$, as illustrated in FIGS. 18A and 18B. In FIGS. 18A and 18B, the horizontal axis represents a combination of a Doppler shift amount used for the first code element (for example, OC_INDEX=1) and a Doppler shift amount used for the second code element (for example, OC_INDEX=2).

As illustrated in FIGS. 18A and 18B, for example, in a code sequence of the code length for $N_{CM}=2$, the Doppler shift amount corresponding to the first code element and the Doppler shift amount corresponding to the second code element are different.

For example, a description will be given of a case where in coder 106, using equation 62, when the number of transmit antennas used for multiplexing transmission Nt=6, the number of Doppler multiplexes $N_{DM}=4$, $N_{CM}=2$, and orthogonal code sequences $Code_1=\{1, 1\}$ and $Code_2=\{1, -1\}$ with code length Loc=2 are used, the numbers of coded Doppler multiplexes are set such that $N_{DOP\_CODE}(1)=1$, $N_{DOP\_CODE}(2)=1$, $N_{DOP\_CODE}(3)=2$, and $N_{DOP\_CODE}(4)=2$. In this case, coder 106 sets coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ given by following equations 69 to 74 and outputs coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ to phase rotators 107. Here, m=1, . . . , Nc.

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \{0, 0, \phi_1, \phi_1, 2\phi_1, 2\phi_1, 3\phi_1, 3\phi_1, \ldots\} \quad \text{(Equation 69)}$$

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \{0, 0, \phi_2, \phi_3, 2\phi_2, 2\phi_3, 3\phi_2, 3\phi_3, \ldots\} \quad \text{(Equation 70)}$$

$$\{\psi_{1,3}(1), \psi_{1,3}(2), \psi_{1,3}(3), \psi_{1,3}(4), \psi_{1,3}(5), \psi_{1,3}(6), \psi_{1,3}(7), \psi_{1,3}(8), \ldots\} = \{0, 0, \phi_3, \phi_4, 2\phi_3, 2\phi_4, 3\phi_3, 3\phi_4, \ldots\} \quad \text{(Equation 71)}$$

$$\{\psi_{2,3}(1), \psi_{2,3}(2), \psi_{2,3}(3), \psi_{2,3}(4), \psi_{2,3}(5), \psi_{2,3}(6), \psi_{2,3}(7), \psi_{2,3}(8), \ldots\} = \{0, \pi, \phi_3, \phi_4+\pi, 2\phi_3, 2\phi_4+\pi, 3\phi_3, 3\phi_4+\pi, \ldots\} \quad \text{(Equation 72)}$$

$$\{\psi_{1,4}(1), \psi_{1,4}(2), \psi_{1,4}(3), \psi_{1,4}(4), \psi_{1,4}(5), \psi_{1,4}(6), \psi_{1,4}(7), \psi_{1,4}(8), \ldots\} = \{0, 0, \phi_4, \phi_1, 2\phi_4, 2\phi_1, 3\phi_4, 3\phi_1, \ldots\} \quad \text{(Equation 73)}$$

$$\{\psi_{2,4}(1), \psi_{2,4}(2), \psi_{2,4}(3), \psi_{2,4}(4), \psi_{2,4}(5), \psi_{2,4}(6), \psi_{2,4}(7), \psi_{2,4}(8), \ldots\} = \{0, \pi, \phi_4, \phi_1+\pi, 2\phi_4, 2\phi_1+\pi, 3\phi_4, 3\phi_1+\pi, \ldots\} \quad \text{(Equation 74)}$$

In each of coded Doppler phase rotation amounts $\psi_{ndop\_code(ndm), ndm}(m)$ given by equations 69 to 74, phase rotation amounts $\phi_{ndm}$ and $\phi_{mod(ndm, NDM)+1}$ for applying Doppler shift amounts $DOP_{ndm}$ and $DOP_{mod(ndm, NDM)+1}$ are used in a period with code length Loc=2. In coded Doppler phase rotation amounts $\psi_{ndop\_code(ndm), ndm}(m)$ with ndm being different, phase rotation amounts for applying Doppler shift amounts are different.

Further, for coded Doppler phase rotation amounts $\psi_{1,ndm}(m)$, . . . , and $\psi_{n2dop\_code(ndm), ndm}(m)$, phase rotations using orthogonal code sequences $Code_1$, . . . , and $Code_{ndop\_code(ndm)}$ are applied, with a relationship maintained in which phase rotation amounts $\phi_{ndm}$ and $\phi_{mod(ndm, NDM)+1}$ for applying Doppler shift amounts $DOP_{ndm}$ and $DOP_{mod(ndm,NDM)+1}$ are the same phase rotation amount in a period with code length Loc=2.

Here, for example, a description will be given of a case where a phase rotation amount for applying Doppler shift amount $DOP_{ndm}$ is $\phi_{ndm}=2\pi(ndm-1)/N_{DM}$ given by equation 1, and phase rotation amount $\phi_1$ for applying Doppler shift amount $DOP_1$, which is equal to 0, phase rotation amount $\phi_2$ for applying Doppler shift amount $DOP_2$, which is equal to $\pi/2$, phase rotation amount $\phi_3$ for applying Doppler shift amount $DOP_3$, which is equal to $\pi$, and phase rotation amount $\phi_4$ for applying Doppler shift amount $DOP_4$, which is equal to $3\pi/2$, are used. In this case, coder 106 sets coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ given by following equations 75 to 80 and outputs coded Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ to phase rotators 107. Here, m=1, . . . , Nc.

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \left\{0, 0, 0, \frac{\pi}{2}, 0, \pi, 0, \frac{3\pi}{2}, \ldots\right\} \quad \text{(Equation 75)}$$

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \left\{0, 0, \frac{\pi}{2}, \pi, \pi, 0, \frac{3\pi}{2}, \pi, \ldots\right\} \quad \text{(Equation 76)}$$

$$\{\psi_{1,3}(1), \psi_{1,3}(2), \psi_{1,3}(3), \psi_{1,3}(4), \psi_{1,3}(5), \psi_{1,3}(6), \psi_{1,3}(7), \psi_{1,3}(8), \ldots\} = \left\{0, 0, \pi, \frac{3\pi}{2}, 0, \pi, \pi, \frac{\pi}{2}, \ldots\right\} \quad \text{(Equation 77)}$$

$$\{\psi_{2,3}(1), \psi_{2,3}(2), \psi_{2,3}(3), \psi_{2,3}(4), \psi_{2,3}(5), \psi_{2,3}(6), \psi_{2,3}(7), \psi_{2,3}(8), \ldots\} = \left\{0, \pi, \pi, \frac{\pi}{2}, 0, 0, \pi, \frac{3\pi}{2}, \ldots\right\} \quad \text{(Equation 78)}$$

$$\{\psi_{1,4}(1), \psi_{1,4}(2), \psi_{1,4}(3), \psi_{1,4}(4), \psi_{1,4}(5), \psi_{1,4}(6), \psi_{1,4}(7), \psi_{1,4}(8), \ldots\} = \left\{0, 0, \frac{3\pi}{2}, 0, \pi, 0, \frac{\pi}{2}, 0, \ldots\right\} \quad \text{(Equation 79)}$$

$$\{\psi_{2,4}(1), \psi_{2,4}(2), \psi_{2,4}(3), \psi_{2,4}(4), \psi_{2,4}(5), \psi_{2,4}(6), \psi_{2,4}(7), \psi_{2,4}(8), \ldots\} = \left\{0, \pi, \frac{3\pi}{2}, \pi, \pi, \pi, \frac{\pi}{2}, \pi, \ldots\right\} \quad \text{(Equation 80)}$$

Next, an example of the operation of radar receiver 200 when coded Doppler phase rotation amounts are set by coder 106 described above will be described. In radar receiver 200, a code separation process performed by coded Doppler demultiplexer 212 is different from that in Embodiment 1.

Coded Doppler demultiplexer 212 performs a code separation process on the outputs of Doppler analyzers 210 in the z-th signal processor 206 indicated by Doppler frequency indices $(f_{s\_comp\_cfar}+(nfd-1)\times\Delta FD)$ of $N_{DM}$ coded Doppler multiplexed signals for distance indices $f_{b\_cfar}$ output from CFAR section 211.

The code separation process may be performed on, for example, all of nfd=1, . . . , $N_{DM}$ for all the candidates of DopCase=1, . . . , $N_{DM}$. Note that coded Doppler demultiplexer 212 detects a coded Doppler multiplexed signal for which the number of coded Doppler multiplexes is set to be smaller than $N_{CM}$, and performs discrimination of transmit antennas 108 and determination of a target Doppler frequency. Accordingly, coded Doppler demultiplexer 212 performs a code separation process, as given by following equation 81, to reduce the operation amount of the separation process.

[80]

$$DeMUL_z^{ncm} \quad \text{(Equation 81)}$$

$$(f_{b\_cfar},$$

$$f_{s\_comp\_cfar} + \{DOPposi(DOP_{ndm1}, DopCase) - 1\} \times \Delta FD) =$$

$$\sum_{noc=1}^{Loc} \left[ OC_{ncm}^*(noc) VFT_z^{noc} \left( f_{b\_cfar}, f_{s\_comp\_cfar} + \right. \right.$$

$$\{DOPposi(DOP_{mod(ndm1+noc-2, N_{DM})+1}, DopCase) - 1\} \times$$

$$\left. \Delta FD) \times \exp\left\{-j \frac{2\pi(f_{s\_comp\_cfar} + (DopCase - 1) \times \Delta FD - DOP_1)}{N_{code}} \times \frac{noc-1}{Loc}\right\}\right]$$

The superscript asterisk (*) indicates the complex conjugate operator. Further, nfd=1, ..., $N_{DM}$, ncm=1, ..., $N_{CM}$, and DopCase=1, ..., $N_{DM}$.

For example, when a coded Doppler multiplexed signal for which the number of coded Doppler multiplexes is set to be smaller than $N_{CM}$ uses coded Doppler phase rotation amount $\psi_{ndop\_code(ndm), ndm1}(m)$ given by equation 62, coded Doppler demultiplexer 212 performs the code separation process given by equation 81, with consideration given to the use of $DOP_{mod(ndm1+noc-2, NDM)+1}$ as the Doppler shift amount for the noc-th code element.

In equation 81, coded Doppler demultiplexer 212 performs a code separation process using candidate DOPposi ($DOP_{mod(ndm1+noc-2, NDM)+1}$, DopCase) including Doppler shift amount $DOP_{mod(ndm1+noc-2, NDM)+1}$ for the output of Doppler analyzer 210 for every noc-th code element within each DopCase. Here, code separation signal $DeMUL_z^{ncm}$ ($f_{b\_cfar}$, $f_{s\_comp\_cfar}$+(DOPposi($DOP_{ndm1}$, DopCase)−1)× $\Delta FD$) given by equation 81 represents a code separation signal that uses $Code_{ncm}$ for distance index $f_{b\_cfar}$ and Doppler frequency index ($f_{s\_comp\_cfar}$+(DOPposi($DOP_{ndm1}$, DopCase)−1)×$\Delta FD$) in the z-th signal processor 206. The Doppler frequency index ($f_{s\_comp\_cfar}$+(DOPposi($DOP_{ndm1}$, DopCase)−1)×$\Delta FD$) represents a Doppler frequency index in the output of Doppler analyzer 210 for the first code element when the coded Doppler phase rotation amount given by equation 62 is used.

In equation 81, in the exp term, since the sampling times for the outputs of Doppler analyzers 210 for each code element are shifted, phase correction is performed in accordance with Doppler frequency index ($f_{s\_comp\_cfar}$+(DopCase−1)×$\Delta FD$−$DOP_1$).

Further, Doppler shift amount $DOP_{ndm}$ set in Doppler shift setter 105 is represented by $DOP_1 < DOP_2 < \ldots < DOP_{DM-1} < DOP_{DM}$, and $DOP_1$ falls within the range of $f_{s\_comp}$=−Ncode/2, ..., −Ncode/2+$\Delta FD$−1 in the initial state (when the relative velocity to the target is zero). Accordingly, coded Doppler demultiplexer 212 calculates an amount of phase correction using, for example, $DOP_1$ as a reference.

The subsequent processing performed by radar receiver 200 is similar to that in Embodiment 1, and a description thereof is omitted here.

Variation 8 of Embodiment 1

Embodiment 1 has described a case where when radar apparatus 10 repeatedly transmits chirp pulses Nc times as radar transmission signals, the center frequencies of the chirp signals are made constant (see, for example, FIG. 2). However, the center frequencies of the chirp signals are not necessarily constant.

Variation 8 describes a case where the center frequencies of chirp signals are variably set.

[Configuration of Radar Apparatus]

Figure 19:
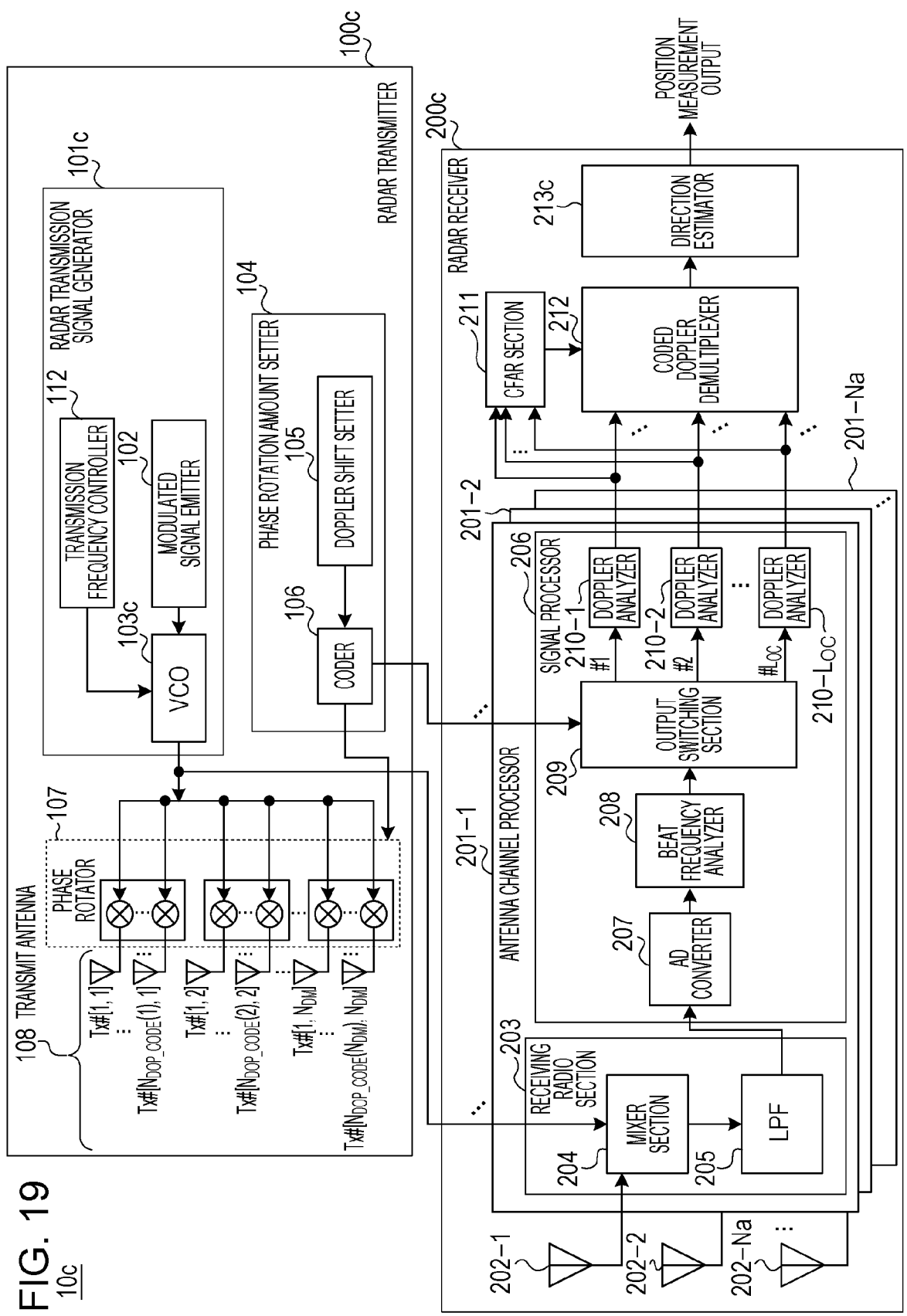
FIG. 19 is a block diagram illustrating an example configuration of a radar apparatus according to Variation 8 of Embodiment 1.

FIG. 19 is a block diagram illustrating an example configuration of radar apparatus 10c according to Variation 8. In FIG. 19, components similar to those in Embodiment 1 (FIG. 1) are identified with the same numerals, and a description thereof is omitted.

In the following, for example, radar apparatus 10c transmits radar transmission signals such that center frequencies fc of chirp signals are changed by $\Delta f$ (for example, increased in a case where $\Delta f>0$ and decreased in a case where $\Delta f<0$) for every transmission period Tr.

In radar transmitter 100c, radar transmission signal generator 101c includes modulated signal emitter 102, VCO 103c, and transmission frequency controller 112.

For example, modulated signal emitter 102 periodically emits sawtooth-shaped modulated signals for VCO control. Here, the transmission period is represented by Tr.

Transmission frequency controller 112 controls, for each transmission period Tr, center frequency fc of a frequency-modulated signal (chirp signal) to be output from VCO 103c. For example, transmission frequency controller 112 may change center frequency fc of a frequency-modulated signal by $\Delta f$ for each transmission period Tr.

VCO 103c outputs frequency-modulated signals to phase rotators 107 and radar receiver 200c (for example, mixer section 204), based on the output of transmission frequency controller 112 and the output of modulated signal emitter 102.

Figure 20:
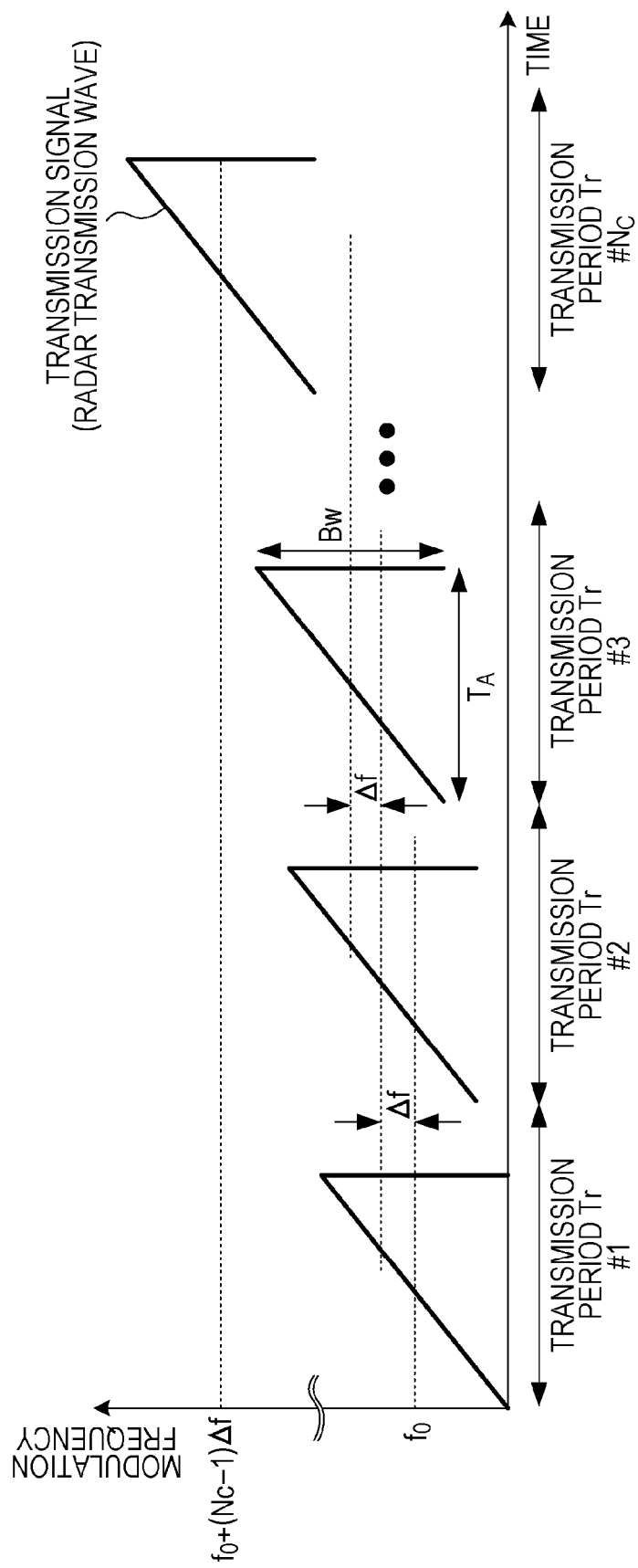
FIG. 20 is a diagram illustrating an example of transmission signals when chirp pulses according to Variation 8 of Embodiment 1 are used.

FIG. 20 illustrates an example of frequency-modulated signals (hereinafter referred to as chirp signals).

In FIG. 20, for example, VCO 103c outputs a chirp signal having center frequency fc(1) equal to $f_0$ during the first transmission period Tr #1. Further, as illustrated in FIG. 20, VCO 103c outputs a chirp signal having center frequency fc(2) equal to $f_0+\Delta f$ during the second transmission period Tr #2. Also in FIG. 20, VCO 103c outputs a chirp signal having center frequency fc(m) equal to $f_0+(m-1)\Delta f$ during the m-th transmission period Tr #m. Accordingly, VCO 103c changes the center frequency of a chirp signal by $\Delta f$ for each transmission period Tr.

That is, in FIG. 20, center frequency fc($N_c$) of the chirp signal in the $N_c$-th transmission period Tr #$N_c$ is given by $f_0+\Delta f \times (N_c-1)$.

The respective chirp signals may be, for example, chirp signals having the same frequency-modulation bandwidth Bw in time width $T_A$ of a range gate. In the example illustrated in FIG. 20, the case where $\Delta f>0$ (in other words, the case where center frequency fc is increased) is illustrated. The same applies to the case where $\Delta f<0$ (in other words, the case where center frequency fc is decreased).

Other operation of radar transmitter 100c illustrated in FIG. 19 may be similar to that in Embodiment 1.

Next, an example of the operation of radar receiver 200c of radar apparatus 10c will be described.

In radar receiver 200c, the processing performed by antenna channel processors 201 on signals received by receive antennas 202, and the operation of subsequent CFAR section 211 and coded Doppler demultiplexer 212 are similar to the operation in Embodiment 1. In radar receiver 200c, furthermore, a direction estimation process performed by direction estimator 213c using the output of coded Doppler demultiplexer 212 is also similar to the operation in Embodiment 1.

In radar receiver 200c, for example, a conversion process for Doppler velocity information of the target based on the Doppler frequency determination result for the target (for example, Doppler frequency $f_{TARGET}$ of the target), which is performed by direction estimator 213c, is different from that in Embodiment 1.

The conversion of distance information $R(f_b)$ based on the beat frequency index is similar to that in Embodiment 1, and direction estimator 213c may output, for example, based on equation 31, distance information $R(f_b)$ using beat frequency index (or distance index) $f_b$.

Direction estimator 213c may output Doppler velocity information $v_d$ of the target detected in the following way using, for example, Doppler frequency $f_{TARGET}$ of the target and distance index $f_{b\_cfar}$.

For example, when radar transmission signals for which center frequencies fc of chirp signals are changed by Δf for every transmission period Tr are used, even if the relative velocity of the target is zero, center frequencies fc of chirp signals are changed for every transmission period Tr. Accordingly, a reception signal of radar apparatus 10c includes phase rotation caused by a change in the center frequency of a chirp signal for each transmission period Tr.

Center frequency fc in the m-th transmission period Tr for target distance $R_{target}$ is changed by $(m-1)\Delta f$ relative to the center frequency in the first transmission period Tr as a reference. Phase rotation amount $\Delta\eta(m, R_{target})$ caused by the change in center frequency fc is given by equation 81-1, with consideration given to reflected-wave arrival time $(2R_{target}/C_0)$ from target distance $R_{target}$. Equation 81-1 indicates the relative phase rotation amount obtained using the phase of the first transmission period Tr as a reference. $C_0$ denotes the speed of light.

[81]

$$\Delta\eta(m, R_{target}) = 2\pi(m-1)\Delta f \times \left(\frac{2R_{target}}{C_0}\right) \quad \text{(Equation 81-1)}$$

Therefore, as given by following equation 81-2, direction estimator 213c calculates Doppler velocity information $v_d(f_{TARGET}, f_{b\_cfar})$, based on a transformation equation taking into account Δf that is the amount of change in center frequency fc of a chirp signal for each transmission period Tr.

[82]

$$v_d(f_{TARGET}, f_{b\_cfar}) = \frac{C_0}{2f_0}\left(f_{TARGET} - \frac{\Delta f \times 2R(f_{b\_cfar})}{T_r \times C_0}\right) \quad \text{(Equation 81-2)}$$

In equation 81-2, the first term corresponds to equation 49 and is a relative Doppler velocity component represented by Doppler frequency $f_{TARGET}$. The second term in equation 81-2 is a Doppler velocity component that is generated by changing center frequency fc of a chirp signal by Δf for each transmission period Tr. For example, as given by equation 81-2, direction estimator 213c can calculate the true relative Doppler velocity $v_d(f_{TARGET}, f_{b\_cfar})$ of the target by removing the Doppler component in the second term from the first term. Here, $R(f_{b\_cfar})$ denotes distance information (distance estimation value) calculated from beat frequency index $f_{b\_cfar}$ in accordance with equation 31.

The Doppler range of the target is assumed to be up to $\pm 1/(2\times Tr)$. If $v_d(f_{TARGET}, f_{b\_cfar})$ satisfies $v_d(f_{TARGET}, f_{b\_cfar}) < -C_0/(4f_0\, Tr)$, direction estimator 213c may output detected Doppler velocity information $v_d(f_{TARGET}, f_{b\_cfar})$ of the target in accordance with following equation 81-3.

[83]

$$v_d(f_{TARGET}, f_{b\_cfar}) = \quad \text{(Equation 81-3)}$$

$$\frac{C_0}{2f_0}\left(f_{TARGET} + \frac{1}{T_r} - \frac{\Delta f \times 2R(f_{b\_cfar})}{T_r \times C_0}\right)$$

Also, since the Doppler range of the target is assumed to be up to $\pm 1/(2\times Tr)$, if $v_d(f_{TARGET}, f_{b\_cfar})$ satisfies $v_d(f_{TARGET}, f_{b\_cfar}) > C_0/(4f_0\, Tr)$, direction estimator 213c may output detected Doppler velocity information $v_d(f_{TARGET}, f_{b\_cfar})$ of the target in accordance with following equation 81-4.

[84]

$$v_d(f_{TARGET}, f_{b\_cfar}) = \quad \text{(Equation 81-4)}$$

$$\frac{C_0}{2f_0}\left(f_{TARGET} - \frac{1}{T_r} - \frac{\Delta f \times 2R(f_{b\_cfar})}{T_r \times C_0}\right)$$

As described above, in Variation 8, in radar apparatus 10c, center frequencies fc of chirp signals are changed based on transmission periods Tr of radar transmission signals. For example, radar apparatus 10c transmits radar transmission signals such that center frequencies fc of chirp signals are changed by Δf (for example, increased in a case where Δf>0 and decreased in a case where Δf<0) for every transmission period Tr. Even in this case, as in Embodiment 1, radar apparatus 10c (for example, MIMO radar) can extend the effective Doppler frequency bandwidth to 1/(Tr) and can extend the Doppler frequency (relative velocity) detection range with no ambiguity. In addition, radar apparatus 10c can reduce mutual interference between multiplexed signals to about the noise level. According to Variation 8, therefore, radar apparatus 10c can improve target-object sensing accuracy over a wider Doppler frequency range.

Variation 8 is applicable not only to Embodiment 1 but also to Variations 1 to 7 of Embodiment 1, and respective similar effects can be achieved. For example, in any of Variations 1 to 7 of Embodiment 1, radar transmission signals including chirp signals whose center frequencies fc are changed in the manner illustrated in FIG. 20 may be used.

In Variation 8, furthermore, for example, radar apparatus 10c transmits radar transmission signals in such a manner that center frequencies fc of chirp signals are changed by Δf for every transmission period Tr, and can thus improve the distance resolution by a change width of the center frequencies of chirp signals (see, for example, NPL 4). According to Variation 8, since the distance resolution can be improved by a change width of the center frequencies of chirp signals, the chirp sweep bandwidth (for example, Bw) can be reduced compared with transmission with the center frequencies of chirp signals kept constant. The reduction in chirp sweep bandwidth can reduce, for example, the transmission period Tr while improving the distance resolution. As a result, in code multiplexing transmission, the detectable Doppler range without ambiguity can further be extended.

Variation 9 of Embodiment 1

The periods in which the center frequencies of chirp signals are changed are not limited to transmission periods Tr as in Variation 8. Variation 9 describes a case where the center frequencies of chirp signals are set to vary in increments of transmission periods of a plurality of chirp signals.

For example, Variation 9 describes a case where the center frequencies of chirp signals are set to vary for every Loc transmission periods (Loc×Tr) (in other words, a transmission period of an orthogonal code sequence, hereinafter referred to as "code transmission period"), the number of which is equal to the code length of a single orthogonal code used for Doppler multiplexing transmission.

[Configuration of Radar Apparatus]

Figure 21:
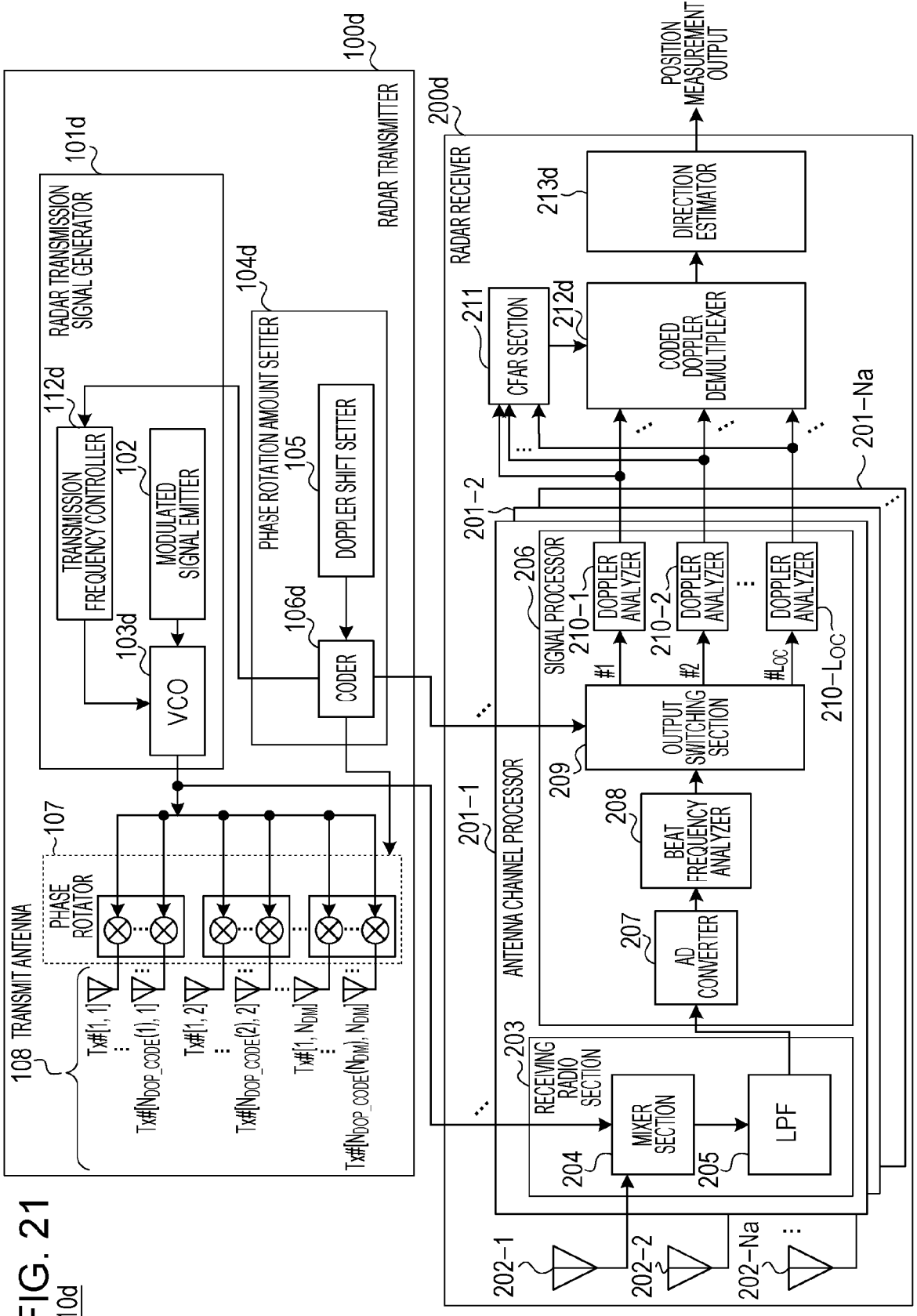
FIG. 21 is a block diagram illustrating an example configuration of a radar apparatus according to Variation 9 of Embodiment 1.

FIG. 21 is a block diagram illustrating an example configuration of radar apparatus 10d according to Variation 9. In FIG. 21, components similar to those in Embodiment 1 (FIG. 1) or Variation 8 (FIG. 19) are identified with the same numerals, and a description thereof is omitted.

In Variation 9, for example, radar apparatus 10d transmits radar transmission signals such that center frequencies fc of chirp signals are changed by $\Delta f$ (for example, increased in a case where $\Delta f > 0$ and decreased in a case where $\Delta f < 0$) for every code transmission period (Loc×Tr).

In radar transmitter 100d, radar transmission signal generator 101d includes modulated signal emitter 102, VCO 103d, and transmission frequency controller 112d. In radar transmitter 100d, phase rotation amount setter 104d includes Doppler shift setter 105 and coder 106d.

For example, in radar transmission signal generator 101d, modulated signal emitter 102 periodically emits sawtooth-shaped modulated signals for VCO control. Here, the transmission period is represented by Tr.

Transmission frequency controller 112d controls, based on orthogonal code element index OC_INDEX output from coder 106d, center frequency fc of a frequency-modulated signal (chirp signal) to be output from VCO 103d for each code transmission period (Loc×Tr).

For example, transmission frequency controller 112d may change center frequency fc of a frequency-modulated signal to be output from VCO 103d by $\Delta f$ in transmission period Tr corresponding to OC_INDEX=1. In other words, transmission frequency controller 112d controls, in transmission period Tr corresponding to OC_INDEX≠1, center frequency fc of a frequency-modulated signal to be output from VCO 103d to be the same as center frequency fc in previous transmission period Tr. With this control, transmission frequency controller 112d can perform control such that center frequencies fc are changed by $\Delta f$ for every code transmission period (Loc×Tr).

VCO 103d outputs frequency-modulated signals to phase rotators 107 and radar receiver 200d (for example, mixer section 204), based on the output of transmission frequency controller 112d and the output of modulated signal emitter 102.

Figure 22:
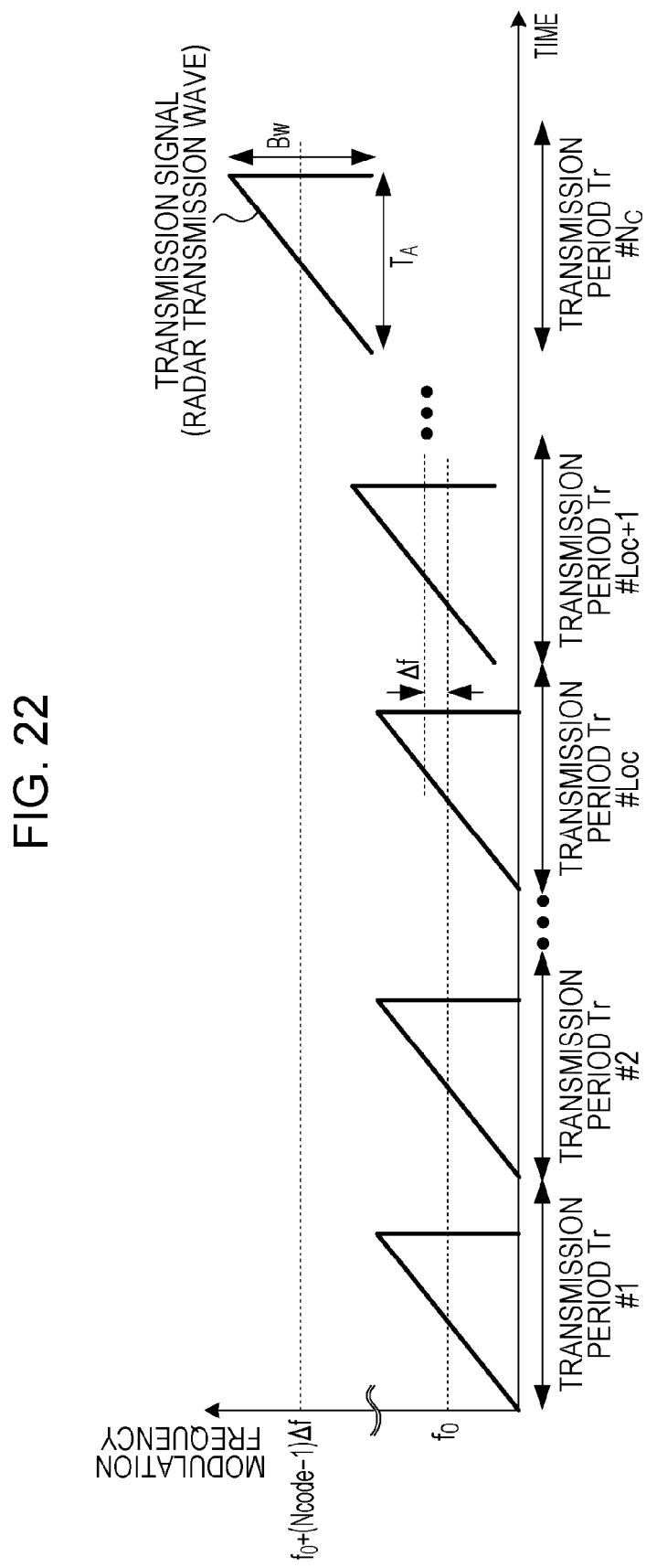
FIG. 22 is a diagram illustrating an example of transmission signals when chirp pulses according to Variation 9 of Embodiment 1 are used.

FIG. 22 illustrates an example of frequency-modulated signals (hereinafter referred to as chirp signals).

In FIG. 22, for example, VCO 103d outputs a chirp signal having center frequency fc(1) equal to $f_0$ during the first transmission period Tr #1 (for example, OC_INDEX=1). Further, as illustrated in FIG. 22, VCO 103d outputs a chirp signal having center frequency fc(2) equal to $f_0$ during the second transmission period Tr #2 (for example, OC_IN-DEX=2). Likewise, VCO 103d outputs chirp signals having center frequencies fc(3) to fc(Loc) equal to $f_0$ during the third transmission period (for example, OC_INDEX=3) (not illustrated) to the Loc-th transmission period Tr #Loc (for example, OC_INDEX=Loc), respectively.

VCO 103d outputs a chirp signal having center frequency fc(Loc+1) equal to $f_0 + \Delta f$ during the (Loc+1)-th transmission period Tr #(Loc+1). Further, VCO 103d outputs chirp signals having center frequencies fc(Loc+2) to fc(2Loc) equal to $f_0 + \Delta f$ during the (Loc+2)-th transmission period Tr #(Loc+2) to the (2Loc)-th transmission period Tr #(2Loc), respectively.

Likewise, VCO 103d outputs a chirp signal having center frequency fc(m) equal to $f_0 + \text{floor}[(m-1)/\text{Loc}]\Delta f$ during the m-th transmission period Tr #m.

That is, in FIG. 22, center frequency fc(Nc) of the chirp signal in the $N_c$-th transmission period Tr #Nc is given by $f_0 + (\text{Ncode}-1)\Delta f$. Here, Ncode=Nc/Loc.

The respective chirp signals may be, for example, chirp signals having the same frequency-modulation bandwidth Bw in time width $T_A$ of a range gate. In the example illustrated in FIG. 22, the case where $\Delta f > 0$ (in other words, the case where center frequency fc is increased) is illustrated. The same applies to the case where $\Delta f < 0$ (in other words, the case where center frequency fc is decreased).

Other operation of radar transmitter 100d illustrated in FIG. 21 may be similar to that in Embodiment 1.

Next, an example of the operation of radar receiver 200d of radar apparatus 10d will be described.

In radar receiver 200d, the processing performed by antenna channel processors 201 on signals received by receive antennas 202, and the operation of subsequent CFAR section 211 are similar to the operation in Embodiment 1. In radar receiver 200d, furthermore, a direction estimation process performed by direction estimator 213d using the output of coded Doppler demultiplexer 212d is also similar to the operation in Embodiment 1.

In radar receiver 200d, for example, the operation of coded Doppler demultiplexer 212d and a conversion process for Doppler velocity information of the target, which is performed by direction estimator 213d, is different from those in Embodiment 1.

The conversion of distance information $R(f_b)$ based on the beat frequency index is similar to that in Embodiment 1, and direction estimator 213d may output, for example, based on equation 31, distance information $R(f_b)$ using beat frequency index (or distance index) $f_b$.

The following describes an example of the operation of coded Doppler demultiplexer 212d, which is different from that in Embodiment 1.

For example, when radar transmission signals for which center frequencies fc of chirp signals are changed by $\Delta f$ for every code transmission period (Loc×Tr) are used, even if the relative velocity of the target is zero, center frequencies fc of chirp signals are changed for every code transmission period (Loc×Tr). Accordingly, the output of each of Loc Doppler analyzers 210 of radar apparatus 10d includes phase rotation caused by a change in the center frequency of a chirp signal for each code transmission period (Loc×Tr).

For example, center frequency fc in the m-th transmission period Tr for target distance $R_{target}$ is changed by $\text{floor}[(m-1)/\text{Loc}]\Delta f$ relative to center frequency fc in the first transmission period Tr as a reference. Accordingly, phase rotation amount $\Delta \eta(m, R_{target})$ caused by the change in center frequency is given by equation 81-5, with consideration given to reflected-wave arrival time ($2R_{target}/C_0$) from target distance $R_{target}$. Equation 81-5 indicates the relative phase rotation amount obtained using the phase of the first transmission period Tr as a reference. $C_0$ denotes the speed of light.

[85]

$$\Delta\eta(m, R_{target}) = 2\pi\text{floor}\left(\frac{m-1}{Loc}\right)\Delta f \times \left(\frac{2R_{target}}{C_0}\right) \quad \text{(Equation 81-5)}$$

Each of Loc Doppler analyzers 210 performs Doppler analysis that takes into account the phase rotation given by equation 81-5. Here, code transmission period (Loc×Tr) in which center frequency fc of a chirp signal is changed by $\Delta f$ matches the period for switching Doppler analyzers 210 for every Loc code elements. Accordingly, to correct Doppler phase rotation caused by the time difference of Doppler analysis among Loc Doppler analyzers 210 to separate code-multiplexed signals, coded Doppler demultiplexer 212d uses following equation 81-6 instead of equation 35 described in <(1) code separation process> in Embodiment 1.

[86]

$$DeMUL_z^{ncm}(f_{b\_cfar}, f_{s\_comp\_cfar} + \quad \text{(Equation 81-6)}$$
$$\{DOPposi(DOP_{ndm1}, DOPCase) - 1\} \times \Delta FD) =$$
$$\sum_{noc=1}^{Loc}\left[OC_{ncm}^*(noc)VFT_z^{noc}(f_{b\_cfar}, f_{s\_comp\_cfar} + \right.$$
$$\{DOPposi(DOP_{ndm1}, DOPCase) - 1\} \times \Delta FD) \times$$
$$\exp\left\{-j\frac{2\pi(f_{s\_comp\_cfar} + (DopCase-1)\times \Delta FD - DOP_1)}{N_{code}}\times\right.$$
$$\left.\left.\frac{noc-1}{Loc}\right\}\exp\left\{j2\pi\Delta f\frac{2R(f_{b\_cfar})}{C_0}\frac{noc-1}{Loc}\right\}\right]$$

Equation 81-6 is different from equation 35 in the additional term for correcting the phase rotation caused by the change in center frequency:

[87]

$$\exp\left[j2\pi\Delta f\frac{2R(f_{b\_cfar})}{C_0}\frac{noc-1}{Loc}\right]$$

Here, $R(f_{b\_cfar})$ denotes a distance estimation value calculated from beat frequency index $f_{b\_cfar}$ in accordance with equation 31.

In equation 81-6, due to the change of $\Delta f$ in reflected-wave arrival time $(2R(f_{b\_cfar})/C_o)$ from $R(f_{b\_cfar})$, the phase rotation amount is given by $2\pi\Delta f \times (2R(f_{b\_cfar})/C_0)$ in code transmission period (Loc×Tr). Therefore, phase rotation caused by the time difference of Doppler analysis among Loc Doppler analyzers 210 is, for example, for the noc-th Doppler analyzer 210, (noc−1)/Loc times relative to that for the first Doppler analyzer 210. Equation 81-6 is derived from this situation. Note that noc=1, . . . , Loc.

In this manner, the period in which center frequency fc of a chirp signal is changed by $\Delta f$ is made equal to code transmission period (Loc×Tr) (or transmission periods, the number of which is equal to a divisor of Loc). Accordingly, the period in which the center frequency of a chirp signal is changed matches the period for switching Doppler analyzers 210 for each code element. For example, the period in which center frequency fc of a chirp signal is changed by $\Delta f$ matches the period for switching Doppler analyzers 210 for each code element, thereby allowing coded Doppler demultiplexer 212d to uniquely decide a phase correction value for each of Loc Doppler analyzers 210. This enables coded Doppler demultiplexer 212d to easily perform phase correction in (1) code separation process. Therefore, coded Doppler demultiplexer 212d can easily perform the code separation process.

Next, an example of the operation of direction estimator 213d that is different from that in Embodiment 1 (for example, a conversion process for Doppler velocity information of the target) will be described.

Direction estimator 213d may output Doppler velocity information $v_d$ of the target detected in the following way using, for example, Doppler frequency $f_{TARGET}$ of the target and distance index $f_{b\_cfar}$.

When radar transmission signals for which center frequencies fc of chirp signals are changed by $\Delta f$ for every code transmission period (Loc×Tr) are used, even if the relative velocity of the target is zero, center frequencies fc of chirp signals are changed for every code transmission period (Loc×Tr). Accordingly, a reception signal of radar apparatus 10d includes phase rotation caused by a change in the center frequency of a chirp signal for each code transmission period (Loc×Tr).

Center frequency fc in the m-th transmission period Tr for target distance $R_{target}$ is changed by $\text{floor}[(m-1)/Loc]\Delta f$ relative to the center frequency in the first transmission period Tr as a reference. Phase rotation amount $\Delta\eta(m, R_{target})$ caused by the change in center frequency fc is given by equation 81-7, with consideration given to reflected-wave arrival time $(2R_{target}/C_o)$ from target distance $R_{target}$. Equation 81-7 indicates the relative phase rotation amount obtained using the phase of the first transmission period Tr as a reference. $C_0$ denotes the speed of light.

[88]

$$\Delta\eta(m, R_{target}) = 2\pi\text{floor}\left(\frac{m-1}{Loc}\right)\Delta f \times \left(\frac{2R_{target}}{C_0}\right) \quad \text{(Equation 81-7)}$$

Therefore, as given by following equation 81-8, direction estimator 213d calculates Doppler velocity information $v_d(f_{TARGET}, f_{b\_cfar})$, based on a transformation equation taking into account $\Delta f$ that is the amount of change in center frequency fc of a chirp signal for each code transmission period (Loc×Tr).

[89]

$$v_d(f_{TARGET}, f_{b\_cfar}) = \frac{C_0}{2f_0}\left(f_{TARGET} - \frac{\Delta f \times 2R(f_{b\_cfar})}{Loc \times T_r \times C_0}\right) \quad \text{(Equation 81-8)}$$

In equation 81-8, the first term corresponds to equation 49 and is a relative Doppler velocity component represented by Doppler frequency $f_{TARGET}$. The second term in equation 81-8 is a Doppler velocity component that is generated by changing center frequency fc of a chirp signal by $\Delta f$ for each code transmission period (Loc×Tr). For example, as given by equation 81-8, direction estimator 213d can calculate the true relative 5 Doppler velocity $v_d(f_{TARGET}, f_{b\_cfar})$ of the target by removing the Doppler component in the second term from the first term. Here, $R(f_{b\_cfar})$ denotes distance information (distance estimation value) calculated from beat frequency index $f_{b\_cfar}$ in accordance with equation 31.

The Doppler range of the target is assumed to be up to ±1/(2×Tr). If $v_d(f_{TARGET}, f_{b\_cfar})$ satisfies $v_d(f_{TARGET}, f_{b\_cfar}) < -C_0/(4f_0 Tr)$, direction estimator 213d may output detected Doppler velocity information $v_d(f_{TARGET}, f_{b\_cfar})$ of the target in accordance with following equation 81-9.

[90]

$$v_d(f_{es\_cfar}, f_{b\_cfar}) = \frac{C_0}{2f_0}\left(f_{TARGET} + \frac{1}{T_r} - \frac{\Delta f \times 2R(f_{b\_cfar})}{Loc \times T_r \times C_0}\right) \quad \text{(Equation 81-9)}$$

Also, since the Doppler range of the target is assumed to be up to ±1/(2×Tr), if $v_d(f_{TARGET}, f_{b\_cfar})$ satisfies $v_d(f_{TARGET}, f_{b\_cfar}) > C_0/(4f_0 Tr)$, direction estimator 213d may output detected Doppler velocity information $v_d(f_{TARGET}, f_{b\_cfar})$ of the target in accordance with following equation 81-10.

[91]

$$v_d(f_{es\_cfar}, f_{b\_cfar}) = \frac{C_0}{2f_0}\left(f_{TARGET} - \frac{1}{T_r} - \frac{\Delta f \times 2R(f_{b\_cfar})}{Loc \times T_r \times C_0}\right) \quad \text{(Equation 81-10)}$$

As described above, in Variation 9, in radar apparatus 10d, center frequencies fc of chirp signals are changed based on code transmission periods (Loc×Tr). For example, radar apparatus 10d transmits radar transmission signals such that center frequencies fc of chirp signals are changed by Δf (for example, increased in a case where Δf>0 and decreased in a case where Δf<0) for every code transmission period (Loc× Tr). Even in this case, as in Embodiment 1, radar apparatus 10d (for example, MIMO radar) can extend the effective Doppler frequency bandwidth to 1/(Tr) and can extend the Doppler frequency (relative velocity) detection range with no ambiguity. In addition, radar apparatus 10d can reduce mutual interference between code-multiplexed signals to about the noise level. According to Variation 9, therefore, radar apparatus 10d can improve target-object sensing accuracy over a wider Doppler frequency range.

Variation 9 is applicable not only to Embodiment 1 but also to Variations 1 to 7 of Embodiment 1, and respective similar effects can be achieved. For example, in any of Variations 1 to 7 of Embodiment 1, radar transmission signals including chirp signals whose center frequencies fc are changed in the manner illustrated in FIG. 22 may be used.

According to Variation 9, furthermore, when the period in which center frequency fc of a chirp signal is changed by Δf is a plurality of transmission periods Tr, for example, the period in which center frequency fc of a chirp signal is changed is made to match code transmission period (Loc× Tr). Accordingly, the period in which center frequency fc of a chirp signal is changed is also made to match the period for switching Doppler analyzers 210 for each code element (in other words, the transmission period of a code used for code multiplexing). Therefore, coded Doppler demultiplexer 212d can easily perform phase correction in a code demultiplexing process.

In Variation 9, furthermore, radar apparatus 10d transmits, for example, radar transmission signals in such a manner that center frequencies fc of chirp signals are changed by Δf for every code transmission period (Loc×Tr), with the change width of the center frequencies of chirp signals being given by Δf×Ncode and the distance resolution being given by $0.5C_0/(\Delta f \times Ncode)$. For example, as the value given by Δf×Ncode increases, the distance resolution can be more improved by the change width of the center frequencies of chirp signals. According to Variation 9, since the distance resolution can be improved by a change width of the center frequencies of chirp signals, the chirp sweep bandwidth (for example, Bw) can be reduced compared with transmission with the center frequencies of chirp signals kept constant. The reduction in chirp sweep bandwidth can reduce, for example, the transmission period Tr while improving the distance resolution. As a result, in code multiplexing transmission, the detectable Doppler range without ambiguity can further be extended.

While Variation 9 has described the case where radar transmission signals are used for which center frequencies fc of chirp signals are changed by Δf for every code transmission period (Loc×Tr), the period in which center frequency fc of a chirp signal is changed is not limited to this. For example, radar apparatus 10d may use radar transmission signals for which center frequencies fc of chirp signals are changed by Δf for every transmission periods, the number of which is equal to a divisor of code length Loc (divisor of (Loc×Tr)). When 1 is used among divisors of code length Loc, as in Variation 8, center frequencies fc are changed by Δf for every transmission period Tr.

When radar transmission signals for which center frequencies fc of chirp signals are changed by Δf for every transmission periods, the number of which is equal to divisor ε of code length Loc, that is, for every c transmission periods (ε×Tr), are used, center frequencies fc of chirp signals are changed by an amount corresponding to Δf×Loc/ε for every code transmission period (Loc×Tr). Thus, in this case, Δf in equations 81-8, 81-9, and 81-10 may be replaced by Δf×Loc/ ε. Further, coded Doppler demultiplexer 212d uses following equation 81-11 instead of equation 81-6 in the code separation process. Here, ε denotes a divisor of Loc.

[92]

$$DeMUL_z^{ncm}(f_{b\_cfar}, f_{s\_comp\_cfar} + \{DOPposi(DOP_{ndm1}, DOPCase) - 1\} \times \Delta FD) = \quad \text{(Equation 81-11)}$$

$$\sum_{noc=1}^{Loc}\left[OC_{ncm}^*(noc)VFT_z^{noc}(f_{b\_cfar}, f_{s\_comp\_cfar} + \{DOPposi(DOP_{ndm1}, DOPCase) - 1\} \times \Delta FD) \times \right.$$

$$\exp\left\{-j\frac{2\pi(f_{s\_comp\_cfar} + (DopCase-1)\times\Delta FD - DOP_1)}{N_{code}} \times \frac{noc-1}{Loc}\right\} \times$$

$$\left.\exp\left\{j2\pi\Delta f \frac{2R(f_{b\_cfar})}{C_0} \frac{(noc-1-floor((noc-1/\varepsilon))}{\varepsilon}\right\}\right]$$

Variation 10 of Embodiment 1

The method for controlling center frequency fc of a frequency-modulated signal (chirp signal) is not limited to the methods according to Variation 8 (FIG. 20) and Variation 9 (FIG. 22). Variation 10 describes another method for controlling center frequency fc of a frequency-modulated signal (chirp signal).

The configuration of a radar apparatus according to Variation 10 may be similar to, for example, the configuration of radar apparatus 10d according to Variation 9.

In Variation 10, for example, radar apparatus 10d periodically changes center frequency fc of a chirp signal over a plurality of transmission periods within code transmission period (Loc×Tr). In this case, the timing at which center frequencies fc of chirp signals are changed in a round is made to match code transmission period (Loc×Tr), thereby allowing radar apparatus 10d to reduce the amount of signal processing performed by coded Doppler demultiplexer 212d (the details will be described below).

For example, in radar transmitter 100d, modulated signal emitter 102 periodically emits sawtooth-shaped modulated signals for VCO control. Here, the transmission period is represented by Tr.

Transmission frequency controller 112d controls, based on orthogonal code element index OC_INDEX output from coder 106d in phase rotation amount setter 104d, center frequency fc of a frequency-modulated signal (chirp signal) output from VCO 103d for each transmission period Tr.

For example, transmission frequency controller 112d sets center frequency fc of a frequency-modulated signal to be output from VCO 103d to $f_0$ in transmission period Tr corresponding to OC_INDEX=1. Further, transmission frequency controller 112d sets center frequency fc of a frequency-modulated signal to be output from VCO 103d to $f_0+\Delta f$ in transmission period Tr corresponding to OC_INDEX=2. Likewise, transmission frequency controller 112d sets center frequencies fc of the frequency-modulated signals to be output from VCO 103d to $(f_0+2\Delta f)$ to $(f_0+(Loc-1)\Delta f)$ in transmission periods Tr where OC_INDEX=3 to Loc, respectively.

With this control, transmission frequency controller 112d can perform control such that, for example, center frequencies fc of chirp signals are periodically changed over every code transmission period (Loc×Tr).

VCO 103d outputs frequency-modulated signals to phase rotators 107 and radar receiver 200d (for example, mixer section 204), based on the output of transmission frequency controller 112d and the output of modulated signal emitter 102.

Figure 23:
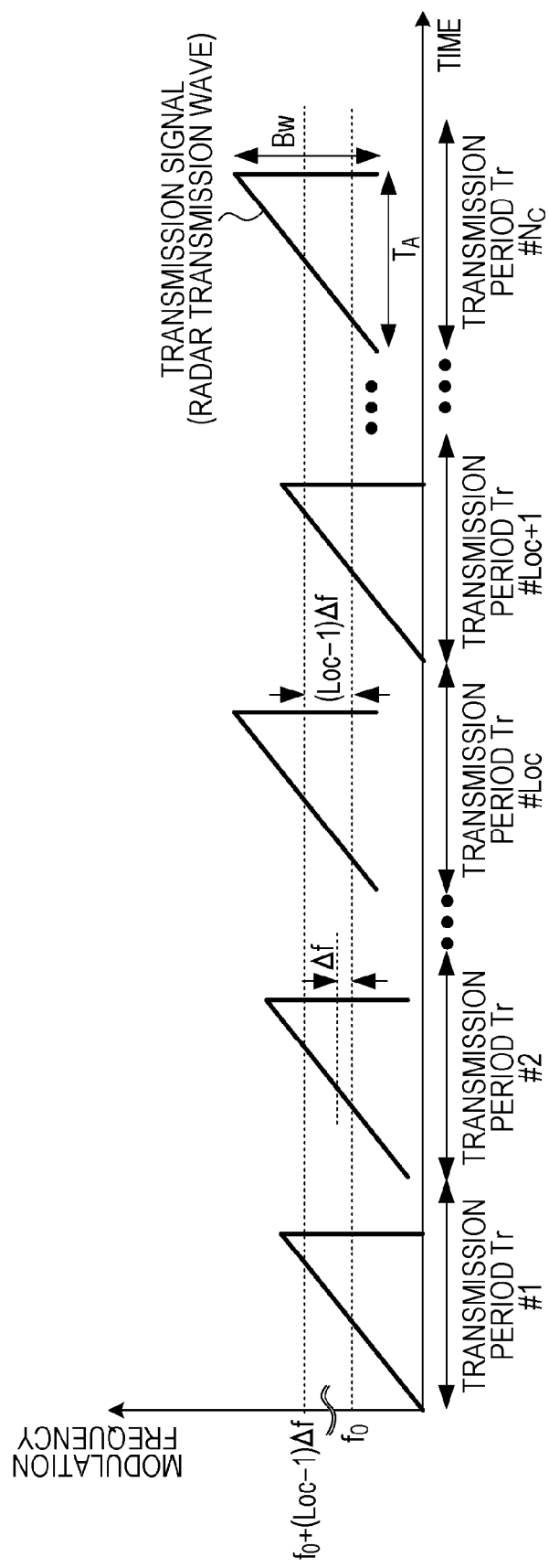
FIG. 23 is a diagram illustrating an example of transmission signals when chirp pulses according to Variation 10 of Embodiment 1 are used.

FIG. 23 illustrates an example of frequency-modulated signals (hereinafter referred to as chirp signals).

In FIG. 23, for example, VCO 103d outputs a chirp signal having center frequency fc(1) equal to $f_0$ during the first transmission period Tr #1. Further, for example, VCO 103d outputs a chirp signal having center frequency fc(2) equal to $f_0+\Delta f$ during the second transmission period Tr #2. Likewise, VCO 103d outputs chirp signals having center frequencies fc(3) to fc(Loc) equal to $(f_0+2\Delta f)$ to $(f_0+(Loc-1) \Delta f)$ during the third transmission period Tr #3 to the Loc-th transmission period Tr #Loc, respectively.

Further, VCO 103d outputs a chirp signal having center frequency fc(Loc+1) equal to $f_0$ during the (Loc+1)-th transmission period Tr #(Loc+1). Likewise, VCO 103d outputs chirp signals having center frequencies fc(Loc+2) to fc(2Loc) equal to $(f_0+\Delta f)$ to $(f_0+(Loc-1)\Delta f)$ during the (Loc+2)-th transmission period Tr #(Loc+2) to the (2Loc)-th transmission period Tr #(2Loc), respectively.

Likewise, VCO 103d outputs a chirp signal having center frequency fc(m) equal to $f_0+\text{mod}(m-1, Loc)\Delta f$ during the m-th transmission period Tr #m.

That is, in FIG. 23, center frequency $fc(N_c)$ of the chirp signal in the $N_c$-th transmission period Tr #$N_c$ is given by $f_0+(Loc-1)\Delta f$.

In this manner, in FIG. 23, center frequencies fc of chirp signals are changed in a round in a period that is a divisor multiple of the code length of a code sequence (for example, orthogonal code) relative to the transmission period of the radar transmission signal. In other words, for example, in FIG. 23, center frequencies fc of chirp signals are the same in transmission periods Tr having the same OC_INDEX.

The respective chirp signals may be, for example, chirp signals having the same frequency-modulation bandwidth Bw in time width $T_A$ of a range gate. In the example illustrated in FIG. 23, the case where $\Delta f>0$ (in other words, the case where center frequency fc is increased) is illustrated. The same applies to the case where $\Delta f<0$ (in other words, the case where center frequency fc is decreased).

Other operation of radar transmitter 100d illustrated in FIG. 21 may be similar to that in Embodiment 1.

Next, an example of the operation of radar receiver 200d of radar apparatus 10d will be described.

In radar receiver 200d, the processing performed by antenna channel processors 201 on signals received by receive antennas 202, and the operation of subsequent CFAR section 211 are similar to the operation in Embodiment 1. In radar receiver 200d, furthermore, a direction estimation process performed by direction estimator 213d using the output of coded Doppler demultiplexer 212d is also similar to the operation in Embodiment 1.

In radar receiver 200d, for example, the operation of coded Doppler demultiplexer 212d and a conversion process for Doppler velocity information of the target, which is performed by direction estimator 213d, is different from that in Embodiment 1.

The conversion of distance information $R(f_b)$ based on the beat frequency index is similar to that in Embodiment 1, and direction estimator 213d may output, for example, based on equation 31, distance information $R(f_b)$ using beat frequency index (or distance index) $f_b$.

The following describes an example of the operation of coded Doppler demultiplexer 212d, which is different from that in Embodiment 1.

For example, when radar transmission signals for which center frequencies fc of chirp signals are changed by $f_0$, $f_0+\Delta f, \ldots, f_0+(Loc-1)\Delta f$ for every transmission period Tr within each code transmission period (Loc×Tr) are used, radar reflected waves obtained in response to the transmission of chirp signals whose center frequencies fc are $f_0$, $f_0+\Delta f, \ldots$, and $f_0+(Loc-1)\Delta f$ are input to the first, second, ..., and Loc-th Doppler analyzers 210 as reception signals.

Thus, the center frequencies of the respective radar reflected waves to be input to Loc Doppler analyzers 210 are the same. Accordingly, Loc Doppler analyzers 210 perform Doppler analysis on reception signals that are radar reflected waves obtained when chirp signals having the same center frequency fc are transmitted.

In contract, center frequencies fc of the chirp signals differ in Loc Doppler analyzers 210. Accordingly, to correct phase rotation caused by the time difference of Doppler analysis among Loc Doppler analyzers 210 to separate code-multiplexed signals, coded Doppler demultiplexer 212d uses following equation 81-12 instead of equation 35 described in <(1) code separation process> in Embodiment 1.

[93]

$$DeMUL_z^{ncm}(f_{b\_cfar}, f_{s\_comp\_cfar} + \{DOPposi(DOP_{ndm1}, DOPCase) - 1\} \times \Delta FD) = \qquad \text{(Equation 81-12)}$$

$$\sum_{noc=1}^{Loc} \left[ OC_{ncm}^*(noc) VFT_z^{noc}(f_{b\_cfar}, f_{s\_comp\_cfar} + \{DOPposi(DOP_{ndm1}, DOPCase) - 1\} \times \Delta FD) \times \right.$$

$$\exp\left\{ -j \frac{2\pi(f_{s\_comp\_cfar} + \frac{(DopCase - 1) \times \Delta FD - DOP_1)}{N_{code}} \times \frac{noc-1}{Loc} \right\}$$

$$\left. \exp\left\{ -j2\pi(noc-1)\Delta f \frac{2R(f_{b\_cfar})}{C_0} \right\} \right]$$

Equation 81-12 is different from equation 35 in the additional term for correcting the phase rotation caused by the change in center frequency:

[94]

$$\exp\left[ -j2\pi(noc-1)\Delta f \frac{2R(f_{b\_cfar})}{C_0} \right]$$

Here, $R(f_{b\_cfar})$ denotes a distance estimation value calculated from beat frequency index $f_{b\_cfar}$ in accordance with equation 31.

Equation 81-12 is derived from the following. For example, when the center frequency of a transmission chirp signal for the first Doppler analyzer 210 is used as a reference, the center frequencies of transmission chirp signals for the second to Loc-th Doppler analyzers 210 are different by $\Delta f$, . . . , and $(Loc-1)\Delta f$, respectively. Accordingly, phase rotation amounts in reflected-wave arrival time $(2R(f_{b\_cfar})/C_0)$ from $R(f_{b\_cfar})$ are different.

That is, when the output of the first Doppler analyzer 210 is used as a phase reference, the phase rotation amount for the noc-th Doppler analyzer 210 is given by $2\pi(noc-1)\Delta f \times (2R(f_{b\_cfar})/C_o)$. To compensate for the phase rotation, in equation 81-12, the term

[95]

$$\exp\left[ -j2\pi(noc-1)\Delta f \frac{2R(f_{b\_cfar})}{C_0} \right]$$

is derived. Here, noc=1, . . . , Loc.

In this manner, when center frequencies fc of chirp signals are periodically changed over a plurality of chirp transmission periods within code transmission period (Loc×Tr) (or transmission periods, the number of which is equal to a divisor of Loc), the period for switching Doppler analyzers 210 for each code element matches the timing at which center frequencies fc of chirp signals are changed in a round. For example, the period in which center frequencies fc of chirp signals are periodically changed over a plurality of chirp transmission periods matches the period for switching Doppler analyzers 210 for each code element, thereby allowing coded Doppler demultiplexer 212d to uniquely decide a phase correction value for each of Loc Doppler analyzers 210. This enables coded Doppler demultiplexer 212d to easily perform phase correction in (1) code separation process. Therefore, coded Doppler demultiplexer 212d can easily perform the code separation process.

Next, an example of the operation of direction estimator 213d that is different from that in Embodiment 1 (for example, a conversion process for Doppler velocity information of the target) will be described.

For example, direction estimator 213d may calculate Doppler velocity information $v_d(f_{TARGET})$ of the target detected based on Doppler frequency $f_{TARGET}$ of the target determined by coded Doppler demultiplexer 212d in accordance with following equation 81-13 and output Doppler velocity information $v_d(f_{TARGET})$ as a position measurement result.

[96]

$$v_d(f_{TARGET}) = \frac{C_0}{2f_0} \times f_{TARGET} \qquad \text{(Equation 81-13)}$$

As described above, in Variation 10, in radar apparatus 10d, center frequencies fc of chirp signals are periodically changed over a plurality of transmission periods. Even in this case, as in Embodiment 1, radar apparatus 10d (for example, MIMO radar) can extend the effective Doppler frequency bandwidth to 1/(Tr) and can extend the Doppler frequency (relative velocity) detection range with no ambiguity. In addition, radar apparatus 10d can reduce mutual interference between code-multiplexed signals to about the noise level. According to Variation 10, therefore, radar apparatus 10d can improve target-object sensing accuracy over a wider Doppler frequency range.

Variation 10 is applicable not only to Embodiment 1 but also to Variations 1 to 7 of Embodiment 1, and respective similar effects can be achieved. For example, in any of Variations 1 to 7 of Embodiment 1, radar transmission signals including chirp signals whose center frequencies fc are changed in the manner illustrated in FIG. 23 may be used.

According to Variation 10, furthermore, the timing at which center frequencies fc of chirp signals are changed in a round matches code transmission period (Loc×Tr). Accordingly, for example, the timing at which center frequencies fc of chirp signals are changed in a round can be made to match the period for switching Doppler analyzers 210 for each code element (in other words, the transmission period of a code used for code multiplexing). This enables coded Doppler demultiplexer 212d to easily perform phase correction.

While Variation 10 has described the case where the timing at which center frequencies fc of chirp signals are changed in a round matches code transmission period (Loc× Tr), the timing at which center frequencies fc of chirp signals are changed in a round may be equal to (divisor of (Loc× Tr)). When the timing at which center frequencies fc of chirp signals are changed in a round is a period given by (divisor ε of Loc×Tr), that is, ε transmission periods (ε×Tr), coded Doppler demultiplexer 212d may use equation 81-14 instead of equation 81-12, where c denotes a divisor of Loc and satisfies ε>1.

[97]

$$DeMUL_z^{ncm}(f_{b\_cfar}, f_{s\_comp\_cfar} + \qquad \text{(Equation 81-14)}$$
$$\{DOPposi(DOP_{ndm1}, DOPCase) - 1\} \times \Delta FD) =$$
$$\sum_{noc=1}^{Loc} \left[ OC_{ncm}^*(noc) VFT_z^{noc}(f_{b\_cfar}, f_{s\_comp\_cfar} + \right.$$
$$\{DOPposi(DOP_{ndm1}, DOPCase) - 1\} \times \Delta FD) \times$$
$$\exp\left\{-j\frac{2\pi(f_{s\_comp\_cfar} + (DopCase-1) \times \Delta FD - DOP_1)}{N_{code}} \times \frac{noc-1}{Loc}\right\}$$
$$\left. \exp\left\{-j2\pi \bmod(noc-1, \varepsilon) \Delta f \frac{2R(f_{b\_cfar})}{C_0}\right\}\right]$$

Further, Variation 10 has described the case where radar transmission signals are used for which center frequencies fc of chirp signals are changed by an integer multiple of $\Delta f$, such as $f_0$, $f_0+\Delta f$, ..., $f_0+(Loc-1)\Delta f$ for each transmission period Tr, in code transmission period (Loc×Tr). However, the change width of center frequencies fc is not limited to a frequency of an integer multiple of $\Delta f$, and center frequencies fc may be set to vary by any frequency.

For example, radar transmission signals may be used for which center frequencies fc of chirp signals are changed by $f_0$, $f_0+\Delta f_1$, $f_0+\Delta f_2$, ..., and $f_0+\Delta f_{Loc-1}$ for every transmission period Tr in code transmission period (Loc×Tr). Here, $\Delta f_1$, $\Delta f_2$, ..., and $\Delta f_{Loc-1}$ are variable frequency values of center frequencies fc of chirp signals in respective transmission periods Tr in code transmission period (Loc×Tr). In this case, coded Doppler demultiplexer 212d may use following equation 81-15 instead of equation 81-12 in the code separation process.

[98]

$$DeMUL_z^{ncm}(f_{b\_cfar}, f_{s\_comp\_cfar} + \qquad \text{(Equation 81-15)}$$
$$\{DOPposi(DOP_{ndm1}, DOPCase) - 1\} \times \Delta FD) =$$
$$\sum_{noc=1}^{Loc} \left[ OC_{ncm}^*(noc) VFT_z^{noc}(f_{b\_cfar}, f_{s\_comp\_cfar} + \right.$$
$$\{DOPposi(DOP_{ndm1}, DOPCase) - 1\} \times \Delta FD) \times$$
$$\exp\left\{-j\frac{2\pi(f_{s\_comp\_cfar} + (DopCase-1) \times \Delta FD - DOP_1)}{N_{code}} \times \frac{noc-1}{Loc}\right\}$$
$$\left. \exp\left\{-j2\pi \Delta f_{noc-1} \frac{2R(f_{b\_cfar})}{C_0}\right\}\right]$$

Embodiment 2

Embodiment 1 has described the case where both Doppler multiplexing transmission and coding are used. In contrast, this embodiment describes a case where both Doppler multiplexing transmission and time multiplexing are used.

In this embodiment, for example, when Doppler-multiplexed transmission signals are transmitted in a multiplexed manner also using time multiplexing (hereinafter referred to as "time-Doppler multiplexing"), the numbers of time multiplexes for the respective Doppler-multiplexed transmission signals are set to be non-uniform. This enables radar apparatus to identify transmit antennas and determine the presence or absence of Doppler aliasing based on reception signals of time-Doppler multiplexed signals. As a result, the effective Doppler frequency bandwidth can be extended to 1/(Tr), and the Doppler frequency (relative velocity) detection range with no ambiguity can be extended.

[Configuration of Radar Apparatus]

Figure 24:
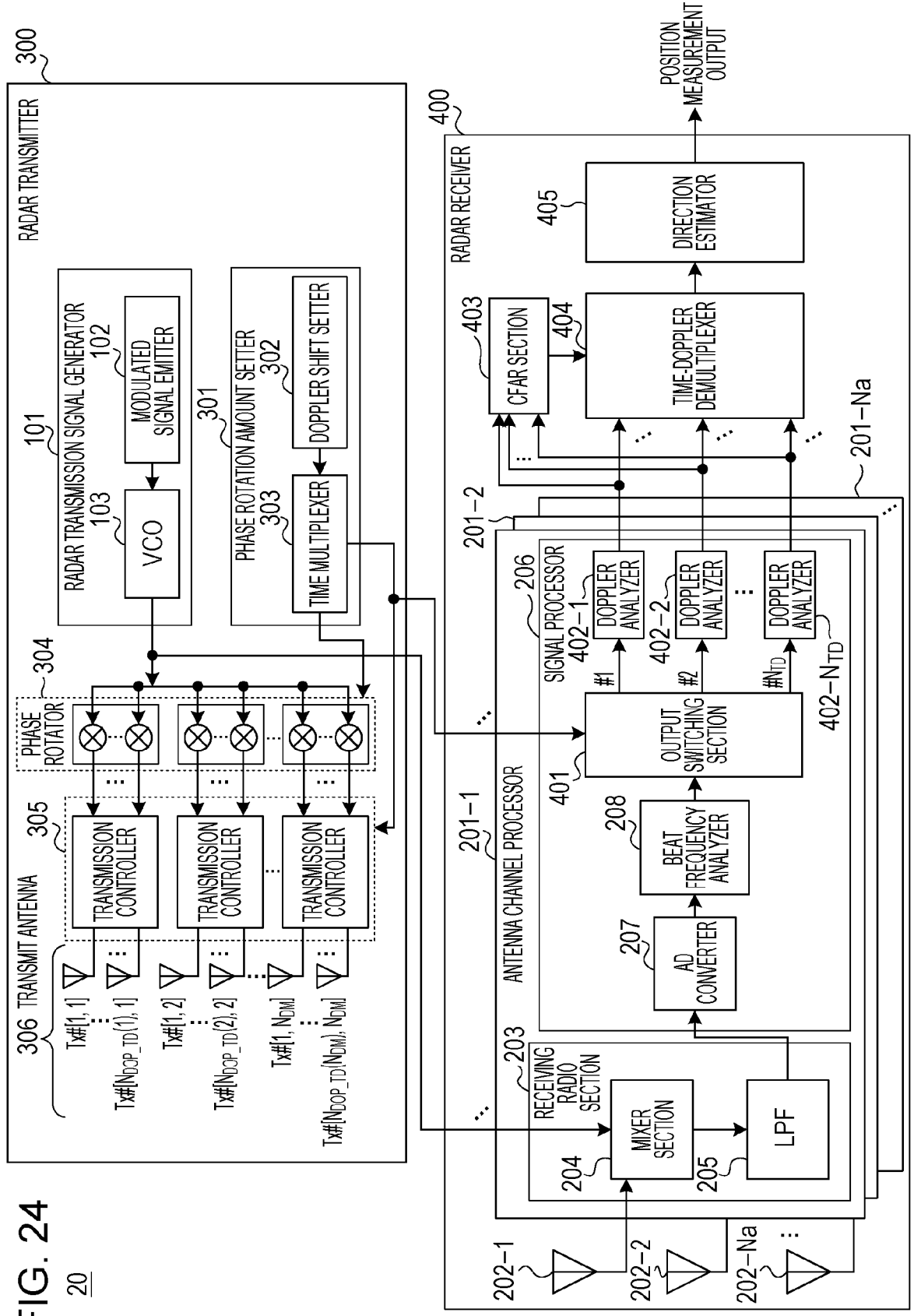
FIG. 24 is a block diagram illustrating an example configuration of a radar apparatus according to Embodiment 2.

FIG. 24 is a block diagram illustrating an example configuration of radar apparatus 20 according to this embodiment. In FIG. 24, components similar to those in Embodiment 1 (FIG. 1) are identified with the same numerals, and a description thereof is omitted.

The following describes, as an example, a configuration of a radar scheme (also referred to as, for example, chirp pulse transmission (fast chirp modulation)) that uses frequency-modulated pulse waves such as chirp pulses. Note that the modulation scheme is not limited to that for frequency modulation. For example, an exemplary embodiment of the present disclosure is also applicable to a radar scheme that uses a pulse compression radar configured to transmit a pulse train after performing phase modulation or amplitude modulation.

Radar apparatus 20 includes radar transmitter (transmitting branch) 300 and radar receiver (receiving branch) 400.

[Configuration of Radar Transmitter 300]

Radar transmitter 300 includes radar transmission signal generator 101, phase rotation amount setter 301, phase rotators 304, transmission controllers 305, and transmit antennas 306.

Phase rotation amount setter 301 sets phase rotation amounts (in other words, phase rotation amounts used for Doppler multiplexing) for phase rotators 304. Phase rotation amount setter 301 includes, for example, Doppler shift setter 302 and time multiplexer 303.

For example, Doppler shift setter 302 sets phase rotation amounts $\phi_{ndm}$ corresponding to Doppler shift amounts $DOP_{ndm}$ to be applied to radar transmission signals (for example, chirp signals) and outputs phase rotation amounts $\phi_{ndm}$ to time multiplexer 303. Here, ndm=1, ..., $N_{DM}$. $N_{DM}$ denotes the number of Doppler multiplexes (in other words, different numbers of Doppler shifts).

In Radar apparatus 20, since time multiplexing performed by time multiplexer 303 is also used, the number of Doppler multiplexes $N_{DM}$ may be set to be smaller than the number Nt of transmit antennas 306 used for multiplexing transmission. The number of Doppler multiplexes $N_{DM}$ is greater than or equal to, for example, 2.

Doppler shift amounts $DOP_1$, $DOP_2$, ..., and $DOP_{DM}$ are assigned different phase rotation amounts by, for example, dividing a phase rotation range greater than or equal to 0 and less than $2\pi$. For example, phase rotation amount $\phi_{ndm}$ for applying Doppler shift amount $DOP_{ndm}$ is assigned, as given by equation 1 (the angle is expressed in radian).

The assignment of phase rotation amounts for applying Doppler shift amounts $DOP_1$, $DOP_2$, ..., and $DOP_{DM}$ is not limited to that in this assignment method. For example, the assignment of phase rotation amounts given by equation 1 may be shifted. For example, phase rotation amounts may be assigned such that $\phi_{ndm}=2\pi(ndm)/N_{DM}$. Alternatively, phase rotation amounts $\phi_1$, $\phi_2$, ..., and $\phi_{DM}$ may be randomly assigned to Doppler shift amounts $DOP_1$, $DOP_2$, ..., and $DOP_{DM}$ using a phase-rotation-amount assignment table.

Time multiplexer 303 sets, for phase rotation amounts $\phi_1$, ..., and $\phi_{NDM}$ for applying $N_{DM}$ Doppler shift amounts output from Doppler shift setter 302, "time-multiplexed Doppler phase rotation amounts" based on the number of time multiplexes $N_{TD}$, and outputs time-multiplexed Doppler phase rotation amounts" to phase rotators 304.

In time multiplexer 303, the number of time multiplexes (hereinafter referred to as the number of time-Doppler multiplexes) for time-multiplexing a Doppler multiplexed signal using the ndm-th Doppler shift amount $DOP_{ndm}$ output from Doppler shift setter 302 is represented by "$N_{DOP\_TD}(ndm)$". Here, $ndm=1, \ldots, N_{DM}$.

The following describes an example of the operation of time multiplexer 303.

Time multiplexer 303 sets the number of time-Doppler multiplexes $N_{DOP\_TD}(ndm)$ so that, for example, the sum of the numbers of time-Doppler multiplexes $N_{DOP\_TD}(1)$, $N_{DOP\_TD}(2), \ldots,$ and $N_{DOP\_TD}(N_{DM})$ to be used to time-multiplex the respective Doppler multiplexed signals is equal to the number Nt of transmit antennas 306 used for multiplexing transmission. In other words, time multiplexer 303 sets the number of time-Doppler multiplexes $N_{DOP\_TD}$(ndm) so as to satisfy following equation 82. This enables radar apparatus 20 to perform multiplexing transmission in the Doppler frequency domain and the time domain (hereinafter referred to as time-Doppler multiplexing transmission) using Nt transmit antennas 306.

[99]

$$\sum_{ndm=1}^{N_{DM}} N_{DOP\_TD}(ndm) = Nt \qquad \text{(Equation 82)}$$

Here, time multiplexer 303 sets, for example, the numbers of time-Doppler multiplexes $N_{DOP\_TD}(1)$, $N_{DOP\_TD}(2), \ldots,$ and $N_{DOP\_TD}(N_{DM})$ so as to include different numbers of time-Doppler multiplexes in the range greater than or equal to 1 and less than or equal to $N_{TD}$. For example, time multiplexer 303 sets the numbers of time-Doppler multiplexes such that not all of the numbers of time-Doppler multiplexes are set to the number of time multiplexes $N_{TD}$, but at least one of the numbers of time-Doppler multiplexes is set to 1 (in other words, no multiplexing). In other words, time multiplexer 303 sets the numbers of time-Doppler multiplexes for Doppler multiplexed signals to be non-uniform. With this setting, for example, radar apparatus 20 can individually separate and receive signals transmitted from plural transmit antennas 306 in a time-Doppler multiplexed manner through reception processing described below.

Time multiplexer 303 sets, in the m-th transmission period Tr, time-multiplexed Doppler phase rotation amount $\psi_{ndop\_td(ndm), ndm}(m)$ given by following equation 83 for phase rotation amount $\phi_{ndm}$ for applying the ndm-th Doppler shift amount $DOP_{ndm}$ and outputs time-multiplexed Doppler phase rotation amount $\psi_{ndop\_td(ndm), ndm}(m)$ to phase rotators 304.

[100]

$$\psi_{ndop\_td(ndm),ndm}(m) = \text{floor}\left[\frac{(m-1)}{N_{TD}}\right] \times \phi_{ndm} \qquad \text{(Equation 83)}$$

Here, the subscript "ndop_td(ndm)" represents an index less than or equal to the number of time-Doppler multiplexes $N_{DOP\_TD}$(ndm) for phase rotation amount $\phi_{ndm}$ for applying Doppler shift amount $DOP_{ndm}$. For example, $ndop\_td(ndm)=1, \ldots, N_{DOP\_TD}(ndm)$.

For example, as given by equation 83, time-multiplexed Doppler phase rotation amount $\psi_{ndop\_td(ndm), ndm}(m)$ provides a constant phase rotation amount for applying Doppler shift amount $DOP_{ndm}$ for the duration of $N_{TD}$ transmission periods, the number of which is equal to the number of time multiplexes used for time multiplexing (for example, $N_{TD} \times$ Tr).

Further, time multiplexer 303 outputs, for each transmission period (Tr), time multiplexing index TD_INDEX to radar receiver 400 (output switching section 401 described below). Further, time multiplexer 303 outputs, for each transmission period Tr, time multiplexing index TD_INDEX and the number of time-Doppler multiplexes $N_{DOP\_TD}$(ndm) to transmission controllers 305.

TD_INDEX represents a time multiplexing index that indicates a transmission period in the duration of $N_{TD}$ transmission periods ($N_{TD} \times$ Tr), the number of which is equal to the number of time multiplexes, in other words, indicates a transmission duration or transmission timing for time multiplexing. TD_INDEX cyclically varies in the range of 1 to $N_{TD}$ for each transmission period (Tr), as given by following equation 84.

$$\text{TD\_INDEX} = \text{mod}(m-1, N_{TD}) + 1 \qquad \text{(Equation 84)}$$

Here, mod(x, y) denotes a modulo operator and is a function that outputs the remainder of x divided by y. Further, $m=1, \ldots,$ Nc. Nc denotes the number of transmission periods used for radar position determination (the number of transmissions of radar transmission signals). The number Nc of transmissions of radar transmission signals is set to an integer multiple (Ntdslot times) of $N_{TD}$. For example, $Nc = N_{TD} \times$ Ntdslot.

Next, an example method for setting the numbers of time-Doppler multiplexes $N_{DOP\_TD}$(ndm) for Doppler multiplexed signals to be non-uniform using time multiplexer 303 will be described.

For example, time multiplexer 303 sets the number of time multiplexes $N_{TD}$ satisfying the condition below. For example, the number of time multiplexes $N_{TD}$ and the number of Doppler multiplexes $N_{DM}$ satisfy the following relationship for the number Nt of transmit antennas 306 used for multiplexing transmission.

(Number of time multiplexes $N_{TD}$)×(number of Doppler multiplexes $N_{DM}$)>number Nt of transmit antennas used for multiplexing transmission For example, among the numbers of time multiplexes $N_{TD}$ and the numbers of Doppler multiplexes $N_{DM}$ satisfying the above-described condition, the use of a combination having a smaller value of the product ($N_{TD} \times N_{DM}$) is desirable in terms of both characteristics and complexity of circuit configuration. Note that among the numbers of time multiplexes $N_{TD}$ and the numbers of Doppler multiplexes $N_{DM}$ satisfying the above-described condition, a combination having a smaller value of the product ($N_{TD} \times N_{DM}$) is not restrictive, and any other combination may be applied.

For example, in a case where Nt=3, the combination of $N_{DM}=2$, $N_{TD}=2$ is desirable.

In this case, in the assignment of Doppler shift amounts $DOP_1$ and $DOP_2$ and time multiplexes, the numbers of time-Doppler multiplexes $N_{DOP\_TD}(1)$ and $N_{DOP\_TD}(2)$ are set in two combinations, namely, the combination of $N_{DOP\_TD}(1)=2$ and $N_{DOP\_TD}(2)=1$, and the combination of $N_{DOP\_TD}(1)=1$ and $N_{DOP\_TD}(2)=2$.

Further, for example, in a case where Nt=4, the combination of $N_{DM}=3$ and $N_{TD}=2$ or the combination of $N_{DM}=2$ and $N_{TD}=3$ is desirable.

For example, in a case where Nt=4, $N_{DM}$=3, and $N_{TD}$=2, in the assignment of Doppler shift amounts $DOP_1$, $DOP_2$, and $DOP_3$ and time multiplexes, the numbers of time-Doppler multiplexes $N_{DOP\_TD}(1)$, $N_{DOP\_TD}(2)$, and $N_{DOP\_TD}(3)$ are set in three combinations, namely, the combination of $N_{DOP\_TD}(1)$=2, $N_{DOP\_TD}(2)$=1, and $N_{DOP\_TD}(3)$=1, the combination of $N_{DOP\_TD}(1)$=1, $N_{DOP\_TD}(2)$=2, and $N_{DOP\_TD}(3)$=1, and the combination of $N_{DOP\_TD}(1)$=1, $N_{DOP\_TD}(2)$=1, and $N_{DOP\_TD}(3)$=2.

For example, in a case where Nt=4, $N_{DM}$=2, and $N_{TD}$=3, in the assignment of Doppler shift amounts $DOP_1$ and $DOP_2$ and time multiplexes, the numbers of time-Doppler multiplexes $N_{DOP\_TD}(1)$ and $N_{DOP\_TD}(2)$ are set in two combinations, namely, the combination of $N_{DOP\_TD}(1)$=3 and $N_{DOP\_TD}(2)$=1, and the combination of $N_{DOP\_TD}(1)$=1 and $N_{DOP\_TD}(2)$=3.

Further, for example, in a case where Nt=5, the combination of $N_{DM}$=3 and $N_{TD}$=2 is desirable.

For example, in a case where Nt=5, $N_{DM}$=3, and $N_{TD}$=2, in the assignment of Doppler shift amounts $DOP_1$, $DOP_2$, and $DOP_3$ and time multiplexes, the numbers of time-Doppler multiplexes $N_{DOP\_TD}(1)$, $N_{DOP\_TD}(2)$, and $N_{DOP\_TD}(3)$ are set in three combinations, namely, the combination of $N_{DOP\_TD}(1)$=2, $N_{DOP\_TD}(2)$=2, and $N_{DOP\_TD}(3)$=1, the combination of $N_{DOP\_TD}(1)$=2, $N_{DOP\_TD}(2)$=1, and $N_{DOP\_TD}(3)$=2, and the combination of $N_{DOP\_TD}(1)$=1, $N_{DOP\_TD}(2)$=2, and $N_{DOP\_TD}(3)$=2.

Further, for example, in a case where Nt=6 or 7, the combination of $N_{DM}$=4 and $N_{TD}$=2 is desirable.

For example, in a case where Nt=6, $N_{DM}$=4, and $N_{TD}$=2, in the assignment of Doppler shift amounts $DOP_1$, $DOP_2$, $DOP_3$, and $DOP_4$ and time multiplexes, the numbers of time-Doppler multiplexes $N_{DOP\_TD}(1)$, $N_{DOP\_TD}(2)$, $N_{DOP\_TD}(3)$, and $N_{DOP\_TD}(4)$ are set in following six combinations.

$N_{DOP\_TD}(1)$=2, $N_{DOP\_TD}(2)$=2, $N_{DOP\_TD}(3)$=1, $N_{DOP\_TD}(4)$=1

$N_{DOP\_TD}(1)$=2, $N_{DOP\_TD}(2)$=1, $N_{DOP\_TD}(3)$=2, $N_{DOP\_TD}(4)$=1

$N_{DOP\_TD}(1)$=2, $N_{DOP\_TD}(2)$=1, $N_{DOP\_TD}(3)$=1, $N_{DOP\_TD}(4)$=2

$N_{DOP\_TD}(1)$=1, $N_{DOP\_TD}(2)$=2, $N_{DOP\_TD}(3)$=2, $N_{DOP\_TD}(4)$=1

$N_{DOP\_TD}(1)$=1, $N_{DOP\_TD}(2)$=2, $N_{DOP\_TD}(3)$=1, $N_{DOP\_TD}(4)$=2

$N_{DOP\_TD}(1)$=1, $N_{DOP\_TD}(2)$=1, $N_{DOP\_TD}(3)$=2, $N_{DOP\_TD}(4)$=2

For example, in a case where Nt=7, $N_{DM}$=4, and $N_{TD}$=2, in the assignment of Doppler shift amounts $DOP_1$, $DOP_2$, $DOP_3$, and $DOP_4$ and time multiplexes, the numbers of time-Doppler multiplexes $N_{DOP\_TD}(1)$, $N_{DOP\_TD}(2)$, $N_DOP_{TD}(3)$, and $N_DOP_{TD}(4)$ are set in following four combinations.

$N_{DOP\_TD}(1)$=2, $N_{DOP\_TD}(2)$=2, $N_{DOP\_TD}(3)$=2, $N_{DOP\_TD}(4)$=1

$N_{DOP\_TD}(1)$=2, $N_{DOP\_TD}(2)$=2, $N_{DOP\_TD}(3)$=1, $N_{DOP\_TD}(4)$=2

$N_{DOP\_TD}(1)$=2, $N_{DOP\_TD}(2)$=1, $N_{DOP\_TD}(3)$=2, $N_{DOP\_TD}(4)$=2

$N_{DOP\_TD}(1)$=1, $N_{DOP\_TD}(2)$=2, $N_{DOP\_TD}(3)$=2, $N_{DOP\_TD}(4)$=1

Likewise, for example, in a case where Nt=8 or 9, the combination of $N_{DM}$=5 and $N_{TD}$=2 is desirable. Further, for example, in a case where Nt=10, the combination of $N_{DM}$=6 and $N_{TD}$=2 is desirable. The number Nt of transmit antennas 306 is not limited to that in the example described above, and an exemplary embodiment of the present disclosure is also applicable to Nt=11 or more.

Next, an example of how time-multiplexed Doppler phase rotation amount $\psi_{ndop\_td(ndm), ndm}(m)$ is set will be described.

For example, a description will be given of a case where in time multiplexer 303, the number of transmit antennas used for multiplexing transmission Nt=3, the number of Doppler multiplexes $N_{DM}$=2, and $N_{TD}$=2. In this case, for example, if the numbers of time-Doppler multiplexes are set such that $N_{DOP\_TD}(1)$=1 and $N_{DOP\_TD}(2)$=2, time multiplexer 303 sets time-multiplexed Doppler phase rotation amounts $\psi_{1,1}(m)$, $\psi_{1,2}(m)$, and $\psi_{2,2}(m)$ given by following equations 85 to 87 and outputs time-multiplexed Doppler phase rotation amounts $\psi_{1,1}(m)$, $\psi_{1,2}(m)$, and $\psi_{2,2}(m)$ to phase rotators 304. Here, m=1, . . . , Nc.

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \{0, 0, \phi_1, \phi_1, 2\phi_1, 2\phi_1, 3\phi_1, 3\phi_1, \ldots\} \quad \text{(Equation 85)}$$

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \{0, 0, \phi_2, \phi_2, 2\phi_2, 2\phi_2, 3\phi_2, 3\phi_2, \ldots\} \quad \text{(Equation 86)}$$

$$\{\psi_{2,2}(1), \psi_{2,2}(2), \psi_{2,2}(3), \psi_{2,2}(4), \psi_{2,2}(5), \psi_{2,2}(6), \psi_{2,2}(7), \psi_{2,2}(8), \ldots\} = \{0, 0, \phi_2, \phi_2, 2\phi_2, 2\phi_2, 3\phi_2, 3\phi_2, \ldots\} \quad \text{(Equation 87)}$$

In equations 86 and 87, time-multiplexed Doppler phase rotation amounts $\psi_{1,2}(m)$ and $\psi_{2,2}(m)$ are the same phase rotation amount, and the corresponding signals are subjected to, for example, an operation of temporally shifting transmission timings (time multiplexing) in transmission controllers 305 described below.

Here, as an example, a description will be given of a case where the phase rotation amount for applying Doppler shift amount $DOP_{ndm}$ is given by $\phi_{ndm} = 2\pi(ndm-1)/N_{DM}$ in equation 1, and phase rotation amount $\phi_1$ for applying Doppler shift amount $DOP_1$, which is equal to 0, and phase rotation amount $\phi_2$ for applying Doppler shift amount $DOP_2$, which is equal to $\pi$, are used. That is, intervals of phase rotation amounts $\phi_{ndm}$ for applying Doppler shift amounts $DOP_{ndm}$ are equal. In this case, time multiplexer 303 sets coded Doppler phase rotation amounts $\psi_{1,1}(m)$, $\psi_{1,2}(m)$, and $\psi_{2,2}(m)$ given by following equations 88 to 90 and outputs coded Doppler phase rotation amounts $\psi_{1,1}(m)$, $\psi_{1,2}(m)$, and $\psi_{2,2}(m)$ to phase rotators 304. Here, m=1, . . . , Nc. Here, a modulo operation for $2\pi$ is performed, and results are expressed in radians ranging from 0 or more to less than $2\pi$ (the same applies to the following description).

$$\{\psi_{1,1}(1), \psi_{1,1}(2), \psi_{1,1}(3), \psi_{1,1}(4), \psi_{1,1}(5), \psi_{1,1}(6), \psi_{1,1}(7), \psi_{1,1}(8), \ldots\} = \{0, 0, 0, 0, 0, 0, 0, 0, \ldots\} \quad \text{(Equation 88)}$$

$$\{\psi_{1,2}(1), \psi_{1,2}(2), \psi_{1,2}(3), \psi_{1,2}(4), \psi_{1,2}(5), \psi_{1,2}(6), \psi_{1,2}(7), \psi_{1,2}(8), \ldots\} = \{0, 0, \pi, \pi, 0, 0, \pi, \pi, \ldots\} \quad \text{(Equation 89)}$$

$$\{\psi_{2,2}(1), \psi_{2,2}(2), \psi_{2,2}(3), \psi_{2,2}(4), \psi_{2,2}(5), \psi_{2,2}(6), \psi_{2,2}(7), \psi_{2,2}(8), \ldots\} = \{0, 0, \pi, \pi, 0, 0, \pi, \pi, \ldots\} \quad \text{(Equation 90)}$$

As given by equations 88 to 90, when a phase rotation amount is set to $\phi_{ndm} = 2\pi(ndm-1)/N_{DM}$, into which $2\pi$ is equally divided, time-multiplexed Doppler phase rotation amounts $\psi_{1,1}(m)$, $\psi_{1,2}(m)$, and $\psi_{2,2}(m)$ are changed in transmission periods given by $N_{DM} \times N_{TD} = 2 \times 2 = 4$.

As given by equations 88 to 90, furthermore, the number of phases used for a phase rotation amount for applying a Doppler shift amount (for example, two, namely, 0 and $\pi$) is equal to the number of Doppler shift amounts used for multiplexing transmission (in other words, the number of Doppler multiplexes) $N_{DM}$=2.

Further, for example, a description will be given of a case where in time multiplexer 303, the number of transmit antennas used for multiplexing transmission Nt=6, the number of Doppler multiplexes $N_{DM}$=4, and $N_{TD}$=2. In this case, for example, if the numbers of time-Doppler multiplexes are set such that $N_{DOP\_TD}$ (1)=1, $N_{DOP\_TD}$ (2)=1, $N_{DOP\_TD}$ (3)=2, and $N_{DOP\_TD}$ (4)=2, time multiplexer 303 sets time-multiplexed Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ given by following equations 91 to 96 and outputs time-multiplexed Doppler phase rotation amounts $\psi_{1,1}(m)$, $\{\psi_{1,1}(1),\psi_{1,1}(2),\psi_{1,1}(3),\psi_{1,1}(4),\psi_{1,1}(5),\psi_{1,1}(6),\psi_{1,1}(7),\psi_{1,1}(8),\ldots\}=\{0,0,\phi_1,\phi_1,2\phi_1,2\phi_1,3\phi_1,3\phi_1,\ldots\}$ (Equation 91)

$\{\psi_{1,2}(1),\psi_{1,2}(2),\psi_{1,2}(3),\psi_{1,2}(4),\psi_{1,2}(5),\psi_{1,2}(6),\psi_{1,2}(7),\psi_{1,2}(8),\ldots\}=\{0,0,\phi_2,\phi_3,2\phi_2,2\phi_3,3\phi_2,3\phi_3,\ldots\}$ (Equation 92)

$\{\psi_{1,3}(1),\psi_{1,3}(2),\psi_{1,3}(3),\psi_{1,3}(4),\psi_{1,3}(5),\psi_{1,3}(6),\psi_{1,3}(7),\psi_{1,3}(8),\ldots\}=\{0,0,\phi_3,\phi_3,2\phi_3,2\phi_4,3\phi_3,3\phi_3,\ldots\}$ (Equation 93)

$\{\psi_{2,3}(1),\psi_{2,3}(2),\psi_{2,3}(3),\psi_{2,3}(4),\psi_{2,3}(5),\psi_{2,3}(6),\psi_{2,3}(7),\psi_{2,3}(8),\ldots\}=\{0,\pi,\phi_3,\phi_3+\pi,2\phi_3,2\phi_3+\pi,3\phi_3,3\phi_3+\pi,\ldots\}$ (Equation 94)

$\{\psi_{1,4}(1),\psi_{1,4}(2),\psi_{1,4}(3),\psi_{1,4}(4),\psi_{1,4}(5),\psi_{1,4}(6),\psi_{1,4}(7),\psi_{1,4}(8),\ldots\}=\{0,0,\phi_4,\phi_4,2\phi_4,2\phi_4,3\phi_4,3\phi_4,\ldots\}$ (Equation 95)

$\{\psi_{2,4}(1),\psi_{2,4}(2),\psi_{2,4}(3),\psi_{2,4}(4),\psi_{2,4}(5),\psi_{2,4}(6),\psi_{2,4}(7),\psi_{2,4}(8),\ldots\}=\{0,\pi,\phi_4,\phi_4+\pi,2\phi_4,2\phi_4+\pi,3\phi_4,3\phi_4+\pi,\ldots\}$ (Equation 96)

In equations 93 and 94, time-multiplexed Doppler phase rotation amounts $\psi_{1,3}(m)$ and $\psi_{2,3}(m)$ are the same phase rotation amount, and the corresponding signals are subjected to an operation of temporally shifting transmission timings (time multiplexing) in transmission controllers 305 described below. Also in equations 95 and 96, time-multiplexed Doppler phase rotation amounts $\psi_{1,4}(m)$ and $\psi_{2,4}(m)$ are the same phase rotation amount, and the corresponding signals are subjected to an operation of temporally shifting transmission timings (time multiplexing) in transmission controllers 305 described below.

Here, as an example, the phase rotation amount for applying Doppler shift amount $DOP_{ndm}$ is given by $\phi_{ndm}=2\pi(ndm-1)/N_{DM}$, and phase rotation amount $\phi_1$ for applying Doppler shift amount $DOP_1$, which is equal to 0, phase rotation amount $\phi_2$ for applying Doppler shift amount $DOP_2$, which is equal to $\pi/2$, phase rotation amount $\phi_3$ for applying Doppler shift amount $DOP_3$, which is equal to $\pi$, and phase rotation amount $\phi_4$ for applying Doppler shift amount $DOP_4$, which is equal to $3\pi/2$, are used. In this case, time multiplexer 303 sets time-multiplexed Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ given by following equations 97 to 102 and outputs time-multiplexed Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ to phase rotators 304. Here, m=1, . . . , Nc.

[114]

$\{\psi_{1,1}(1), \psi_{1,1}(2), \psi_{1,1}(3), \psi_{1,1}(4), \psi_{1,1}(5), \psi_{1,1}(6),$ (Equation 97)
$\psi_{1,1}(7), \psi_{1,1}(8), \ldots\} = \{0, 0, 0, 0, 0, 0, 0, 0, \ldots\}$

[115]

$\{\psi_{1,2}(1), \psi_{1,2}(2), \psi_{1,2}(3), \psi_{1,2}(4),$ (Equation 98)
$\psi_{1,2}(5), \psi_{1,2}(6), \psi_{1,2}(7), \psi_{1,2}(8), \ldots\} =$
$\left\{0, 0, \frac{\pi}{2}, \frac{\pi}{2}, \pi, \pi, \frac{3\pi}{2}, \frac{3\pi}{2}, \ldots\right\}$

[116]

$\{\psi_{1,3}(1), \psi_{1,3}(2), \psi_{1,3}(3), \psi_{1,3}(4), \psi_{1,3}(5), \psi_{1,3}(6),$ (Equation 99)
$\psi_{1,3}(7), \psi_{1,3}(8), \ldots\} = \{0, 0, \pi, \pi, 0, 0, \pi, \pi, \ldots\}$

[117]

$\{\psi_{2,3}(1), \psi_{2,3}(2), \psi_{2,3}(3), \psi_{2,3}(4), \psi_{2,3}(5), \psi_{2,3}(6),$ (Equation 100)
$\psi_{2,3}(7), \psi_{2,3}(8), \ldots\} = \{0, 0, \pi, \pi, 0, 0, \pi, \pi, \ldots\}$

[118]

$\{\psi_{1,4}(1), \psi_{1,4}(2), \psi_{1,4}(3), \psi_{1,4}(4),$ (Equation 101)
$\psi_{1,4}(5), \psi_{1,4}(6), \psi_{1,4}(7), \psi_{1,4}(8), \ldots\} =$
$\left\{0, 0, \frac{3\pi}{2}, \frac{3\pi}{2}, \pi, \pi, \frac{\pi}{2}, \frac{\pi}{2}, \ldots\right\}$

[119]

$\{\psi_{2,4}(1), \psi_{2,4}(2), \psi_{2,4}(3), \psi_{2,4}(4),$ (Equation 102)
$\psi_{2,4}(5), \psi_{2,4}(6), \psi_{2,4}(7), \psi_{2,4}(8), \ldots\} =$
$\left\{0, 0, \frac{3\pi}{2}, \frac{3\pi}{2}, \pi, \pi, \frac{\pi}{2}, \frac{\pi}{2}, \ldots\right\}$ As given by equations 97 to 102, when a phase rotation amount is set to $\phi_{ndm}=2\pi(ndm-1)/N_{DM}$, into which $2\pi$ is equally divided, time-multiplexed Doppler phase rotation amounts $\psi_{1,1}(m)$, $\psi_{1,2}(m)$, $\psi_{1,3}(m)$, $\psi_{2,3}(m)$, $\psi_{1,4}(m)$, and $\psi_{2,4}(m)$ are changed in transmission periods given by $N_{DM}\times N_{TD}=4\times2=8$.

As given by equations 97 to 102, furthermore, the number of phases used for a phase rotation amount for applying a Doppler shift amount (for example, four, namely, 0, $\pi/2$, $\pi$, and $3\pi/2$) is equal to the number of Doppler shift amounts used for multiplexing transmission (in other words, the number of Doppler multiplexes) $N_{DM}$=4.

While the description has been given of, as an example, the setting of phase rotation amounts in a case where the number Nt of transmit antennas 306 is equal to 3 and the number of Doppler multiplexes $N_{DM}$ is equal to 2 and in a case where the number Nt of transmit antennas 306 is equal to 6 and the number of Doppler multiplexes $N_{DM}$ is equal to 4, the number Nt of transmit antennas 306 and the number of Doppler multiplexes $N_{DM}$ are not limited to the values described above. For example, the number of phases used for a phase rotation amount for applying a Doppler shift amount may be equal to the number $N_{DM}$ of Doppler shift amounts used for multiplexing transmission.

The foregoing description has been given of a method for setting phase rotation amounts using time multiplexer 303.

In FIG. 24, each phase rotator 304 applies a phase rotation amount to a chirp signal output from radar transmission signal generator 101, for each transmission period Tr, based on the time-multiplexed Doppler phase rotation amount $\psi_{ndop\_td(ndm),\,ndm}(m)$ set by phase rotation amount setter 301. Here, ndm=1, . . . , $N_{DM}$, and ndop_td(ndm)=1, . . . , $N_{DOP\_TD}$(ndm).

The sum of the numbers of time-Doppler multiplexes $N_{DOP\_TD}$(1), $N_{DOP\_TD}$(2), . . . , and $N_{DOP\_TD}$($N_{DM}$) is set to be equal to the number Nt of transmit antennas 306, and Nt time-multiplexed Doppler phase rotation amounts are respectively input to Nt phase rotators 304.

Each of Nt phase rotators 304 applies time-multiplexed Doppler phase rotation amount $\psi_{ndop\_td(ndm),\,ndm}(m)$ input thereto to a chirp signal output from radar transmission signal generator 101 for each transmission period Tr. In the following, phase rotator 304 that applies time-multiplexed Doppler phase rotation amount $\Delta f_{ndop\_td(ndm),\ ndm}(m)$ is represented by "phase rotator PROT #[ndop_td(ndm), ndm]".

The outputs of Nt phase rotators 304 are output to Nt transmission controllers 305. For example, the output of phase rotator PROT #[ndop_td(ndm), ndm] is output to transmission controller TXCTRL #[ndop_td(ndm), ndm]. Here, ndm=1, . . . , $N_{DM}$, and ndop_td(ndm)=1, . . . , $N_{DOP\_TD}$(ndm).

In FIG. 24, among Nt transmission controllers 305, transmission controller TXCTRL #[ndop_td(ndm), ndm] controls, based on the number of time-Doppler multiplexes $N_{DOP\_TD}$(ndm) and time multiplexing index TD_INDEX, the transmission (in other words, output) of a transmission signal input from the corresponding one of phase rotators 304. For example, transmission controllers 305 controls the turning on and off of transmission (transmission on and transmission off) of transmission signals.

In the following, whether transmission controller TXCTRL #[ndop_td(ndm), ndm] is in transmission on or transmission off state for each time multiplexing index TD_INDEX is displayed using "transmission controller response STATE_TXCTRL #[ndop_td(ndm), ndm]=[state(1), state(2), . . . , state($N_{TD}$)]".

An element of STATE_TXCTRL #[ndop_td(ndm), ndm], namely, state(TD_INDEX), indicates a transmission on or transmission off state for TD_INDEX=1, . . . , $N_{TD}$. For example, state(TD_INDEX) may indicate 1 for transmission on, and state(TD_INDEX) may indicate 0 for transmission off.

For example, when the number of time-Doppler multiplexes $N_{DOP\_TD}$(ndm)=1 for a Doppler multiplexed signal using Doppler shift amount $DOP_{ndm}$, ndop_td(ndm)=1, and the number of time multiplexes is 1. Thus, transmission controller TXCTRL #[1, ndm] outputs all transmission signals for time multiplexing indices TD_INDEX=1, . . . , $N_{TD}$(transmission on). Accordingly, when the number of time-Doppler multiplexes $N_{DOP\_TD}$(ndm)=1 for a Doppler multiplexed signal using Doppler shift amount $DOP_{ndm}$, the transmission controller response is represented by STATE_TXCTRL #[1, ndm]=[1, 1, . . . , 1].

In contrast, for example, when the number of time-Doppler multiplexes $N_{DOP\_TD}$(ndm)=$N_{TD}$ for a Doppler multiplexed signal using Doppler shift amount $DOP_{ndm}$, ndop_td(ndm)=1, . . . , $N_{TD}$, and the number of time multiplexes is $N_{TD}$. Thus, transmission controller TXCTRL #[ndop_td(ndm), ndm] outputs a transmission signal when time multiplexing index TD_INDEX=ndop_td(ndm)(transmission on). Accordingly, when the number of time-Doppler multiplexes $N_{DOP\_TD}$(ndm)=$N_{DOP\_TD}$(ndm)=$N_{TD}$ for a Doppler multiplexed signal using Doppler shift amount $DOP_d$m, the transmission controller response STATE_TXCTRL #[ndop_td(ndm), ndm] is 1 (transmission on) when TD_INDEX=ndop_td(ndm), and is 0 (transmission off) when TD_INDEX=ndop_td(ndm).

For example, when the number of time-Doppler multiplexes $N_{DOP\_TD}$(1)=4 (=$N_{TD}$) for a Doppler multiplexed signal using Doppler shift amount $DOP_1$, the transmission controller response for transmission controller TXCTRL #[1, 1] is represented by STATE_TXCTRL #[1, 1]=[1, 0, 0, 0], the transmission controller response for transmission controller TXCTRL #[2, 1] is represented by STATE_TXCTRL #[2, 1]=[0, 1, 0, 0], the transmission controller response for transmission controller TXCTRL #[3, 1] is represented by STATE_TXCTRL #[3, 1]=[0, 0, 1, 0], and the transmission controller response for transmission controller TXCTRL #[4, 1] is represented by STATE_TXCTRL #[4, 1]=[0, 0, 0, 1].

The outputs of transmission controllers 305 (referred to as, for example, time-Doppler multiplexed signals) are amplified to defined transmission power and are then radiated into a space from Nt transmit antennas 306 in a transmit array antenna section. In other words, phase rotation amounts corresponding to Doppler shift amounts are applied to radar transmission signals, which are then time-multiplexed and transmitted from plural transmit antennas 306.

In the following, transmit antenna 306 that radiates the output of transmission controller TXCTRL #[ndop_td(ndm), ndm] into a space is represented by "transmit antenna Tx #[ndop_td(ndm), ndm]". Here, ndm=1, . . . , $N_{DM}$, and ndop_code(ndm)=1, . . . , $N_{DOP\_CODE}$(ndm).

For example, in a case where the number of transmit antennas used for multiplexing transmission Nt=3, the number of Doppler multiplexes $N_{DM}$=2, $N_{TD}$=2, and numbers of time-Doppler multiplexes are set such that $N_{DOP\_TD}$(1)=1 and $N_{DOP\_TD}$(2)=2, time-multiplexed Doppler phase rotation amounts $\psi_{1,1}(m)$, $\psi_{1,2}(m)$, and $\psi_{2,2}(m)$ are output from time multiplexer 303 to phase rotators 304 for every transmission period.

For example, phase rotator PROT #[1, 1] applies, for each transmission period, phase rotation amount $\psi_{1,1}(m)$ to a chirp signal generated in radar transmission signal generator 101 for each transmission period. The output of phase rotator PROT #[1, 1] is output in a manner given by following expression 103 based on transmission controller response STATE_TXCTRL #[1, 1]=[1,1] for transmission controller TXCTRL #[1, 1], and is transmitted from transmit antenna Tx #[1, 1]. Here, cp(t) denotes a chirp signal for each transmission period.

$$\exp[j\psi_{1,1}(1)]cp(t), \exp[j\psi_{1,1}(2)]cp(t), \exp[j\psi_{1,1}(3)]cp(t), \ldots, \exp[j\psi_{1,1}(Nc)]cp(t) \quad \text{(Expression 103)}$$

Likewise, phase rotator PROT #[1, 2] applies, for each transmission period, phase rotation amount $\psi_{1,2}(m)$ to a chirp signal generated in radar transmission signal generator 101 for each transmission period. The output of phase rotator PROT #[1, 2] is output in a manner given by following expression 104 based on transmission controller response STATE_TXCTRL #[1, 2]=[1,0] for transmission controller TXCTRL #[1, 2], and is transmitted from transmit antenna Tx #[1, 2].

$$\exp[j\psi_{1,2}(1)]cp(t), 0, \exp[j\psi_{1,2}(3)]cp(t), 0, \ldots, \exp[j\psi_{1,2}(Nc-1)]cp(t), 0 \quad \text{(Expression 104)}$$

Likewise, phase rotator PROT #[2, 2] applies, for each transmission period, phase rotation amount $\psi_{2,2}(m)$ to a chirp signal generated in radar transmission signal generator 101 for each transmission period. The output of phase rotator PROT #[2, 2] is output in a manner given by following expression 105 based on transmission controller response STATE_TXCTRL #[2, 2]=[0,1] for transmission controller TXCTRL #[2, 2], and is transmitted from transmit antenna Tx #[2, 2].

$$0, \exp[j\psi_{2,2}(2)]cp(t), 0, \exp[j\psi_{2,2}(4)]cp(t), \ldots, 0, \exp[i\psi_{2,2}(Nc)]cp(t) \quad \text{(Expression 105)}$$

The foregoing description has been given of an example of how time-multiplexed Doppler phase rotation amount $\psi_{ndop\_td(ndm),\ ndm}(m)$ is set.

In this embodiment, accordingly, plural transmit antennas 306 are associated with combinations (in other words, assignment) of Doppler shift amounts $DOP_{ndm}$ and transmission durations for time multiplexing (for example, TD_INDEX) such that in each of the combinations, at least one of Doppler shift amount $DOP_{ndm}$ or the transmission duration for time multiplexing (for example, TD_INDEX) is different. In this embodiment, furthermore, the number of time multiplexes (in other words, the number of time-Doppler multiplexes $N_{DOP\_TD}(ndm)$) corresponding to each Doppler shift amount $DOP_{ndm}$ in combinations of Doppler shift amounts $DOP_{ndm}$ and transmission durations is different.

For example, in this embodiment, Nt transmit antennas 306 include at least plural transmit antennas 306 from which transmission signals that are time-multiplexed are transmitted, and at least one transmit antenna 306 from which a transmission signal that is not time-multiplexed is transmitted. In other words, radar transmission signals transmitted from radar transmitter 300 include at least a time-Doppler multiplexed signal for which the number of time-Doppler multiplexes $N_{DOP\_TD}(ndm)$ is set to the number of time multiplexes $N_{TD}$, and a time-Doppler multiplexed signal for which the number of time-Doppler multiplexes $N_{DOP\_TD}(ndm)$ is set to be smaller than the number of codes $N_{TD}$.

[Configuration of Radar Receiver 400]

In FIG. 24, output switching section 401 in the z-th signal processor 206 selectively switches and outputs the output of beat frequency analyzer 208 for each transmission period to the TD_INDEX-th Doppler analyzer 402 among $N_{TD}$ Doppler analyzers 402, based on time multiplexing index TD_INDEX output from time multiplexer 303 in phase rotation amount setter 301. In other words, output switching section 401 selects the TD_INDEX-th Doppler analyzer 402 in the m-th transmission period Tr.

The z-th signal processor 206 includes $N_{TD}$ Doppler analyzers 402-1 to 402-$N_{TD}$. For example, data is input to the ntd-th Doppler analyzer 402 in the z-th signal processor 206 for every $N_{TD}$ transmission periods ($N_{TD} \times Tr$) by using output switching section 401. Accordingly, the ntd-th Doppler analyzer 402 performs Doppler analysis for each distance index $f_b$ using data of Ntdslot transmission periods among Nc transmission periods. Here, ntd denotes the index for time multiplexing, and ntd=1, . . . , $N_{TD}$.

For example, when Ntdslot is a power of 2, FFT processing is applicable in Doppler analysis. In this case, the FFT size is Ntdslot, and a maximum Doppler frequency without causing aliasing derived from the sampling theorem is $\pm 1/(2N_{TD} \times Tr)$. Further, the Doppler frequency interval for Doppler frequency index $f_s$ is $1/(Ntdslot \times N_{TD} \times Tr)$, and the range of Doppler frequency index $f_s$ is given by $f_s=-Ntdslot/2, \ldots, 0, \ldots, Ntdslot/2-1$.

The following description will be given of a case where Ntdslot is a power of 2, as an example. When Ntdslot is not a power of 2, for example, data with zero padding can be used to perform FFT processing with a number of data sizes (FFT sizes) equal to a power of 2. In the FFT processing, Doppler analyzer 402 may perform multiplication by a window function coefficient such as of the Han window or the Hamming window. The application of a window function can suppress sidelobes around the beat frequency peak.

For example, output $VFT_z^{nkl}(f_b, f_s)$ of Doppler analyzers 402 in the z-th signal processor 206 is given by following equation 106, where j is the imaginary unit and z=1 to Na.

[123]

(Equation 106)

$$VFT_z^{ntd}(f_b, f_s) = \sum_{s=0}^{N_{tdslot}-1} RFT_z(f_b, N_{TD} \times s + ntd) \exp\left[-j\frac{2\pi s f_s}{N_{tdslot}}\right]$$

In FIG. 24, CFAR section 403 performs CFAR processing (in other words, adaptive threshold determination) using the outputs of $N_{TD}$ Doppler analyzers 402 in each of the first to Na-th signal processors 206 and extracts distance index $f_{b\_cfar}$ and Doppler frequency index $f_{s\_cfar}$ that provide a peak signal.

For example, CFAR section 403 performs two-dimensional CFAR processing with the distance axis and the Doppler frequency axis (corresponding to the relative velocity) or CFAR processing that is a combination of one-dimensional CFAR processing operations by power addition of outputs $VFT_z^{nkl}(f_b, f_s)$ of Doppler analyzers 402 in the first to Na-th signal processors 206, for example, as given by following equation 107. As the two-dimensional CFAR processing or the CFAR processing that is a combination of one-dimensional CFAR processing operations, for example, processing disclosed in NPL 2 may be applied.

[124]

(Equation 107)

$$\text{Power } FT(f_b, f_s) = \sum_{z=1}^{N_a} \sum_{ntd=1}^{N_{TD}} |VFT_z^{ntd}(f_b, f_s)|^2$$

CFAR section 403 adaptively sets a threshold and outputs distance index $f_{b\_cfar}$ that provides received power greater than the threshold, Doppler frequency index $f_{s\_cfar}$, and received-power information $PowerFT(f_{b\_cfar}, f_{s\_cfar})$ to time-Doppler demultiplexer 404.

For example, when phase rotation amount (ndm for applying Doppler shift amount $DOP_{ndm}$ is determined using equation 1, intervals $\Delta FD$ of Doppler shift amounts in the Doppler frequency domain, which are output from Doppler analyzers 402, are equal, where $\Delta FD=Ntdslot/N_{DM}$. Accordingly, in the outputs of Doppler analyzers 402, peaks are detected at intervals of $\Delta FD$ for Doppler-shift multiplexed signals in the Doppler frequency domain. When phase rotation amount $\phi_{ndm}$ is determined using equation 1, $\Delta FD$ may not sometimes be an integer depending on Ntdslot and $N_{DM}$. In this case, following equation 108 may be used to achieve $\Delta FD$ having an integer value. The following describes a reception processing operation using $\Delta FD$ having an integer value.

[125]

(Equation 108)

$$\phi_{ndm} = \frac{2\pi}{N_{tdslot}} \text{round}\left(\frac{N_{tdslot}}{N_{DM}}\right)(ndm-1)$$

Further, CFAR section 403 may divide the respective outputs of Doppler analyzers 402 into ranges at Doppler shift amount intervals $\Delta FD$ and perform CFAR processing (for example, Doppler domain compression CFAR processing) after, as given by following equation 109, providing power addition (for example, Doppler domain compression) for the respective ranges while matching peak positions of Doppler-shift multiplexed signals. Here, $f_{s\_comp}=-Ntdslot/2, \ldots, -Ntdslot/2+\Delta FD-1$.

[126]

(Equation 109)

$$\text{Power FT\_comp}(f_b, f_{s\_comp}) = \sum_{nfd=1}^{N_{DM}} \text{Power } FT(f_b, f_{s\_comp} + (nfd-1) \times \Delta FD)$$

This can compress the Doppler frequency range for the CFAR processing to $1/N_{DM}$ to reduce the amount of CFAR processing and can simplify the circuit configuration. In addition, CFAR section 403 enables power addition for $N_{DM}$ Doppler-shift multiplexed signals, resulting in SNR being improved by about $(N_{DM})^{1/2}$. As a result, the radar sensing performance of radar apparatus 20 can be improved.

As described above, for example, CFAR section 403, which uses Doppler domain compression CFAR processing, adaptively sets a threshold and outputs distance index $f_{b\_cfar}$ that provides received power greater than the threshold, Doppler frequency index $f_{s\_comp\_cfar}$, and received-power information PowerFT($f_{b\_cfar}$, $f_{s\_comp\_cfar}$+(nfd−1)×ΔFD) for Doppler frequency indices ($f_{s\_comp\_cfar}$+(nfd−1)×ΔFD) of $N_{DM}$ Doppler multiplexed signals, where nfd=1, . . . , $N_{DM}$, to time-Doppler demultiplexer 404.

Note that phase rotation amount $\phi_{ndm}$ for applying Doppler shift amount $DOP_{ndm}$ is not limited to that given in equation 1. CFAR section 403 can apply Doppler domain compression CFAR processing, for example, if Doppler-shift multiplexed signals have phase rotation amounts $\phi_{ndm}$ such that peaks are detected at constant intervals in the Doppler frequency domain output from Doppler analyzers 402.

Next, an example of the operation of time-Doppler demultiplexer 404 illustrated in FIG. 24 will be described. The following describes an example of processing performed by time-Doppler demultiplexer 404 when CFAR section 403 uses Doppler domain compression CFAR processing.

Time-Doppler demultiplexer 404 separates signals transmitted in a time-Doppler multiplexed manner, using the output of Doppler analyzer 402, based on the outputs of CFAR section 403, namely, distance index $f_{b\_cfar}$, Doppler frequency index $f_{s\_comp\_cfar}$, and received-power information PowerFT($f_{b\_cfar}$, $f_{s\_comp\_cfar}$+(nfd−1)×ΔFD) for Doppler frequency indices ($f_{s\_comp\_cfar}$+(nfd−1)×ΔFD) of $N_{DM}$ Doppler multiplexed signals, where nfd=1, . . . , $N_{DM}$, and performs discrimination of transmit antennas 306 and discrimination of Doppler frequencies (or Doppler velocities or relative velocities).

As described above, for example, time multiplexer 303 in phase rotation amount setter 301 does not set all of $N_{DM}$ numbers of time-Doppler multiplexes $N_{DOP\_TD}(1)$, $N_{DOP\_TD}(2)$, . . . , and $N_{DOP\_TD}(N_{DM})$ to $N_{TD}$, but sets at least one of the numbers of Doppler multiplexes to 1. For example, time-Doppler demultiplexer 404 detects (1) a Doppler multiplexed signal for which the number of time-Doppler multiplexes is set to 1, and performs (2) discrimination of transmit antennas 306 and discrimination of Doppler frequencies of the target based on the detected Doppler multiplexed signal for which the number of time-Doppler multiplexes is set to 1.

The following describes the processes (1) and (2) described above, which are performed by time-Doppler demultiplexer 404.

<(1) Process of Detecting Time-Doppler Multiplexed Signal for which Number of Time-Doppler Multiplexes is Set to 1>

There are $N_{DM}$ candidate correspondences between $N_{DM}$ time-Doppler multiplexed signals and the outputs of the respective Doppler analyzers 402 for Doppler frequency indices ($f_{s\_comp\_cfar}$), ($f_{s\_comp\_cfar}$+ΔFD), ($f_{s\_comp\_cfar}$+2ΔFD), . . . , and ($f_{s\_comp\_cfar}$+($N_{DM}$−1)ΔFD) of $N_{DM}$ time-Doppler multiplexed signals for distance index $f_{b\_cfar}$ output from CFAR section 403.

For example, if Doppler shift amount $DOP_{ndm}$ set in Doppler shift setter 302 is represented by $DOP_1$< $DOP_2$< . . . <$DOP_{DM-1}$<$DOP_{DM}$, there are $N_{DM}$ candidate correspondences with cyclically shifted elements, as follows, with consideration given to Doppler aliasing. Here, patterns of the candidate correspondences are numbered DopCase=1 to $N_{DM}$.

DopCase=1: {$DOP_1$, $DOP_2$, . . . , $DOP_{DM-1}$, $DOP_{DM}$}
DopCase=2: {$DOP_{DM}$, $DOP_1$, $DOP_2$, . . . , $DOP_{DM-1}$}
. . . ,
DopCase=$N_{DM}$: {$DOP_2$, . . . , $DOP_{DM-1}$, $DOP_{DM}$, $DOP_1$}

For example, DopCase=1 indicates a correspondence among Doppler shift amounts in the initial state (when the relative velocity to the target is zero). For example, more aliasing components are included as the relative velocity of the target increases in a direction in which the distance to the target decreases, and the resulting correspondences are associated with DopCase=2, 3, . . . , $N_{DM}$. In other words, DopCase=$N_{DM}$, $N_{DM}$−1, . . . , 2 is associated as the relative velocity of the target increases in a direction in which the distance to the target increases.

Here, a table indicating the position of $DOP_{ndm}$ counting from the beginning of each DopCase (the position (or order) of $DOP_{ndm}$ in DopCase) can be created in advance, based on the Doppler shift amounts set in Doppler shift setter 302. In the following, DOPposi($DOP_{ndm}$, DopCase) denotes the operator that outputs the position of $DOP_{ndm}$ counting from the beginning of each DopCase. For example, in the above-described example of DopCase, DOPposi($DOP_1$, 1)=1, DOPposi($DOP_1$, 2)=2, DOPposi($DOP_1$, $N_{DM}$)=$N_{DM}$, DOPposi($DOP_2$, 1)=2, DOPposi($DOP_2$, 2)=3, and DOPposi($DOP_2$, $N_{DM}$)=1.

Time-Doppler demultiplexer 404 performs a detection process on, for example, the outputs of Doppler analyzers 402 in the z-th signal processor 206 indicated by Doppler frequency indices ($f_{s\_comp\_cfar}$+(nfd−1)×ΔFD) of $N_{DM}$ time-Doppler multiplexed signals for distance indices $f_{b\_cfar}$ output from CFAR section 403 to detect Doppler multiplexed signals for which the numbers of time-Doppler multiplexes are set to 1.

Here, time-Doppler multiplexed signals for which the numbers of time-Doppler multiplexes are set to 1 are transmitted using the same transmit antenna 306, and time-Doppler multiplexed signals for which the numbers of time-Doppler multiplexes are set to $N_{TD}$ are transmitted using different transmit antennas 306.

Time-Doppler demultiplexer 404 performs coherent addition processing on, for example, the outputs of Doppler analyzers 402 for each time multiplexing index TD_INDEX using DopCase as a parameter, with consideration given to the presence or absence of aliasing. Time-Doppler demultiplexer 404 utilizes, for example, DopCase for which a coherent addition value that realizes maximum power is obtained, as the most likely pattern of Doppler shift amounts to identify transmit antennas.

The detection process may be performed on all of nfd=1, . . . , $N_{DM}$ for all the candidates of DopCase= 1, . . . , $N_{DM}$. Note that the position of, in each DopCase, a Doppler multiplexed signal for which the number of time-Doppler multiplexes is set to 1 is set by Doppler shift setter 302 and is known to radar apparatus 20. Accordingly, time-Doppler demultiplexer 404 performs the following detection process to reduce the operation amount of the separation process.

For example, when a time-Doppler multiplexed signal for which the number of time-Doppler multiplexes is set to 1 is Doppler shift amount $DOP_{ndm1}$, time-Doppler demultiplexer 404 performs coherent addition processing on the outputs of Doppler analyzers 402 using candidate $DOPposi(DOP_{ndm1}, DopCase)$ including Doppler shift amount $DOP_{ndm1}$ within each DopCase, with consideration given to the presence or absence of Doppler aliasing. Then, time-Doppler demultiplexer 404 detects DopCase that realizes maximum power as follows, based on the result of coherent addition processing with consideration given to the presence or absence of Doppler aliasing.

(a) Coherent Addition Processing when Outputs of Doppler Analyzers 402 Contain No Doppler Aliasing Coherent addition signal $ADDCOH_z(f_{b\_cfar}, f_{s\_comp\_cfar} + (DOPposi(DOP_{ndm1}, DopCase)-1) \times \Delta FD)$ given by following equation 110 represents a coherent addition value for the output of Doppler analyzer 402 for distance index $f_{b\_cfar}$ and Doppler frequency index $(f_{s\_comp\_cfar} + (DOPposi(DOP_{ndm1}, DopCase)-1) \times \Delta FD)$ in the z-th signal processor 206.

[127]

$$ADDCOH_z(f_{b\_cfar}, f_{s\_comp\_cfar} + \quad \text{(Equation 110)}$$
$$\{DOPposi(DOP_{ndm1}, DopCase) - 1\} \times \Delta FD) =$$
$$\sum_{ntd=1}^{N_{TD}} \left[ VFT_z^{ntd}(f_{b\_cfar}, f_{s\_comp\_cfar} + \right.$$
$$\{DOPposi(DOP_{ndm1}, DopCase) - 1\} \times \Delta FD) \times \exp$$
$$\left\{ -j\frac{2\pi(f_{s\_comp\_cfar} + (DopCase-1) \times \Delta FD - DOP_1)}{N_{tdslot}} \times \right.$$
$$\left. \left. \frac{ntd-1}{N_{TD}} \right\} \right]$$

In equation 110, in the exp term, since the sampling times for the outputs of Doppler analyzers 402 for each time multiplexing index are shifted, phase correction is performed in accordance with Doppler frequency index $(f_{s\_comp\_cfar} + (DopCase-1) \times \Delta FD - DOP_1)$. In equation 110, furthermore, $DopCase=1, \ldots, N_{DM}$. Further, Doppler shift amount $DOP_{ndm}$ set in Doppler shift setter 302 is represented by $DOP_1 < DOP_2 < \ldots < DOP_{DM-1} < DOP_{DM}$, and $DOP_1$ falls within the range of $f_{s\_comp} = -Ncode/2, \ldots, -Ncode/2 + \Delta FD-1$ in the initial state (when the relative velocity to the target is zero). Accordingly, time-Doppler demultiplexer 404 calculates an amount of phase correction using, for example, $DOP_1$ as a reference in equation 110.

When a time-Doppler multiplexed signal for which the number of time-Doppler multiplexes is set to 1 is Doppler shift amount "$DOP_{ndm1}$", for $DopCase=1, \ldots, N_{DM}$, coherent addition signals for candidate $DOPposi(DOP_{ndm1}, DopCase)$ including Doppler shift amount $DOP_{ndm1}$ are obtained using equation 110. Accordingly, time-Doppler demultiplexer 404 obtains the outputs of a total of $N_{DM}$ coherent addition signals. For example, time-Doppler demultiplexer 404 calculates coherent addition signals for all the receive antennas $z=1, \ldots, Na$ in accordance with equation 110 and calculates time separation signal power sum $Pow\_ADDCOH(f_{b\_cfar}, f_{s\_comp\_cfar} + (DOPposi(DOP_{ndm1}, DopCase)-1) \times \Delta FD)$, as given by following equation 111.

[128]

$$Pow\_ADDCOH(f_{b\_cfar}, \quad \text{(Equation 111)}$$
$$f_{s\_comp\_cfar} + \{DOPposi(DOP_{ndm1}, DOPCase) - 1\} \times$$
$$\Delta FD) = \sum_{z=1}^{Na} |ADDCOH_z(f_{b\_cfa}, f_{s\_comp\_cfar} +$$
$$\{DOPposi(DOP_{ndm1}, DOPCase) - 1\} \times \Delta FD)|^2$$

(b) Coherent Addition Processing when Outputs of Doppler Analyzers 402 Contain Doppler Aliasing If the outputs of Doppler analyzers 402 contain Doppler aliasing, time-Doppler demultiplexer 404 performs coherent addition processing using phase correction (the exp term) used in the coherent addition processing as phase correction with consideration given to Doppler aliasing.

For example, in a case where $N_{TD}=2$, coherent addition signal $ADDALIAS_z(f_{b\_cfar}, f_{s\_comp\_cfar} + (DOPposi(DOP_{ndm1}, DopCase)-1) \times \Delta FD)$ given by following equation 112 represents a coherent addition value with consideration given to Doppler aliasing for the output of Doppler analyzer 402 for distance index $f_{b\_cfar}$ and Doppler frequency index $(f_{s\_comp\_cfar} + (DOPposi(DOP_{ndm1}, DopCase)-1) \times \Delta FD)$ in the z-th signal processor 206.

[129]

$$ADDALIAS_z(f_{b\_cfar}, f_{s\_comp\_cfar} + \quad \text{(Equation 112)}$$
$$\{DOPposi(DOP_{ndm1}, DOPCase) - 1\} \times$$
$$\Delta FD) = \sum_{ntd=1}^{N_{TD}} \left[ VFT_z^{ntd}(f_{b\_cfar}, f_{s\_comp\_cfar} + \right.$$
$$\{DOPposi(DOP_{ndm1}, DOPCase) - 1\} \times \Delta FD) \times$$
$$\exp\left\{ -j\frac{2\pi(f_{s\_comp\_cfar} + \{DOPCase-1\} \times \Delta FD - DOP_1)}{N_{tdslot}} \times \right.$$
$$\left. \left. \frac{ntd-1}{N_{TD}} \right\} \times \exp\left\{ -j\frac{2\pi(ntd-1)}{N_{TD}} \right\} \right]$$

In equation 112, in the exp term, since the sampling times for the outputs of Doppler analyzers 402 for each time multiplexing index are shifted, phase correction is performed in accordance with Doppler frequency index $(f_{s\_comp\_cfar} + (DopCase-1) \times \Delta FD - DOP_1)$ and phase correction $(\exp\{-j2\pi(ntd-1)/N_{TD}\})$ to address aliasing is performed. In equation 112, furthermore, $DopCase=1, \ldots,$ $N_{DM}$. Further, Doppler shift amount $DOP_{ndm}$ set in Doppler shift setter 302 is represented by $DOP_1 < DOP_2 < \ldots < DOP_{DM-1} < DOP_{DM}$, and $DOP_1$ falls within the range of $f_{s\_comp} = -Ncode/2, \ldots, -Ncode/2 + \Delta FD - 1$ in the initial state (when the relative velocity to the target is zero). Accordingly, time-Doppler demultiplexer 404 calculates an amount of phase correction using $DOP_1$ as a reference in equation 112.

When a time-Doppler multiplexed signal for which the number of time-Doppler multiplexes is set to 1 is Doppler shift amount $DOP_{ndm1}$, for DopCase=1, ..., $N_{DM}$, coherent addition signals with consideration given to Doppler aliasing for candidate DOPposi($DOP_{ndm1}$, DopCase) including Doppler shift amount $DOP_{ndm1}$ are obtained using Equation 112. Accordingly, time-Doppler demultiplexer 404 obtains the outputs of a total of $N_{DM}$ coherent addition signals. For example, time-Doppler demultiplexer 404 calculates coherent addition signals for all the receive antennas z=1, ..., Na using equation 112 and calculates coherent addition power sum Pow_ADDALIAS($f_{b\_cfar}$, $f_{s\_comp\_cfar}$+(DOPposi($DOP_{ndm1}$, DopCase)−1)×$\Delta FD$) with consideration given to Doppler aliasing, as given by following equation 113.

[130]

$$\text{Pow\_ADDCOH}(f_{b\_cfar},$$
$$f_{s\_comp\_cfar} + \{DOPposi(DOP_{ndm1}, DOPCase) - 1\} \times$$
$$\Delta FD) = \sum_{z=1}^{Na} |ADDCOH_z(f_{b\_cfar}, f_{s\_comp\_cfar} +$$
$$\{DOPposi(DOP_{ndm1}, DOPCase) - 1\} \times \Delta FD)|^2$$
(Equation 113)

For example, in a case where $N_{TD}=3$, coherent addition signal $ADDALIAS_z(f_{b\_cfar}, f_{s\_comp\_cfar}$+(DOPposi($DOP_{ndm1}$, DopCase)−1)×$\Delta FD$) given by following equations 114 and 115 represents a coherent addition value with consideration given to Doppler aliasing for the output of Doppler analyzer 402 for distance index $f_{b\_cfar}$ and Doppler frequency index ($f_{s\_comp\_cfar}$+(DOPposi($DOP_{ndm1}$, DopCase)−1)×$\Delta FD$) in the z-th signal processor 206.

[131]

$$ADDALIAS_z(f_{b\_cfar},$$
$$f_{s\_comp\_cfar} + \{DOPposi(DOP_{ndm1}, DOPCase) - 1\} \times \Delta FD) =$$
$$\sum_{ntd=1}^{N_{TD}} \left[ VFT_z^{ntd}(f_{b\_cfar}, f_{s\_comp\_cfar} + \{DOPposi(DOP_{ndm1}, DOPCase) - 1\} \times$$
$$\Delta FD) \times \exp\left\{-j\frac{2\pi(f_{est})}{N_{tdslot}} \times \frac{ntd-1}{N_{TD}}\right\} \times \exp\left\{-j\frac{2\pi \text{Sign}(f_{est})(ntd-1)}{N_{TD}}\right\} \right]$$
(Equation 114)

[132]

$$f_{est} = f_{s\_comp\_cfar} + (DOPCase - 1) \times \Delta FD - DOP_1$$
(Equation 115)

In equation 114, in the exp term, since the sampling times for the outputs of Doppler analyzers 402 for each time multiplexing index are shifted, phase correction is performed in accordance with Doppler frequency index ($f_{s\_comp\_cfar}$+(DopCase−1)×$\Delta FD$−$DOP_1$) and phase correction (exp{−j2πSign($f_{est}$)(ntd−1)/$N_{TD}$}) to address aliasing is performed. In equation 114, furthermore, DopCase=1, ..., $N_{DM}$. Further, Doppler shift amount $DOP_{ndm}$ set in Doppler shift setter 302 is represented by $DOP_1 < DOP_2 < \ldots < DOP_{DM-1} < DOP_{DM}$, and $DOP_1$ falls within the range of $f_{s\_comp} = -Ncode/2, \ldots, -Ncode/2 + \Delta FD - 1$ in the initial state (when the relative velocity to the target is zero). Accordingly, time-Doppler demultiplexer 404 calculates an amount of phase correction using $DOP_1$ as a reference in equation 114.

When a time-Doppler multiplexed signal for which the number of time-Doppler multiplexes is set to 1 is Doppler shift amount $DOP_{ndm1}$, for DopCase=1, ..., $N_{DM}$, coherent addition signals with consideration given to Doppler aliasing for candidate DOPposi($DOP_{ndm1}$, DopCase) including Doppler shift amount $DOP_{ndm1}$ are obtained using Equation 114. Accordingly, time-Doppler demultiplexer 404 obtains the outputs of a total of $N_{DM}$ coherent addition signals. For example, time-Doppler demultiplexer 404 calculates coherent addition signals for all the receive antennas z=1, ..., Na using equation 114 and calculates coherent addition power sum Pow_ADDALIAS($f_{b\_cfar}$, $f_{s\_comp\_cfar}$+(DOPposi($DOP_{ndm1}$, DopCase)−1)×$\Delta FD$) with consideration given to Doppler aliasing, as given by following equation 116.

[133]

$$\text{Pow\_ADDCOH}(f_{b\_cfar},$$
$$f_{s\_comp\_cfar} + \{DOPposi(DOP_{ndm1}, DOPCase) - 1\} \times$$
$$\Delta FD) = \sum_{z=1}^{Na} |ADDCOH_z(f_{b\_cfar}, f_{s\_comp\_cfar} +$$
$$\{DOPposi(DOP_{ndm1}, DOPCase) - 1\} \times \Delta FD)|^2$$
(Equation 116)

In a case where $N_{TD}=3$, coherent addition values with consideration also given to multiplexed aliasing determination are calculated.

Also in a case where $N_{TD}>3$, coherent addition value Pow_ADDCOH($f_{b\_cfar}$, $f_{s\_comp\_cfar}$+(DOPposi($DOP_{ndm1}$, DopCase)−1)×$\Delta FD$) and coherent addition value Pow_ADDALIAS($f_{b\_cfar}$, $f_{s\_comp\_cfar}$+(DOPposi($DOP_{ndm1}$, DopCase)−1)×$\Delta FD$) with consideration given to Doppler aliasing are calculated.

As described above, time-Doppler demultiplexer 404 performs coherent addition processing on the outputs of Doppler analyzers 402, with consideration given to the presence or absence of Doppler aliasing.

Time-Doppler demultiplexer 404 detects coherent addition values that provide maximum power for DopCase=1, ..., $N_{DM}$, based on coherent addition value Pow_ADDCOH($f_{b\_cfar}$, $f_{s\_comp\_cfar}$+(DOPposi($DOP_{ndm1}$, DopCase)−1)×$\Delta FD$) and coherent addition value Pow_ADDALIAS($f_{b\_cfar}$, $f_{s\_comp\_cfar}$+(DOPposi($DOP_{ndm1}$, DopCase)−1)×$\Delta FD$) with consideration given to Doppler aliasing. In the following, the index number of DopCase that provides a coherent addition value that realizes maximum power is represented by "DopCase_max".

For example, when coherent addition value Pow_ADD-COH($f_{b\_cfar}$, $f_{s\_comp\_cfar}$+(DOPposi(DOP$_{ndm1}$, DopCase_max)−1)×ΔFD) indicates maximum power, time-Doppler demultiplexer 404 determines "absence of aliasing".

For example, when coherent addition value Pow_ADDA-LIAS($f_{b\_cfar}$, $f_{s\_comp\_cfar}$+(DOPposi(DOP$_{ndm1}$, DopCase_max)−1)×ΔFD) with consideration given to Doppler aliasing indicates maximum power, time-Doppler demultiplexer 404 determines "presence of aliasing".

A reduction in the SNR of a reception signal that is a reflected wave may make it difficult to discriminate detection of the maximum coherent addition power level due to the influence of noise. To address this difficulty, time-Doppler demultiplexer 404 may introduce a determination condition and perform a process of, for example, adopting a determination result (in other words, detection result) when the determination condition is satisfied and removing (in other words, not adopting) a determination result when the determination condition is not satisfied. This can reduce the probability of erroneous detection of the noise component and the like. For example, time-Doppler demultiplexer 404 may adopt, as a determination result, detection value $P_M$ax of received power having maximum coherent addition value indicating the presence or absence of Doppler aliasing when satisfying $P_{MAX}$>$LEV_{DETECT}$×PowerFT($f_{b\_cfar}$, $f_{s\_comp\_cfar}$). $LEV_{DETECT}$ is a determination threshold. $LEV_{DETECT}$ is a real number satisfying 0<$LEV_{DETECT}$<1.

<(2) Process for Discrimination of Transmit Antennas 306 and Discrimination of Doppler Frequencies of Target>

For example, time-Doppler demultiplexer 404 detects Doppler frequency $f_{TARGET}$ of the target in the range of −1/(2×Tr)<$f_{TARGET}$<1/(2×Tr).

For example, time-Doppler demultiplexer 404 discriminates transmit antennas 306 and Doppler frequencies of the target, based on the determination result of DopCase (for example, DopCase_max) and the determination result of the presence or absence of aliasing.

[Case (a): Case without Aliasing]
Doppler Frequency Determination for Target:

Time-Doppler demultiplexer 404 determines that the Doppler frequency index of the target is ($f_{s\_comp\_cfar}$+(DopCase_max−1)×ΔFD−DOP$_1$). For example, the Doppler frequency interval for Doppler frequency index $f_{s\_comp\_cfar}$ is given by 1/(Ntdslot×$N_{TD}$×Tr). Therefore, time-Doppler demultiplexer 404 determines that Doppler frequency $f_{TARGET}$ of the target is ($f_{s\_comp\_cfar}$+(DopCase_max−1)×ΔFD−DOP$_1$)/(Ntdslot×$N_{TD}$×Tr).

Transmit Antenna Determination:

Time-Doppler demultiplexer 404 determines, for transmit antenna 306 with the number of time-Doppler multiplexes being 1, that, for example, coherent addition signal ADD-COH$_z$($f_{b\_cfar}$, $f_{s\_comp\_cfar}$+(DOPposi(DOP$_{ndm1}$, DopCase_max)−1)×ΔFD) for distance index $f_{b\_cfar}$ and Doppler frequency index ($f_{s\_comp\_cfar}$+(DOPposi(DOP$_{ndm1}$, DopCase_max)−1)×ΔFD) in the z-th signal processor 206 is a reception signal for transmit antenna Tx #[1, ndm1].

Further, time-Doppler demultiplexer 404 determines, for transmit antenna 306 with the number of time-Doppler multiplexes being $N_{TD}$, that the output of Doppler analyzer 402 for distance index $f_{b\_cfar}$ and Doppler frequency index ($f_{s\_comp\_cfar}$+(DOPposi(DOP$_{ndm1}$, DopCase_max)−1)×ΔFD) (see, for example, following equations 117 and 118) in the z-th signal processor 206 is a reception signal for transmit antenna Tx #[ntd, ndm]. In equation 117, the exp term is a term for correcting the Doppler phase caused by time multiplexing. Further, ndm=1, . . . , $N_{DM}$, but excluding ndm1. Further, ntd=1, . . . , $N_{TD}$.

[134]

$$VFT_z^{ntd}(f_{b\_cfar}, \quad\quad\quad\quad\quad\text{(Equation 117)}$$
$$f_{s\_comp\_cfar} + \{DOPposi(DOP_{ndm}, DOPCase\_\max) - 1\} \times$$
$$\Delta FD) \times \exp\left\{-j\frac{2\pi(f_{est\_max})}{N_{tdslot}} \times \frac{ntd-1}{N_{TD}}\right\}$$

[135]

$$f_{est\_max} = \quad\quad\quad\quad\quad\text{(Equation 118)}$$
$$f_{s\_comp\_cfar} + (DOPCase\_\max - 1) \times \Delta FD - DOP_1$$

[Case (b): Case with Aliasing]
Doppler Frequency Determination for Target:

Time-Doppler demultiplexer 404 determines that the Doppler frequency index of the target is $f_{s\_comp\_cfar}$+(DopCase_max−1)×ΔFD)−DOP$_1$−Ncode×Sign($f_{s\_comp\_cfar}$+(DopCase_max−1)×ΔFD−DOP$_1$). For example, the Doppler frequency interval for Doppler frequency index $f_{s\_comp\_cfar}$ is given by 1/(Ntdslot×$N_{TD}$×Tr). Therefore, time-Doppler demultiplexer 404 determines that Doppler frequency $f_{TARGET}$ of the target is ($f_{s\_comp\_cfar}$+(DopCase_max−1)×ΔFD−DOP$_1$−Ntdslot×Sign($f_{s\_comp\_cfar}$+(DopCase_max−1)×ΔFD−DOP$_1$))/(Ntdslot×$N_{TD}$×Tr). Sign(x) is a sign function and is a function for real numbers x, providing as output 1 when x>0, 0 when x=0, and −1 when x<0.

In this manner, when the outputs of Doppler analyzers 402 contain Doppler aliasing, time-Doppler demultiplexer 404 determines a Doppler frequency of the target, with consideration given to the aliasing component (for example, Ntdslot×Sign($f_{s\_comp\_cfar}$+(DopCase_max−1)×ΔFD−DOP$_1$)).

Transmit Antenna Determination:

Time-Doppler demultiplexer 404 determines, for transmit antenna 306 with the number of time-Doppler multiplexes being 1, that, for example, coherent addition signal ADDA-LIAS$_z$($f_{b\_cfar}$, $f_{s\_comp\_cfar}$+(DOPposi(DOP$_{ndm1}$, DopCase_max)−1)×ΔFD) with consideration given to aliasing for distance index $f_{b\_cfar}$ and Doppler frequency index ($f_{s\_comp\_cfar}$+(DOPposi(DOP$_{ndm1}$, DopCase_max)−1)×ΔFD) in the z-th signal processor 206 is a reception signal for transmit antenna Tx #[1, ndm1].

Further, time-Doppler demultiplexer 404 determines, for transmit antenna 306 with the number of time-Doppler multiplexes being $N_{TD}$, that, for example, the output of Doppler analyzer 402 for distance index $f_{b\_cfar}$ and Doppler frequency index ($f_{s\_comp\_cfar}$+(DOPposi(DOP$_{ndm}$, DopCase_max)−1)×ΔFD) (see, for example, following equations 119 and 120) in the z-th signal processor 206 is a reception signal for transmit antenna Tx #[ntd, ndm]. In equation 119, the exp term is a term for correcting the Doppler phase caused by time multiplexing. Further, ndm=1, . . . , $N_{DM}$, but excluding ndm1. Further, ntd=1, . . . , $N_{TD}$.

[136]

$$VFT_z^{ntd}(f_{b\_cfar}, \quad\quad\quad\quad\quad\text{(Equation 119)}$$
$$f_{s\_comp\_cfar} + \{DOPposi(DOP_{ndm}, DOPCase\_\max) - 1\} \times$$
$$\Delta FD) \times \exp\left\{-j\frac{2\pi(f_{est\_max})}{N_{tdslot}} \times \frac{ntd-1}{N_{TD}}\right\} \times$$
$$\exp\left\{-j\frac{2\pi \text{Sign}(f_{est\_max})(ntd-1)}{N_{TD}}\right\}$$

-continued

[137]

$$f_{est\_max} = f_{s\_comp\_cfar} + (DOPCase\_\max - 1) \times \Delta FD - DOP_1 \quad \text{(Equation 120)}$$

As described above, radar apparatus 20 does not set all of $N_{DM}$ numbers of time-Doppler multiplexes $N_{DOP\_TD}(1)$, $N_{DOP\_TD}(2)$, . . . , and $N_{DOP\_TD}(N_{DM})$ to $N_{TD}$, but sets at least one of the numbers of time-Doppler multiplexes to 1 (in other words, no time multiplexing). With this setting, for example, a time-Doppler multiplexed signal for which the number of time-Doppler multiplexes is set to $N_{TD}$ is transmitted at a set transmission timing (for example, timing of transmission on), whereas a time-Doppler multiplexed signal for which the number of time-Doppler multiplexes is set to 1 is transmitted for each transmission period, for example. Therefore, a reception signal of a time-Doppler multiplexed signal for which the number of time-Doppler multiplexes is set to 1 has a maximum value for a coherent addition value with consideration given to the presence or absence of Doppler aliasing. Time-Doppler demultiplexer 404 can utilize this characteristic to discriminate transmit antennas 306 and to determine a Doppler frequency of the target including the presence or absence of aliasing.

Accordingly, in this embodiment, the range over which a Doppler frequency is detectable without ambiguity can be extended to the range greater than or equal to −1/(2Tr) and less than 1/(2Tr). For example, when a single antenna is used for transmission, the range over which a Doppler frequency is detectable without ambiguity is the range greater than or equal to −1/(2Tr) and less than 1/(2Tr). In this embodiment, therefore, even when plural transmit antennas 306 are used, radar apparatus 20 can detect a Doppler frequency without ambiguity in a manner similar to that when a single antenna is used for transmission.

The foregoing description has been given of an example of the operation of time-Doppler demultiplexer 404.

In FIG. 24, direction estimator 405 performs a direction estimation process for the target based on the Doppler frequency determination result for the target input from time-Doppler demultiplexer 404, the transmit antenna determination result (determination result of Doppler aliasing), the output of Doppler analyzer 402 for distance index $f_{b\_cfar}$ and Doppler frequency index ($f_{s\_comp\_cfar}$+(DOPposi(DOP$_{ndm}$, DopCase_max)−1)×ΔFD), and a coherent addition value that is a maximum value.

For example, direction estimator 405 generates virtual receive array correlation vector h($f_{b\_cfar}$, $f_{s\_comp\_cfar}$), based on the Doppler frequency determination result for the target and the transmit antenna determination result, and performs a direction estimation process.

As described above, in this embodiment, radar apparatus 20 applies phase rotation amounts corresponding to Doppler shift amounts to radar transmission signals and time-multiplexes radar transmission signals (for example, Doppler multiplexed signals) to transmit radar transmission signals (for example, time-Doppler multiplexed signals) from plural transmit antennas 108 in a multiplexed manner. In this embodiment, plural transmit antennas 108 are associated with combinations of Doppler shift amounts (DOP$_{ndm}$) and transmission durations for time multiplexing (for example, transmission timings) such that in each of the combinations, at least one of Doppler shift amount (DOP$_{ndm}$) or the transmission duration for time multiplexing (for example, transmission timing) is different. In this embodiment, furthermore, the number of time multiplexes corresponding to each Doppler shift amount in combinations of Doppler shift amounts and transmission durations for time multiplexing is different. In other words, the numbers of time multiplexes for the respective Doppler-multiplexed transmission signals are set to be non-uniform.

Radar apparatus 20 can determine, based on, for example, a reception signal of each time-Doppler multiplexed signal (for example, coherent addition signal), transmit antenna 306 associated with the time-Doppler multiplexed signal (in other words, the combination of Doppler shift amount and transmission duration) and the presence or absence of Doppler aliasing (for example, DopCase and the like). This enables radar apparatus 20 to appropriately determine a Doppler frequency of the target even in the presence of Doppler aliasing.

According to this embodiment, therefore, radar apparatus 20 can extend the effective Doppler frequency bandwidth to 1/(Tr) and can extend the Doppler frequency (relative velocity) detection range with no ambiguity. Accordingly, radar apparatus 20 can improve target-object sensing accuracy over a wider Doppler frequency range.

In this embodiment, furthermore, time-Doppler multiplexing, which is performed using both Doppler multiplexing and time multiplexing, can reduce the number of Doppler multiplexes compared with the use of only Doppler multiplexing in multiplexing transmission. This can increase the intervals of phase rotation amounts for applying Doppler shifts, thereby, for example, relieving the accuracy requirements (phase modulation accuracy) for the phase shifters and achieving the cost reduction effect of an RF section, including reduction of the man-hours required for the adjustment of the phase shifters.

In this embodiment, furthermore, since time-Doppler multiplexing is performed using both Doppler multiplexing and time multiplexing, radar apparatus 20 performs, for each time multiplexing index, Fourier frequency analysis (FFT processing) to detect the Doppler frequency (detect the relative velocity). Accordingly, for example, compared with Fourier frequency analysis (FFT processing) to detect the Doppler frequency (detect the relative velocity) using only Doppler multiplexing in multiplexing transmission, the FFT size is (1/number of time multiplexes $N_{TD}$) and the number of FFTs is increased by (the number of time multiplexes $N_{TD}$) times. According to this embodiment, therefore, the operation reduction effect of FFT processing can be achieved, and the effect of simplification of the circuit configuration and cost reduction can also be achieved.

The foregoing description has been given of an exemplary embodiment of the present disclosure.

Other Embodiments

For example, Embodiment 1 has described the case where in an example in which the number of code multiplexes is set to be smaller than $N_{CM}$, the number of coded Doppler multiplexes is 1 (in other words, no code multiplexing). However, in an exemplary embodiment of the present disclosure, for example, when the number of coded Doppler multiplexes is set to be smaller than $N_{CM}$, the number of coded Doppler multiplexes may be set to be greater than or equal to 2.

In a radar apparatus according to an exemplary embodiment of the present disclosure, a radar transmitter and a radar receiver may be individually arranged in physically separate locations. In a radar receiver according to an exemplary embodiment of the present disclosure, a direction estimator and any other component may be individually arranged in physically separate locations.

Further, in an exemplary embodiment of the present disclosure, the values used (such as the number Nt of transmit antennas, the number Na of receive antennas, the number of Doppler multiplexes $N_{DM}$, the number of codes $N_{CM}$, and the number of time multiplexes $N_{TD}$) are examples, and these values are not restrictive.

A radar apparatus according to an exemplary embodiment of the present disclosure includes, for example, a central processing unit (CPU), a storage medium such as a read only memory (ROM) that stores a control program, and a work memory such as a random access memory (RAM), which are not illustrated. In this case, the functions of the sections described above are implemented by the CPU executing the control program. However, the hardware configuration of the radar apparatus is not limited to that in this example. For example, the functional sections of the radar apparatus may be implemented as an integrated circuit (IC). Each functional section may be formed as an individual chip, or some or all of them may be formed into a single chip. In the foregoing description, the term "section" used to indicate each constituent element may be interchangeably referred to as any other term such as "circuit (circuitry)", "device", "unit", or "module".

Various embodiments have been described with reference to the drawings hereinabove. Obviously, the present disclosure is not limited to these examples. Obviously, a person skilled in the art would arrive variations and modification examples within a scope described in claims, and it is understood that these variations and modifications are within the technical scope of the present disclosure. Each constituent element of the above-mentioned embodiments may be combined optionally without departing from the spirit of the disclosure.

The above embodiments have been described with an example of a configuration using hardware, but the present disclosure can be realized by software in cooperation with hardware.

Each functional block used in the description of each embodiment described above is typically realized by an LSI, which is an integrated circuit. The integrated circuit controls each functional block used in the description of the above embodiments and may include an input terminal and an output terminal. The LSI may be individually formed as chips, or one chip may be formed so as to include a part or all of the functional blocks. The LSI herein may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used.

If future integrated circuit technology replaces LSIs as a result of the advancement of semiconductor technology or other derivative technology, the functional blocks could be integrated using the future integrated circuit technology. Biotechnology can also be applied.

SUMMARY OF THE DISCLOSURE

A radar apparatus according to an exemplary embodiment of the present disclosure includes a plurality of transmit antennas that transmit a plurality of transmission signals using a multiplexing transmission, and a transmission circuit that applies phase rotation amounts corresponding to combinations of Doppler shift amounts and code sequences to the plurality of transmission signals, wherein each of the combinations of the Doppler shift amounts and the code sequences has at least one different from other combination, and wherein the number of multiplexes of the code sequence corresponding to at least one of the Doppler shift amounts in the combinations is different from the number of multiplexing of code sequences corresponding to the remaining Doppler shift amount.

In an exemplary embodiment of the present disclosure, the number of phases used for phase rotation amounts for applying the Doppler shift amounts is smaller than the number of the plurality of transmit antennas.

In an exemplary embodiment of the present disclosure, intervals of phase rotation amounts for applying the Doppler shift amounts are equal.

In an exemplary embodiment of the present disclosure, the number of phases used for phase rotation amounts for applying the Doppler shift amounts is equal to the number of the Doppler shift amounts that are used for the multiplexing transmission.

In an exemplary embodiment of the present disclosure, the radar apparatus further includes a plurality of receive antennas that receive reflected wave signals, the reflected wave signals being the plurality of transmission signals reflected from a target, and reception circuit that determines a transmit antenna corresponding to each of the reflected wave signals among the plurality of transmit antennas and determines whether the reflected wave signal contains aliasing in a Doppler frequency domain, based on a signal subjected to code separation for the reflected wave signal using a corresponding one of the code sequences.

In an exemplary embodiment of the present disclosure, the transmit antennas have a sub-array configuration.

In an exemplary embodiment of the present disclosure, the transmission circuit sets intervals of the Doppler shift amounts to vary for each of frames in which the plurality of transmission signals are transmitted.

In an exemplary embodiment of the present disclosure, the transmission circuit sets transmission periods of the plurality of transmission signals to vary for each of frames in which the plurality of transmission signals are transmitted.

In an exemplary embodiment of the present disclosure, the transmission circuit multiplies each of the plurality of transmission signals by a pseudo-random code sequence.

In an exemplary embodiment of the present disclosure, the transmission circuit sets an association between each of the plurality of transmit antennas and one of the combinations of the Doppler shift amounts and the code sequences to vary for each of frames in which the plurality of transmission signals are transmitted.

In an exemplary embodiment of the present disclosure, the transmission circuit sets an association between each of the plurality of transmit antennas and one of the Doppler shift amounts to vary for each of transmission periods of the plurality of transmission signals.

In an exemplary embodiment of the present disclosure, a radar apparatus includes a plurality of transmit antennas that transmit transmission signals, and a transmission circuit that applies phase rotation amounts to the transmission signals to perform multiplexing transmission to transmit the transmission signals from the plurality of transmit antennas in a multiplexed manner, wherein the number of phases used for the phase rotation amounts is smaller than the number of the plurality of transmit antennas.

In an exemplary embodiment of the present disclosure, the number of the plurality of transmit antennas is any of 3, 6, and 7.

In an exemplary embodiment of the present disclosure, a radar apparatus includes a plurality of transmit antennas that transmit transmission signals, and a transmission circuit that applies phase rotation amounts corresponding to Doppler shift amounts to the transmission signals and time-multiplexes the transmission signals to perform multiplexing transmission to transmit the transmission signals from the plurality of transmit antennas in a multiplexed manner, wherein the plurality of transmit antennas are associated with combinations of the Doppler shift amounts and transmission durations for the time multiplexing such that in each of the combinations, at least one of the Doppler shift amount or the transmission duration for the time multiplexing is different, and the number of multiplexes for the time multiplexing corresponding to each of the Doppler shift amounts in the combinations is different.

In an exemplary embodiment of the present disclosure, the number of phases used for phase rotation amounts for applying the Doppler shift amounts is equal to the number of the Doppler shift amounts that are used for the multiplexing transmission.

In an exemplary embodiment of the present disclosure, intervals of phase rotation amounts for applying the Doppler shift amounts are equal.

A radar apparatus according to an exemplary embodiment of the present disclosure includes a plurality of transmit antennas that transmit transmission signals, and a transmission circuit that applies phase rotation amounts corresponding to Doppler shift amounts and code sequences to the transmission signals to perform multiplexing transmission to transmit the transmission signals from the plurality of transmit antennas in a multiplexed manner, wherein each of the transmission signals is a chirp signal, and a center frequency of the chirp signal is changed for each of transmission periods of the transmission signals or each of transmission periods of the code sequences.

A radar apparatus according to an exemplary embodiment of the present disclosure includes a plurality of transmit antennas that transmit transmission signals, and a transmission circuit that applies phase rotation amounts corresponding to Doppler shift amounts and code sequences to the transmission signals to perform multiplexing transmission to transmit the transmission signals from the plurality of transmit antennas in a multiplexed manner, wherein the transmission signals are chirp signals, and center frequencies of the chirp signals are changed in a round in a period that is a divisor multiple of a code length of each of the code sequences relative to each of transmission periods of the transmission signals.

INDUSTRIAL APPLICABILITY

While various embodiments have been described herein above, it is to be appreciated that various changes in form and detail may be made without departing from the sprit and scope of the invention(s) presently or hereafter claimed.

This application is entitled and claims the benefit of Japanese Patent Application No. 2019-110522, filed on Jun. 13, 2019 and Japanese Patent Application No. 2019-221249, filed on Dec. 6, 2019, the disclosure of which including the specification, drawings and abstract is incorporated herein by reference in its entirety.

The present disclosure is suitable as a radar apparatus for wide-angle range sensing.

REFERENCE SIGNS LIST 10, 10b, 10c, 10d, 20 Radar apparatus
100, 100a, 100b, 100c, 100d, 300 Radar transmitter
101, 101c, 101d Radar transmission signal generator
102 Modulated signal emitter
103, 103c, 103d VCO
104, 104b, 104d, 301 Phase rotation amount setter
105, 302 Doppler shift setter
106, 106d Coder
107, 304 Phase rotator
108, 306 Transmit antenna
109 Beam weight generator
110 Beam weight multiplier
111 Random code applier
112, 112d Transmission frequency controller
200, 200b, 200c, 200d, 400 Radar receiver
201 Antenna channel processor
202 Receive antenna
203 Receiving radio section
204 Mixer section
205 LPF
206, 206b Signal processor
207 AD converter
208 Beat frequency analyzer
209, 401 Output switching section
210, 402 Doppler analyzer
211, 403 CFAR section
212, 212d Coded Doppler demultiplexer
213, 213c, 213d, 405 Direction estimator
214 Random code multiplier
303 Time multiplexer
305 Transmission controller
404 Time-Doppler demultiplexer

What is claimed is:

1. A radar apparatus, comprising:
a plurality of transmit antennas which, in operation, transmits a plurality of transmission signals using a multiplexing transmission; and
a transmission circuit which, in operation, applies phase rotation amounts corresponding to combinations of Doppler shift amounts and code sequences to the plurality of transmission signals,
wherein each of the plurality of transmission signals is assigned a different combination among the combinations, and
wherein the combinations include at least two combinations of a same number of multiplexing by the code sequences.

2. The radar apparatus according to claim 1, wherein all of the combinations have the same number of multiplexing by the code sequences.

3. The radar apparatus according to claim 1, wherein a number of phases used for the phase rotation amounts for applying the Doppler shift amounts is smaller than a number of the plurality of transmit antennas.

4. The radar apparatus according to claim 1, wherein intervals of phase rotation amounts for applying the Doppler shift amounts are equal.

5. The radar apparatus according to claim 1, wherein a number of phases used for the phase rotation amounts for applying the Doppler shift amounts is equal to a number of the Doppler shift amounts that are used for the multiplexing transmission.

6. The radar apparatus according to claim 1, further comprising:
- a plurality of receive antennas which, in operation, receives reflected wave signals, the reflected wave signals being the plurality of transmission signals reflected from a target; and
- a reception circuit which, in operation, determines a transmit antenna corresponding to each of the reflected wave signals among the plurality of transmit antennas and determines whether a reflected wave signal contains aliasing in a Doppler frequency domain, based on a signal subjected to code separation for the reflected wave signal using a corresponding one of the code sequences.

7. The radar apparatus according to claim 1, wherein the plurality of transmit antennas has a sub-array configuration.

8. The radar apparatus according to claim 1, wherein the transmission circuit, in operation, sets intervals of the Doppler shift amounts to vary for each of frames in which the plurality of transmission signals is transmitted.

9. The radar apparatus according to claim 1, wherein the transmission circuit, in operation, sets transmission periods of the plurality of transmission signals to vary for each of frames in which the plurality of transmission signals is transmitted.

10. The radar apparatus according to claim 1, wherein the transmission circuit, in operation, multiplies each of the plurality of transmission signals by a pseudo-random code sequence.

11. The radar apparatus according to claim 1, wherein the transmission circuit, in operation, sets an association between each of the plurality of transmit antennas and one of the combinations of the Doppler shift amounts and the code sequences to vary for each of frames in which the plurality of transmission signals is transmitted.

12. The radar apparatus according to claim 1, wherein the transmission circuit, in operation, sets an association between each of the plurality of transmit antennas and one of the Doppler shift amounts to vary for each of transmission periods of the plurality of transmission signals.

13. A radar apparatus, comprising:
- a transmission circuit which, in operation, applies phase rotation amounts corresponding to Doppler shift amounts to a plurality of transmission signals; and
- a plurality of transmit antennas which, in operation, transmits the plurality of transmission signals to which the phase rotation amounts are applied using a time-multiplexing transmission.

* * * * *